(12) United States Patent
Jones

(10) Patent No.: US 12,419,279 B2
(45) Date of Patent: Sep. 23, 2025

(54) DOG TRAINING LEASH

(71) Applicant: K-9 Energy LLC, Akron, OH (US)

(72) Inventor: Sherry L. Jones, Pataskala, OH (US)

(73) Assignee: K-9 ENERGY LLC, Akron, OH (US)

( * ) Notice: Subject to any disclaimer, the term of this patent is extended or adjusted under 35 U.S.C. 154(b) by 620 days.

(21) Appl. No.: 17/481,103

(22) Filed: Sep. 21, 2021

(65) Prior Publication Data

US 2023/0093569 A1    Mar. 23, 2023

(51) Int. Cl.
*A01K 27/00*    (2006.01)

(52) U.S. Cl.
CPC .......... *A01K 27/003* (2013.01); *A01K 27/001* (2013.01)

(58) Field of Classification Search
CPC ............................ A01K 27/001; A01K 27/003
See application file for complete search history.

(56) References Cited

U.S. PATENT DOCUMENTS

| | | |
|---|---|---|
| 2,616,394 A | 11/1952 | Elsinger |
| 2,798,458 A | 7/1957 | Odermatt |
| 3,701,339 A | 10/1972 | Kemmerling |
| 4,811,695 A | 3/1989 | Higgins |
| 5,005,527 A | 4/1991 | Hatfield |
| 5,497,733 A | 3/1996 | Hull et al. |
| 5,732,661 A * | 3/1998 | Lagro ................. A01K 27/003 |
| | | 119/770 |
| 5,791,295 A * | 8/1998 | Schmid ................. A01K 27/002 |
| | | 119/793 |
| 5,934,224 A | 8/1999 | Sporn |
| 5,947,062 A | 9/1999 | Hoffman et al. |
| D509,329 S | 9/2005 | Willner et al. |
| 8,267,050 B1 * | 9/2012 | Hatcher ............... A01K 27/004 |
| | | 119/797 |
| D686,785 S | 7/2013 | Johnston |
| D790,780 S | 6/2017 | Strengell |
| 9,775,328 B1 * | 10/2017 | Fidrych ................ A01K 27/002 |
| D877,990 S | 3/2020 | Lovett |
| D882,883 S | 4/2020 | Moore |
| 2006/0096552 A1 | 5/2006 | Tsai |
| 2008/0134989 A1 * | 6/2008 | Weiss ................... A01K 27/003 |
| | | 119/793 |
| 2018/0139930 A1 | 5/2018 | Walshe |
| 2019/0320618 A1 * | 10/2019 | Simons ................ A01K 27/003 |
| 2021/0029970 A1 * | 2/2021 | Davis ................... A01K 27/001 |

FOREIGN PATENT DOCUMENTS

EP    0126190 A1    11/1984

* cited by examiner

*Primary Examiner* — Joshua D Huson
*Assistant Examiner* — Edgar Reyes
(74) *Attorney, Agent, or Firm* — Dawsey Co., LPA; David J. Dawsey

(57) ABSTRACT

A dog training leash having a ring formed with a ring aperture, a flexible body having a first end attached to the ring and a second end, wherein the second end passes through the ring aperture, and a stop is repositionably engaged with the flexible body between the ring and the second end. The flexible body includes a leash material property differential region, a leash contrast region, or a leash grip enhancement region, which improve the performance of the leash.

19 Claims, 65 Drawing Sheets

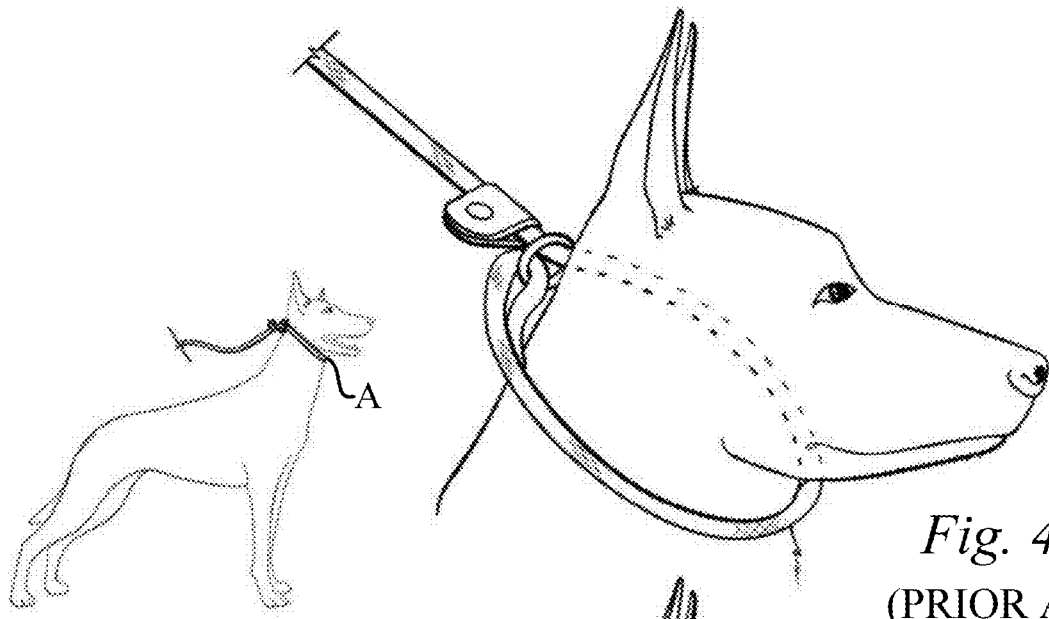
*Fig. 4A*
(PRIOR ART)
*Fig. 4B*
(PRIOR ART)
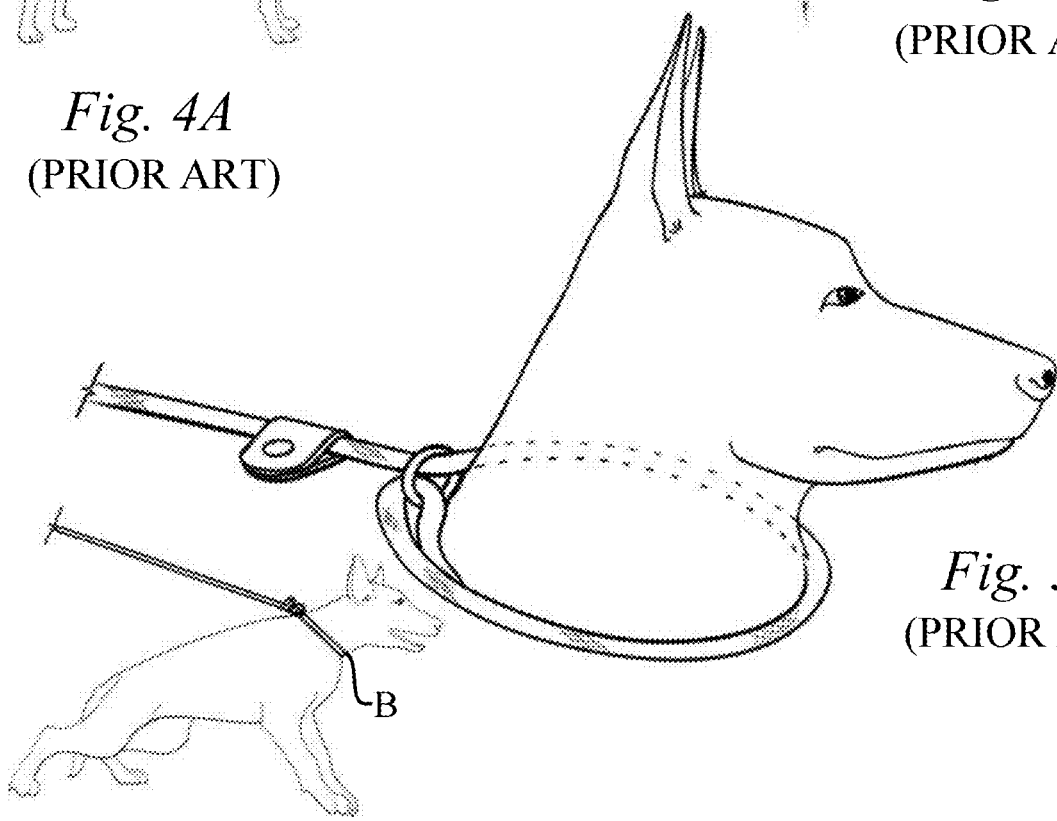
*Fig. 5A*
(PRIOR ART)
*Fig. 5B*
(PRIOR ART)

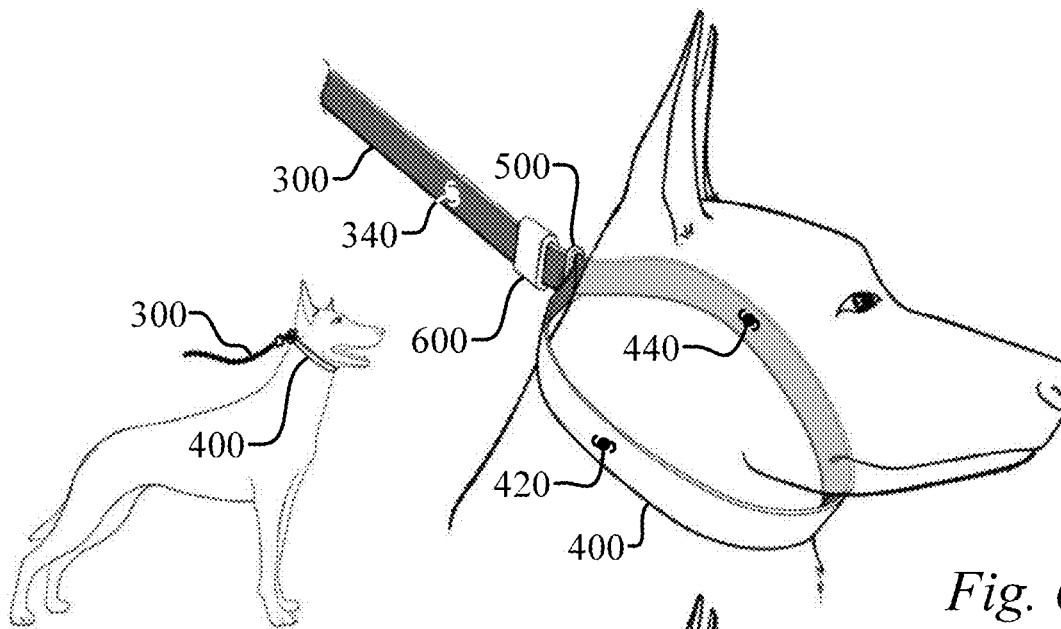
Fig. 6A
Fig. 6B
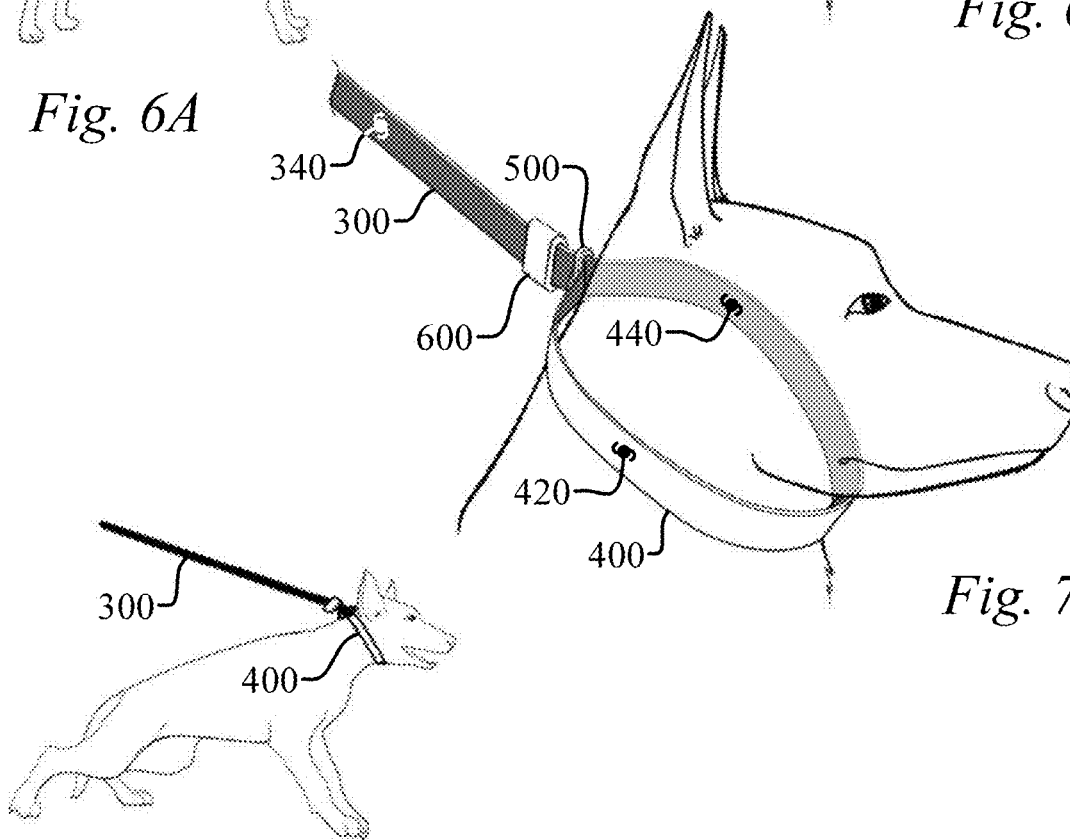
Fig. 7A
Fig. 7B

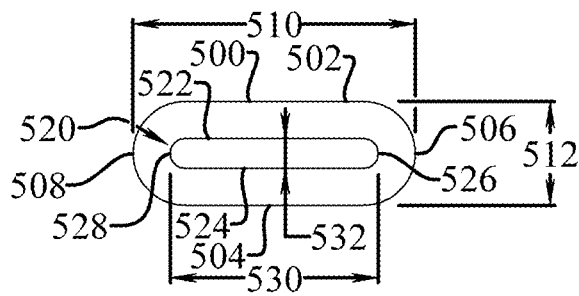
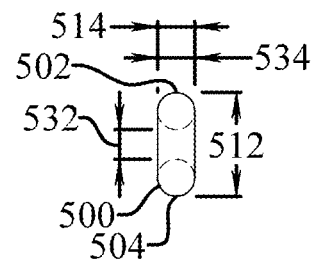
*Fig. 12*     *Fig. 13*
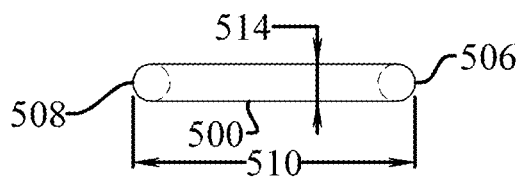
*Fig. 14*
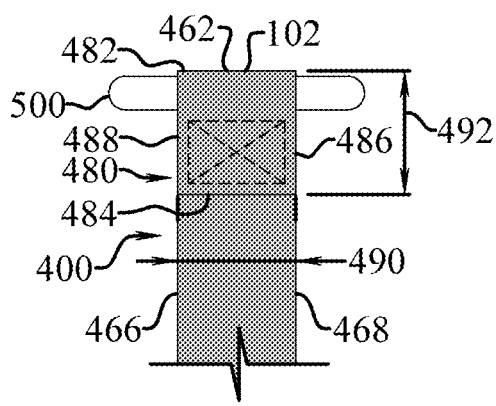
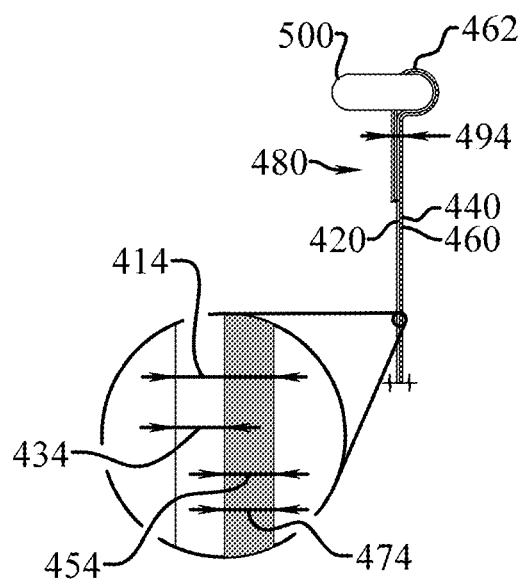
*Fig. 15*     *Fig. 16*

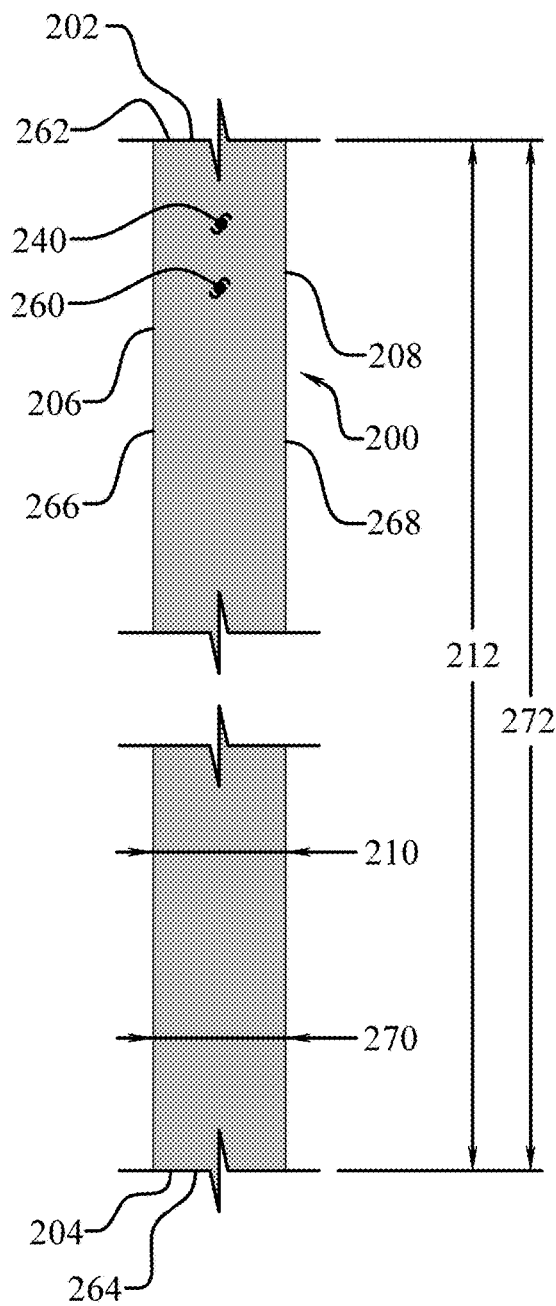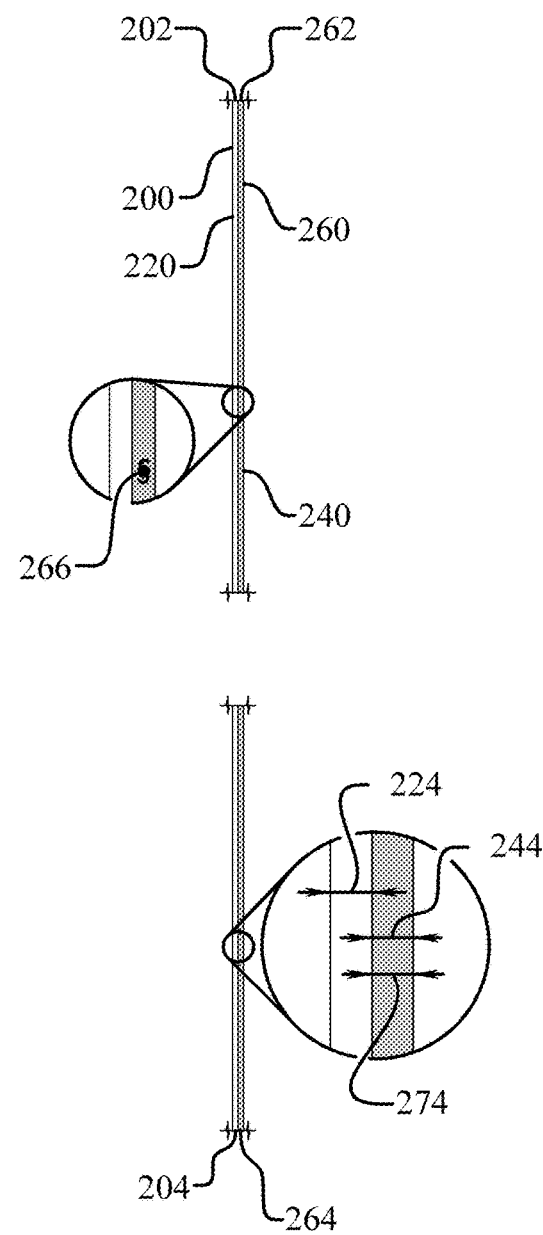
Fig. 37A
Fig. 37B

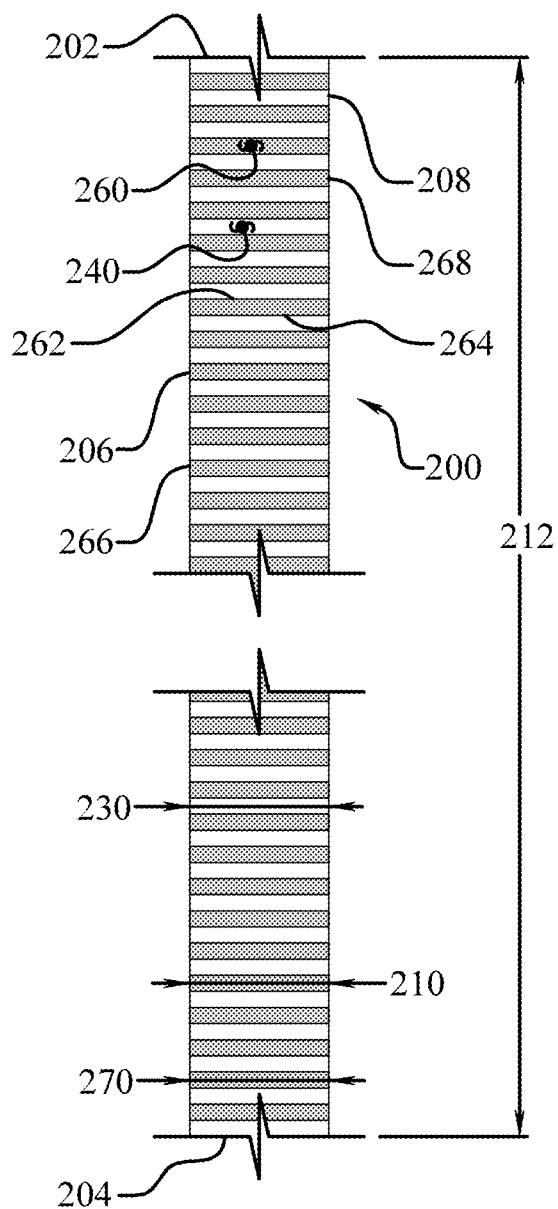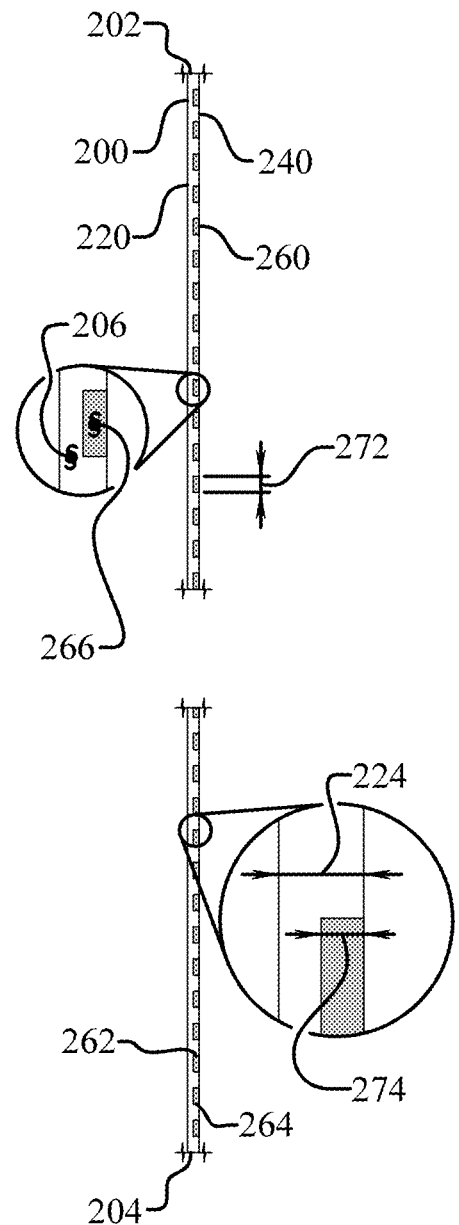
Fig. 38A
Fig. 38B

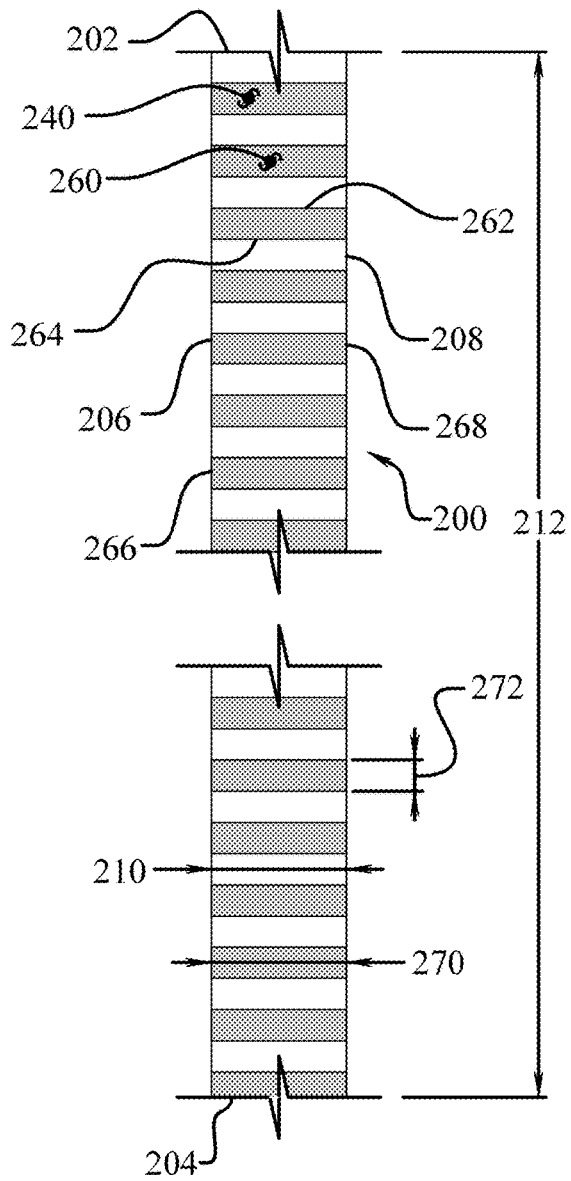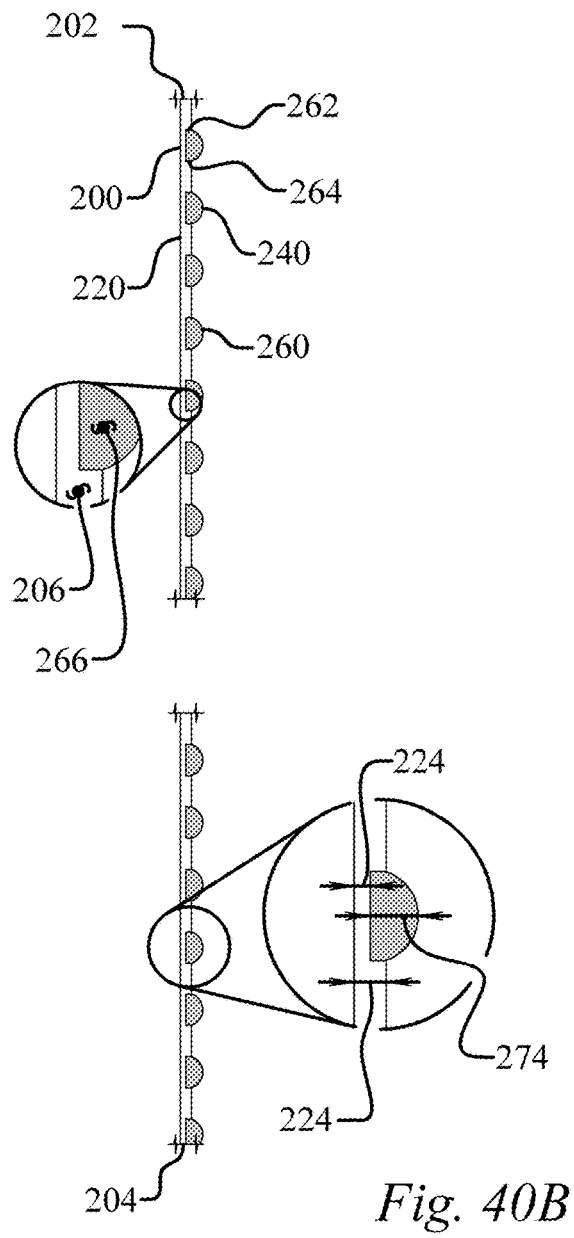
Fig. 40A
Fig. 40B

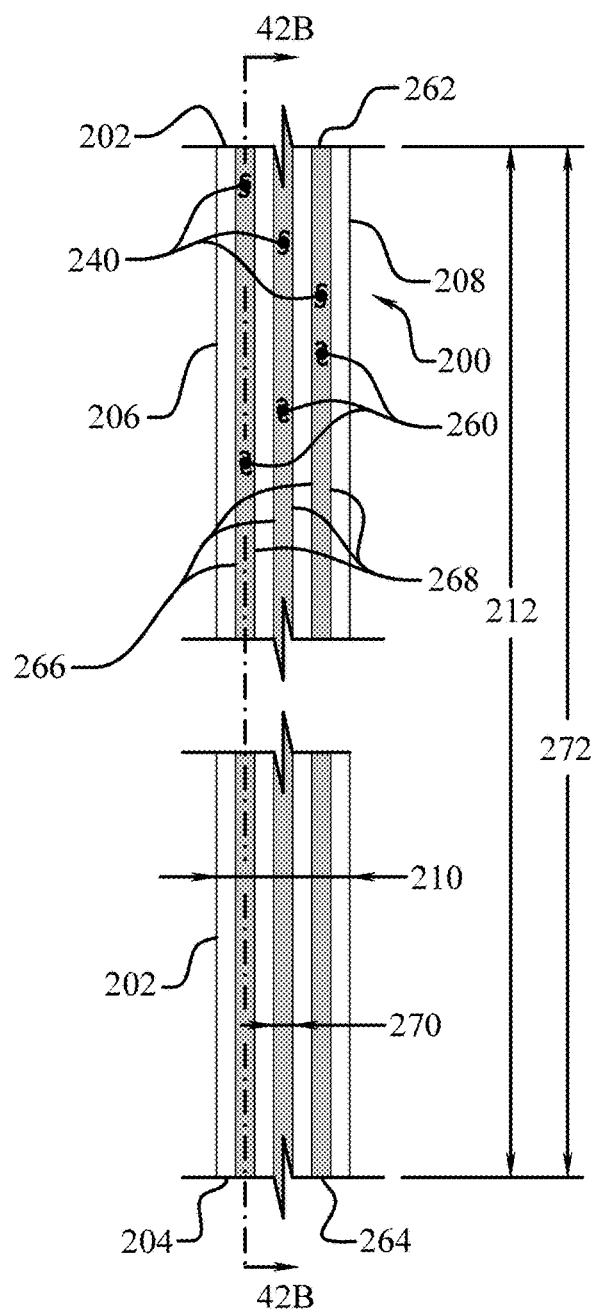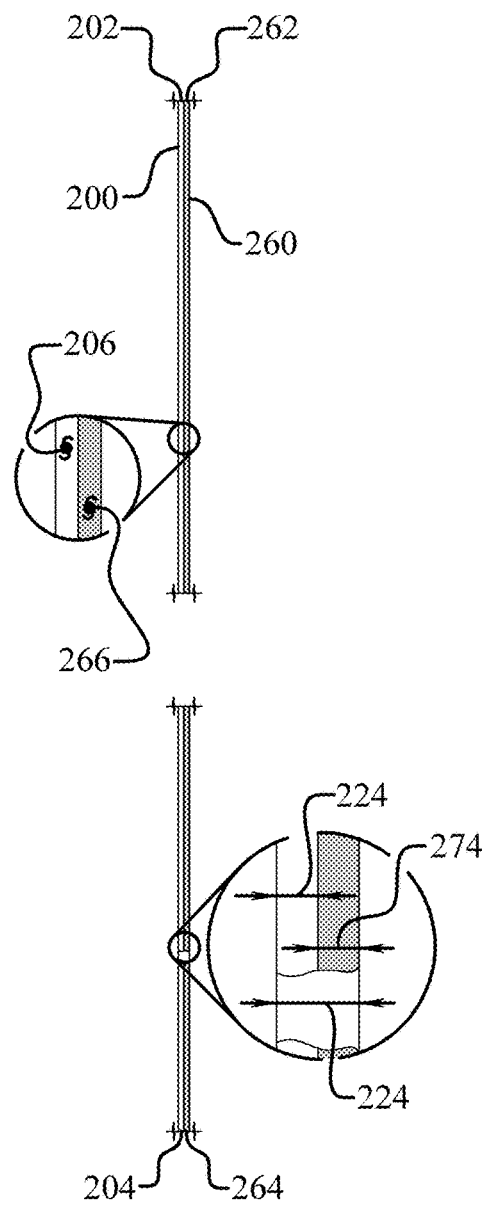
Fig. 42A
Fig. 42B

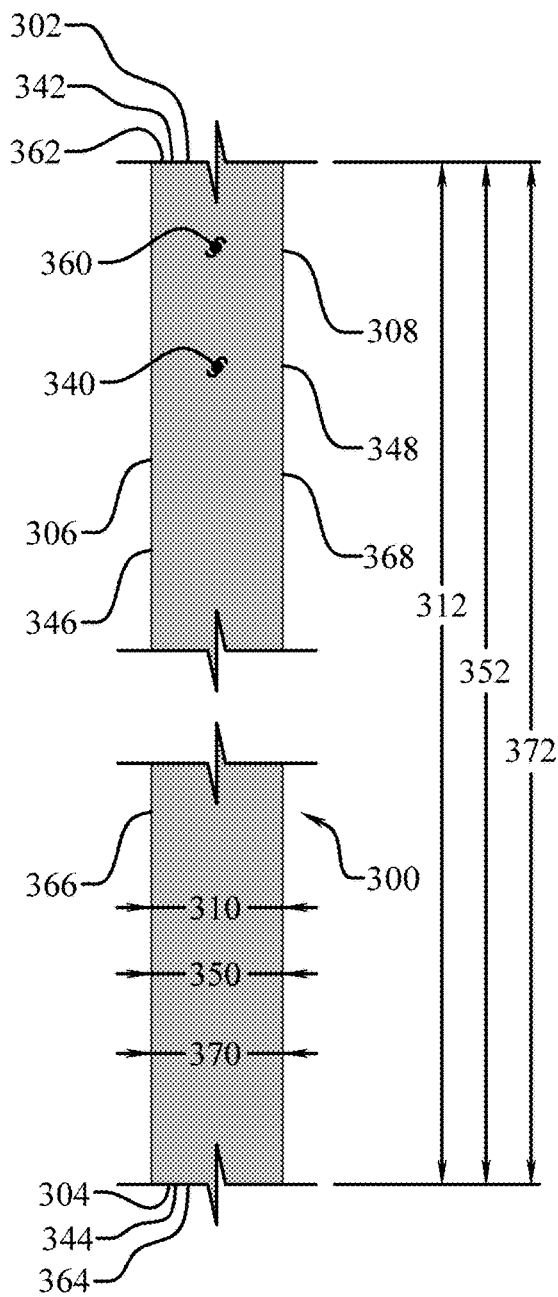
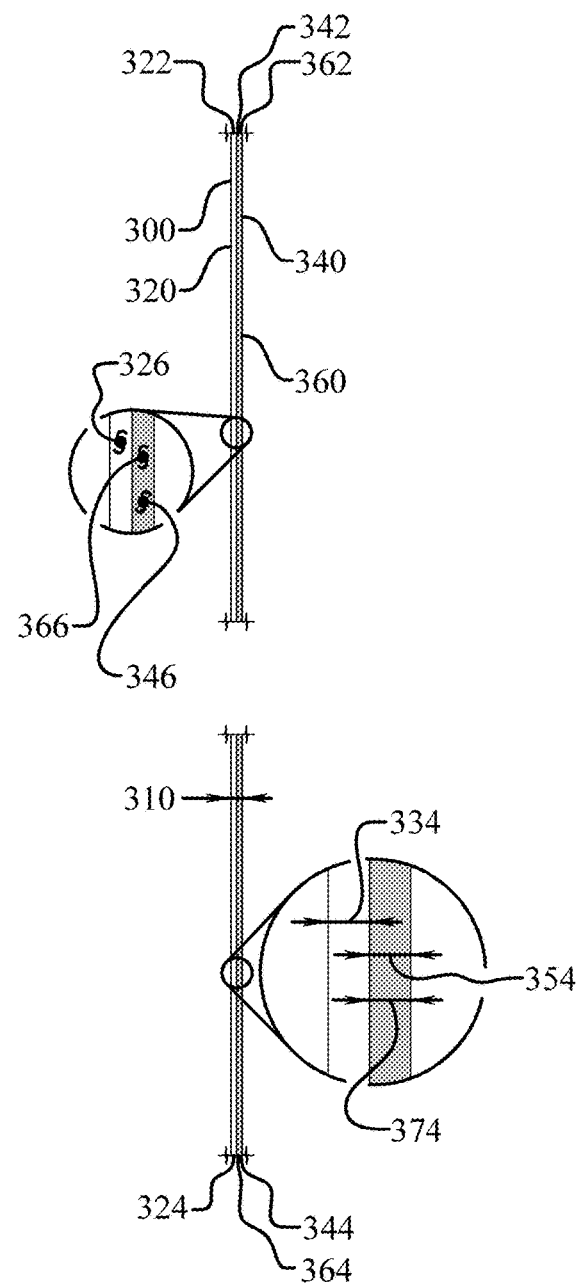
Fig. 43A
Fig. 43B

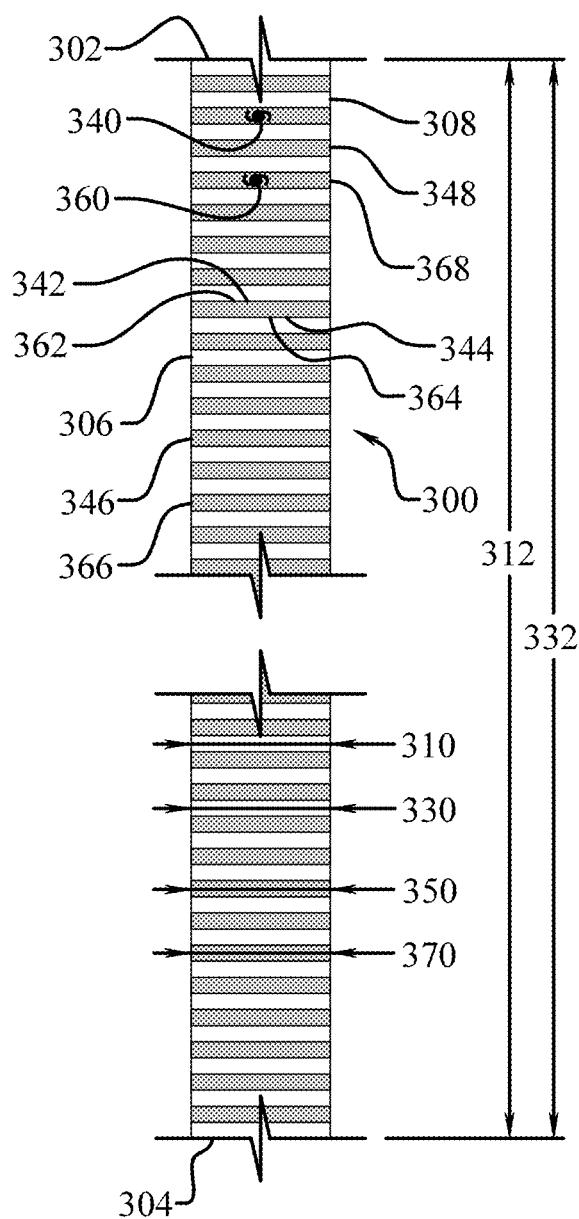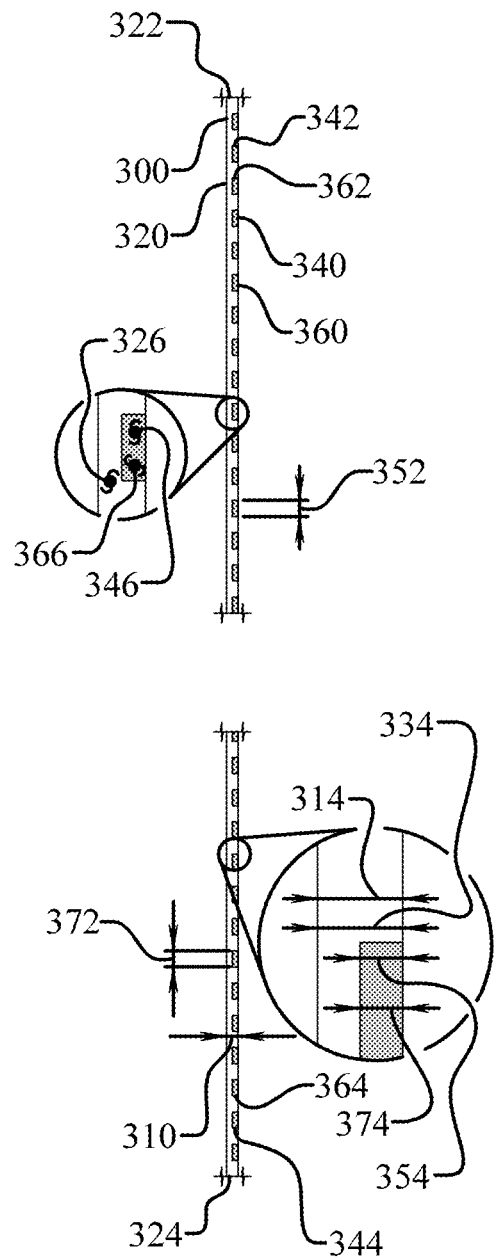
Fig. 44A
Fig. 44B

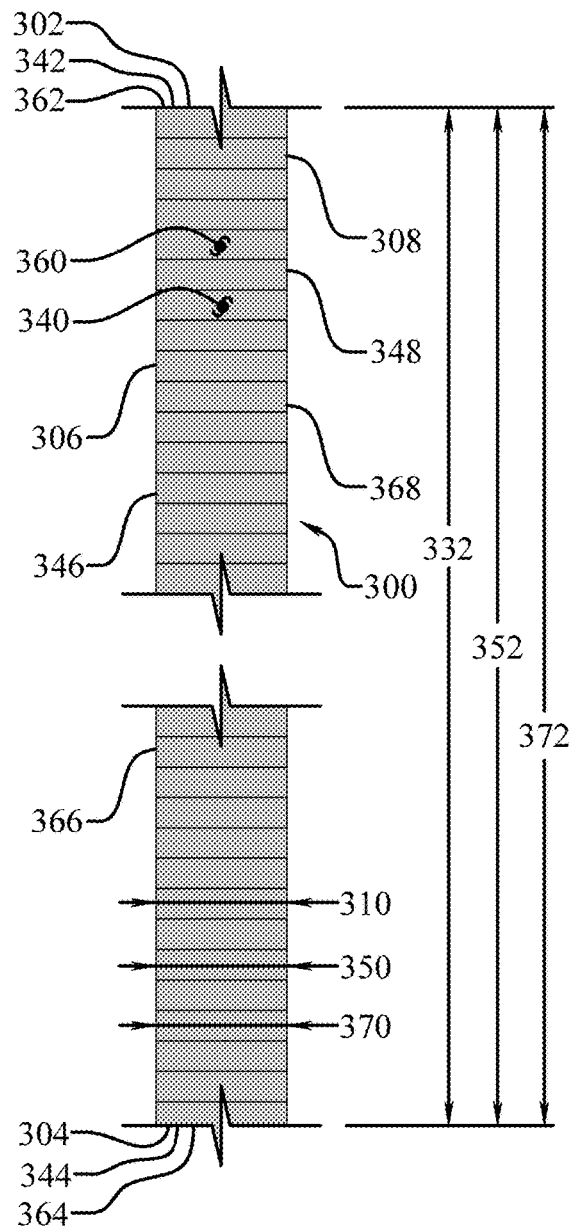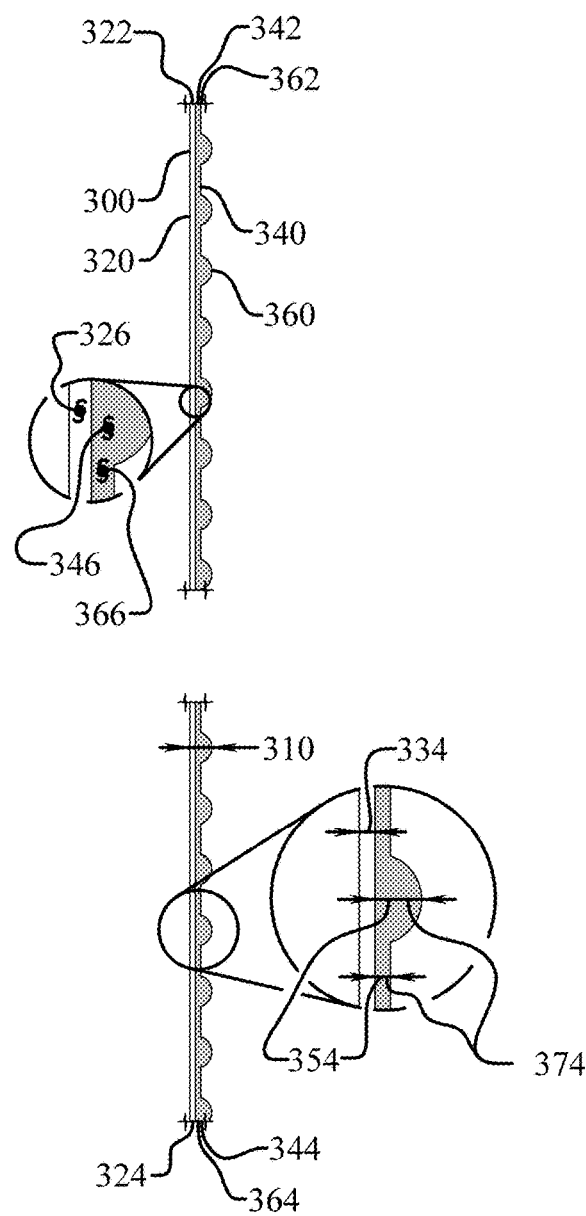
Fig. 45A
Fig. 45B

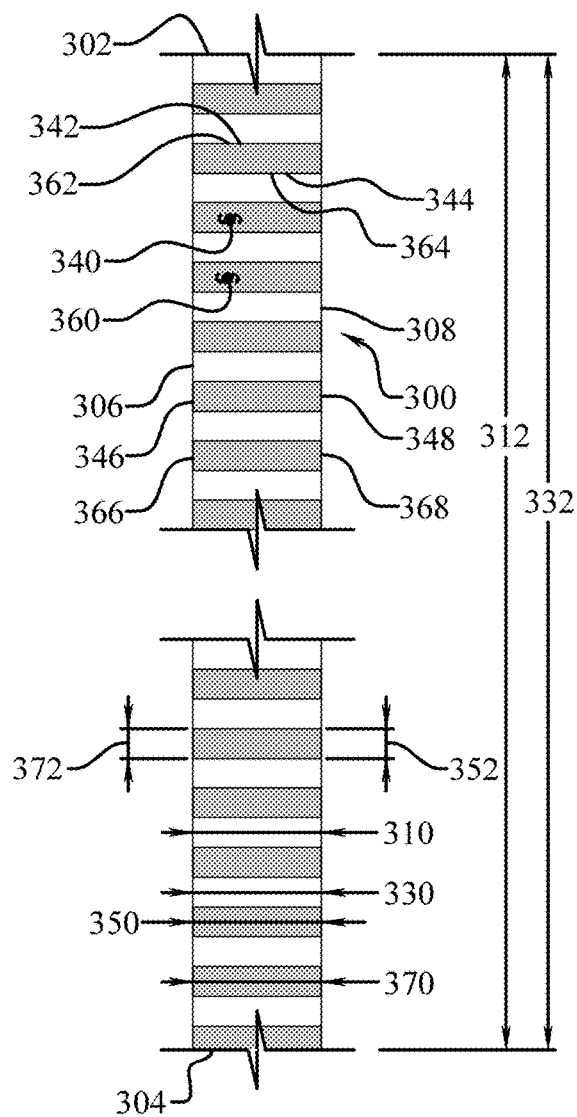
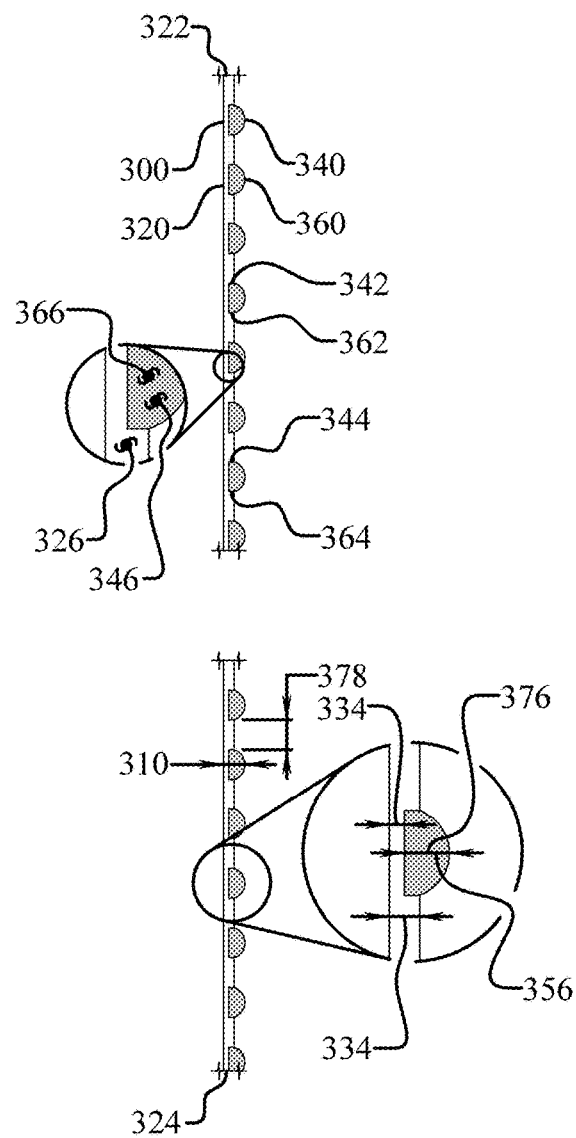
Fig. 46A
Fig. 46B

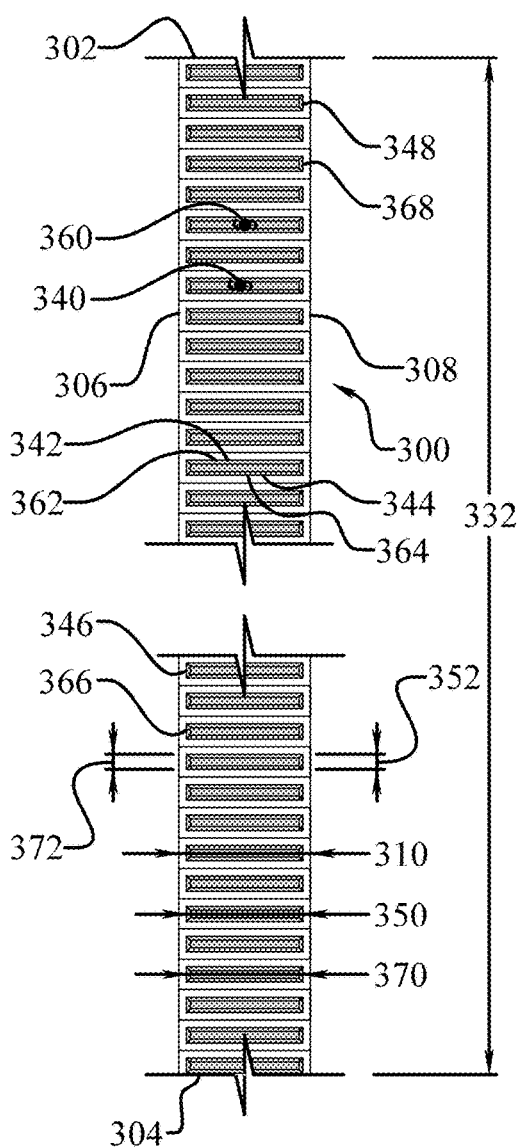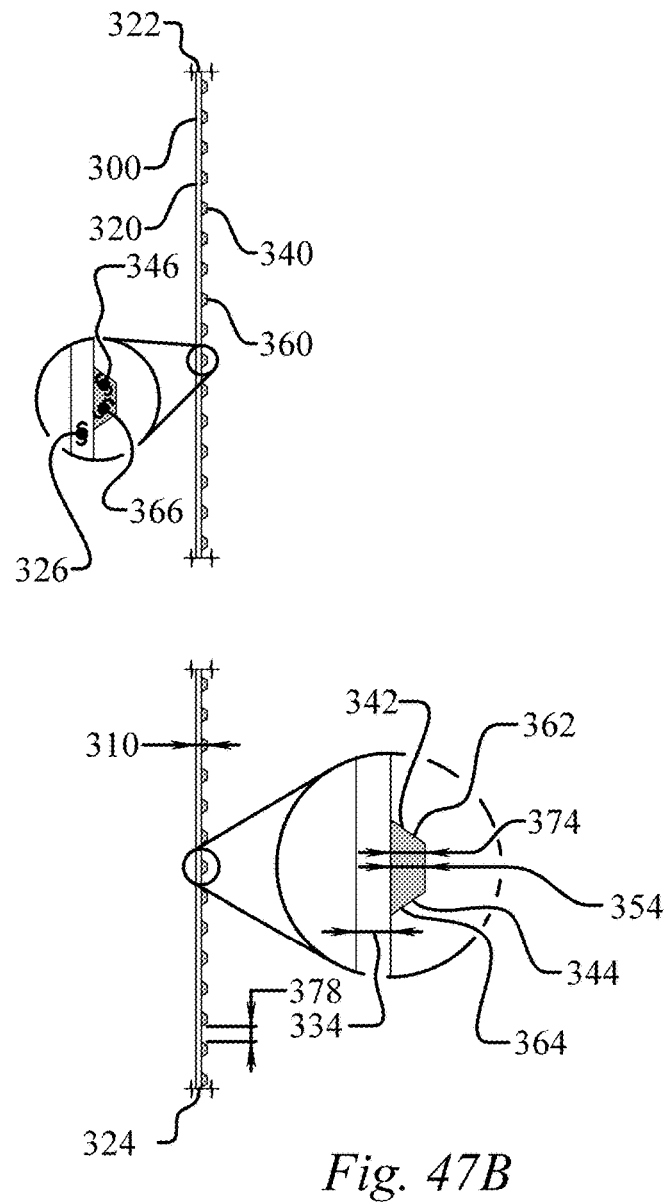
Fig. 47A
Fig. 47B

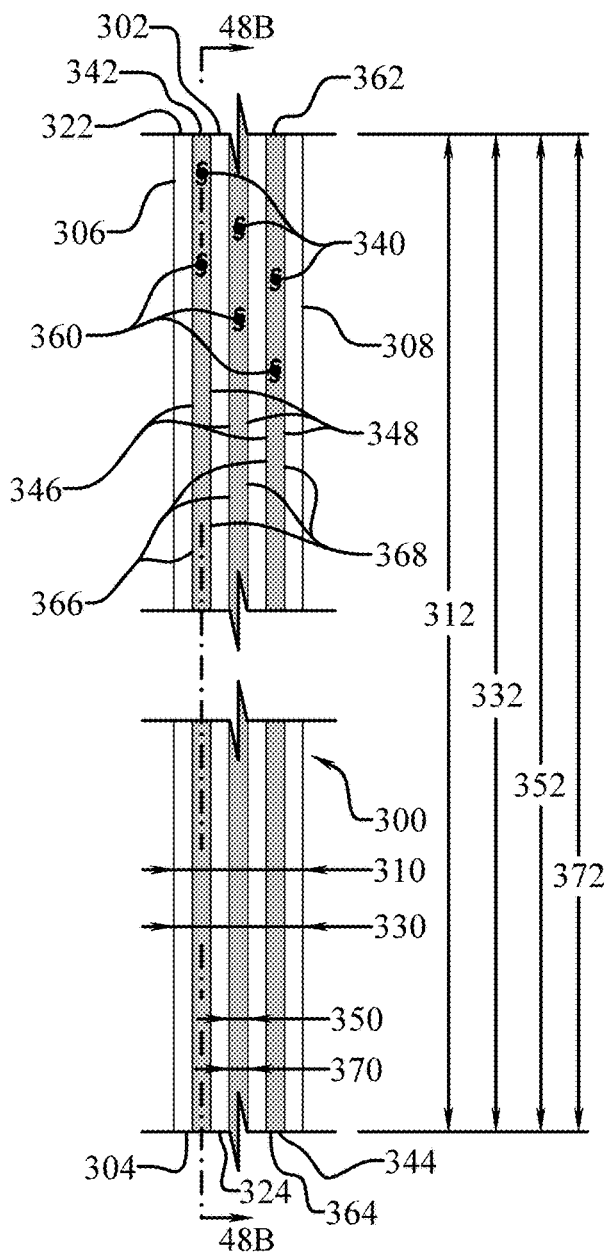
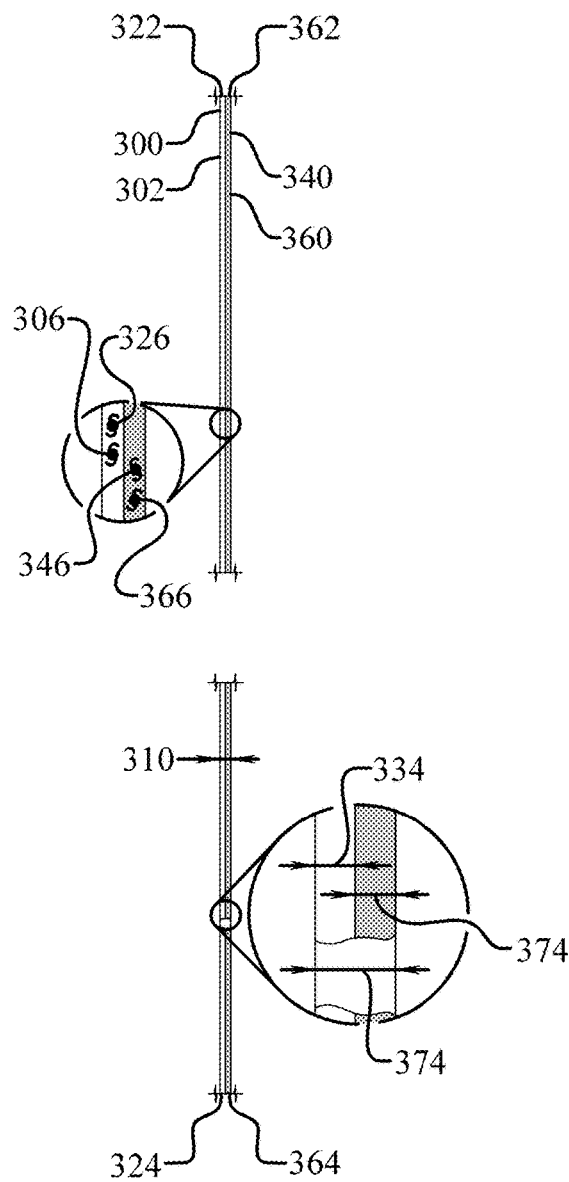
Fig. 48A
Fig. 48B

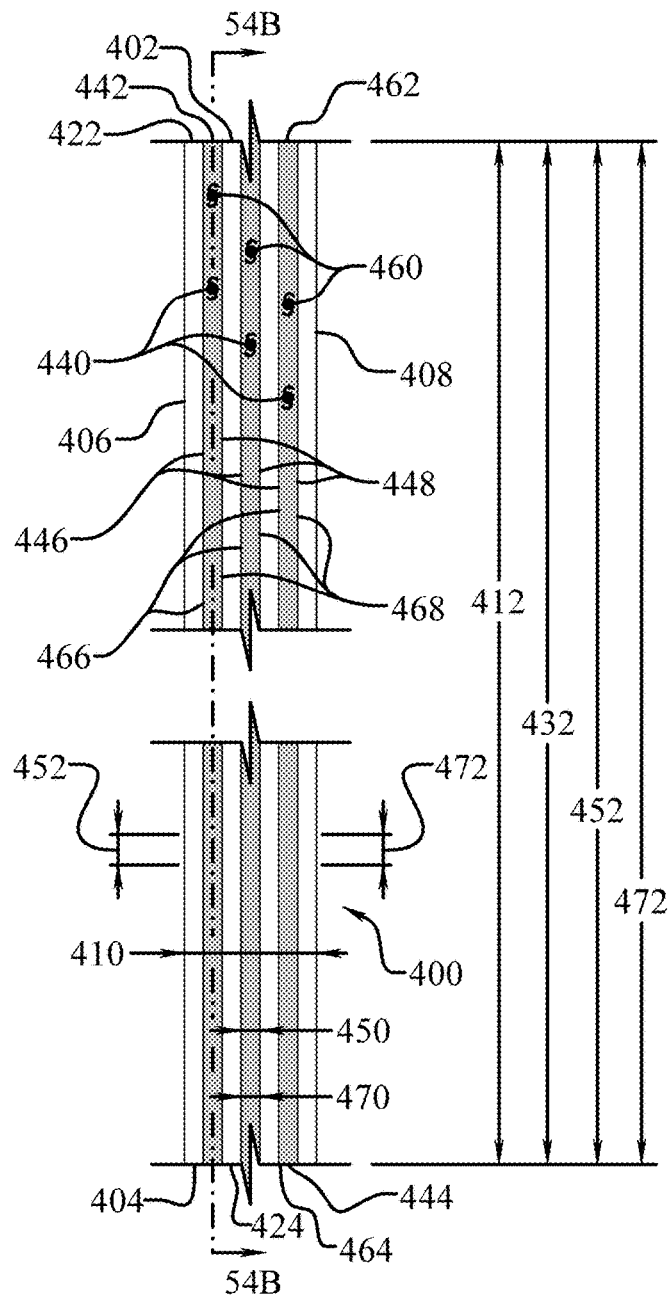
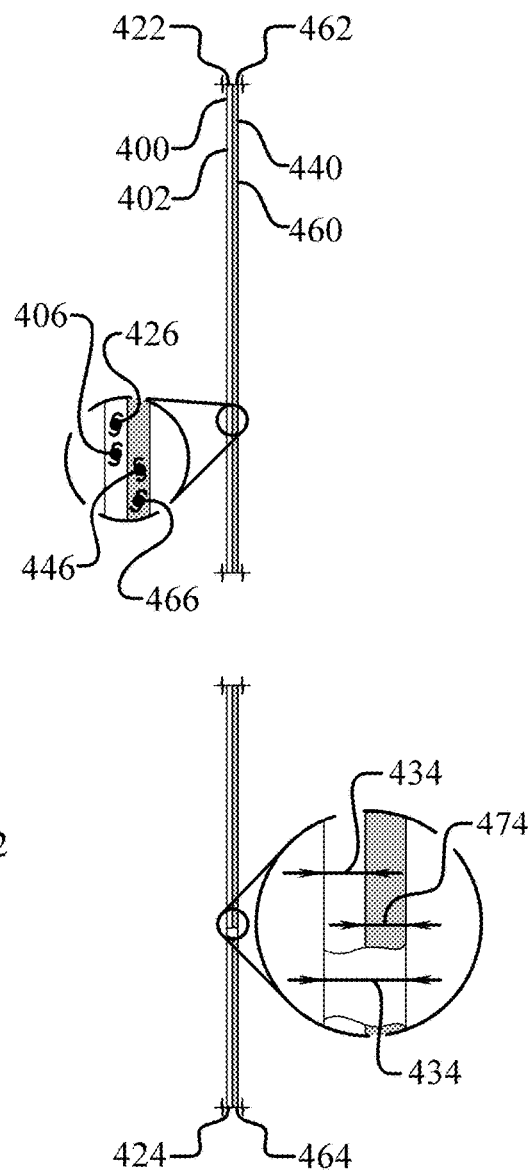
Fig. 54A
Fig. 54B

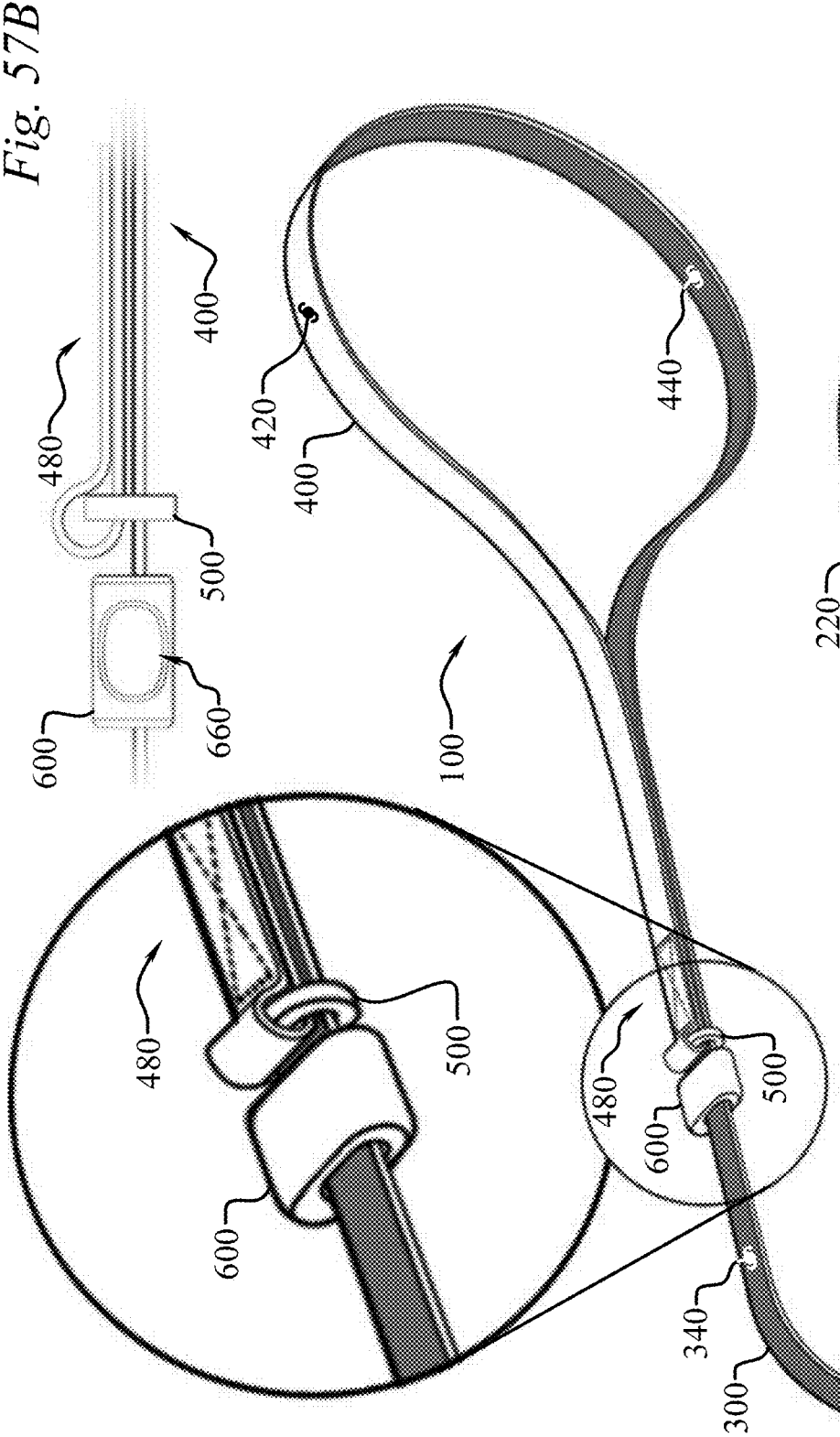

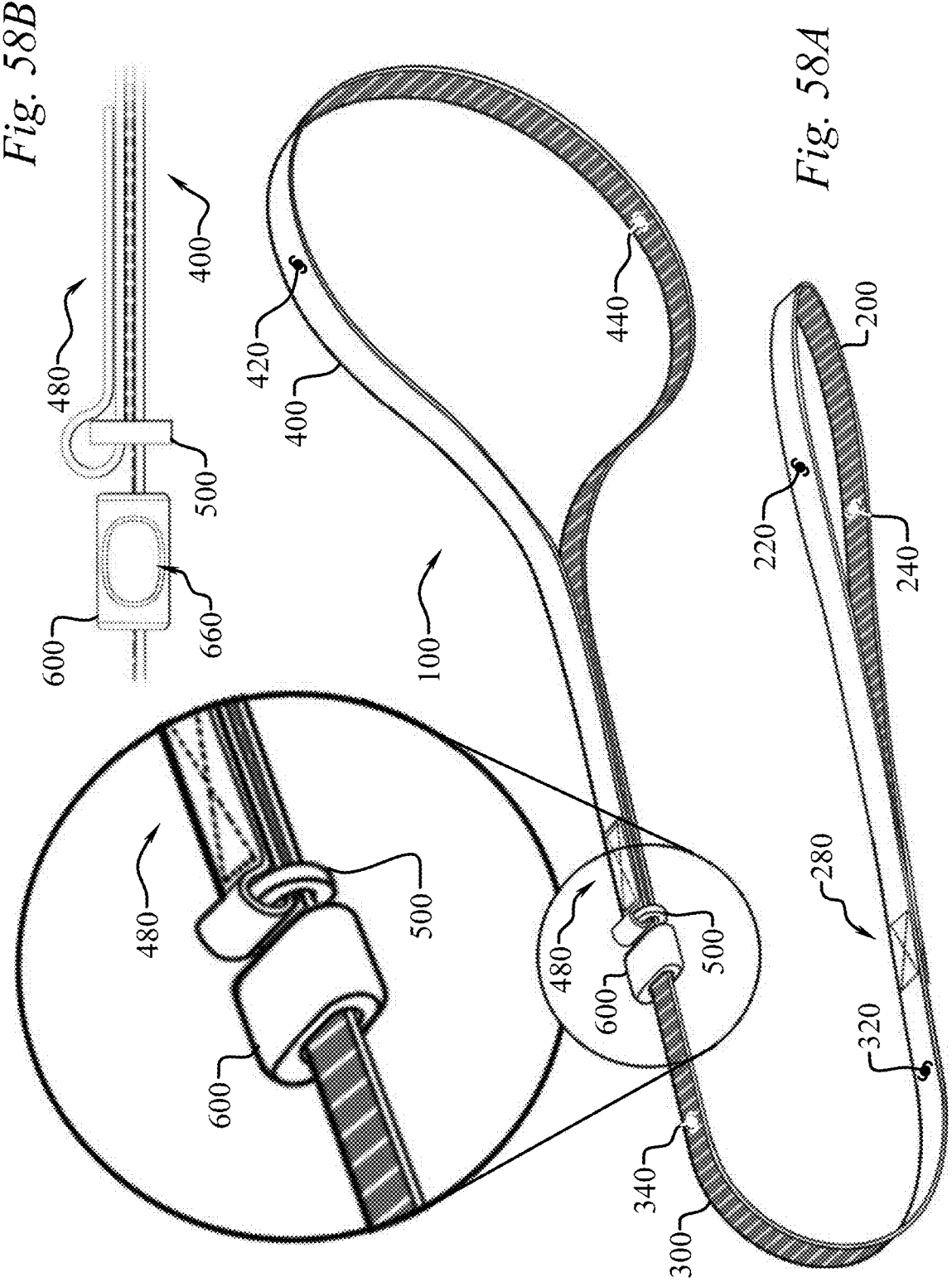

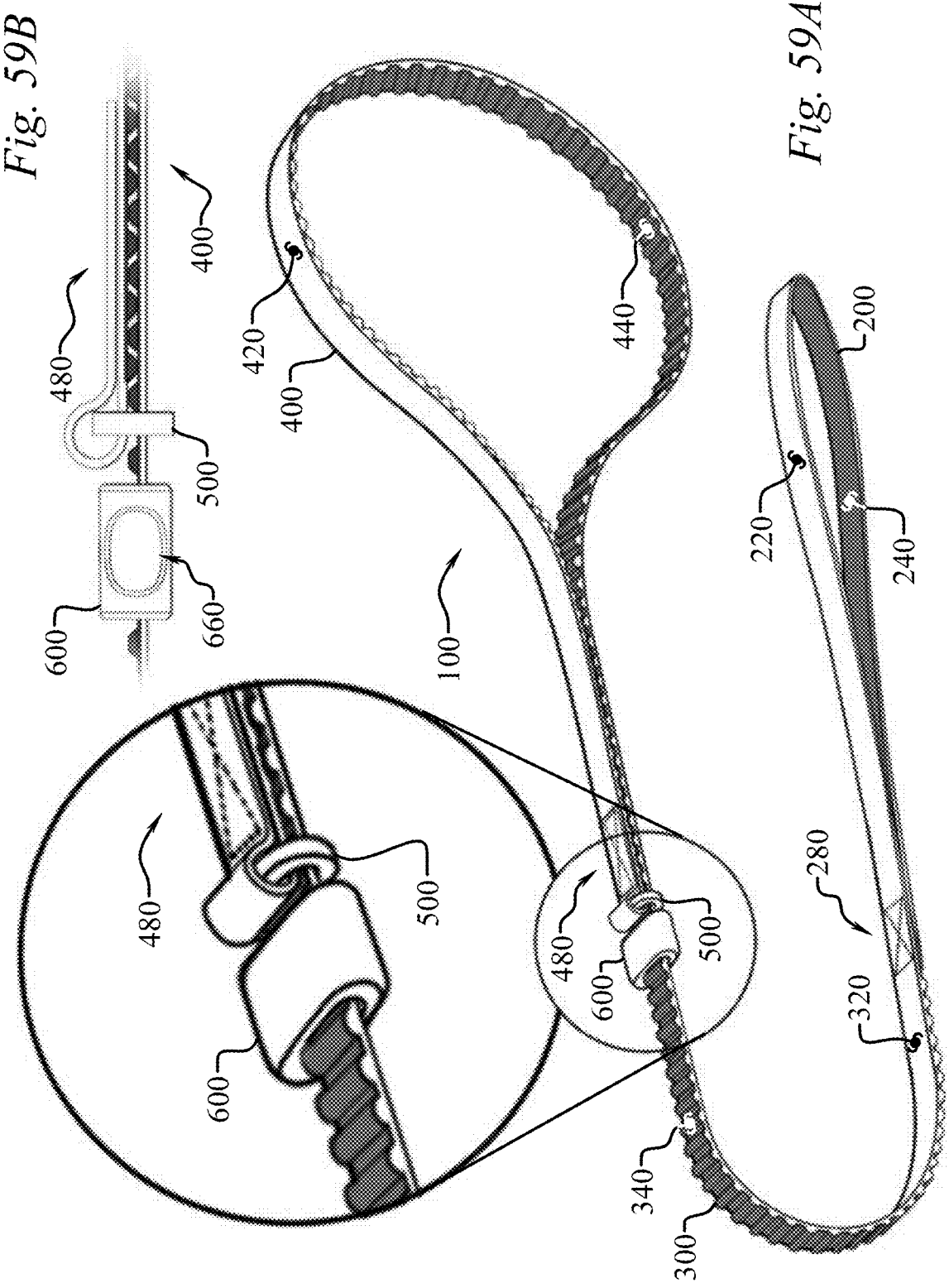

| Leash Concept # and Material | Linear Break Test (Fig 71) | Linear Break Test (Fig 73) | Rotational Break Test (Fig 75) |
|---|---|---|---|
| Con#00 Plain | 2lb 3oz | 0lb 6oz | 0lb 12oz |
| Con#10 Silicone Dots | 2lb 10oz | 2lb 5oz | 4lb 5oz |
| Con#17 Silicone Mini Ribs | 3lb 6oz | 0lb 10oz | 3lb 2oz |
| Con#18 Silicone Large Ribs | 8lb 13oz | 2lb 8oz | 4lb 2oz |
| Con#20 Fabric Paint Ribs | 6lb 14oz | 0lb 8oz | 8lb 1oz |
| Con#21 Friction Tape | 5lb 1oz | 2lb 3oz | 3lb 14oz |

*Fig. 77*

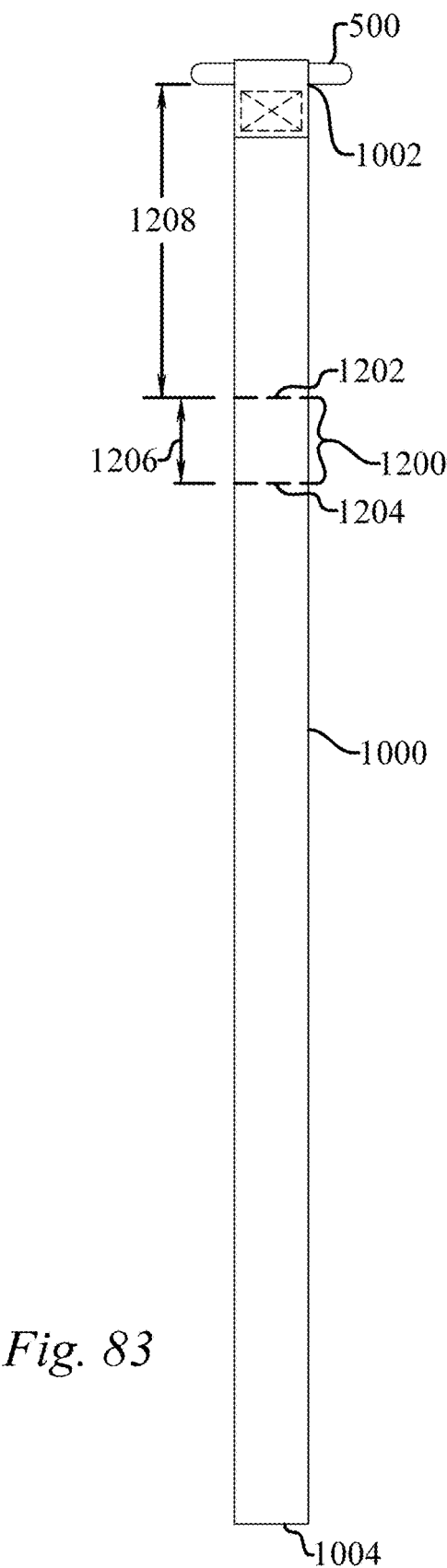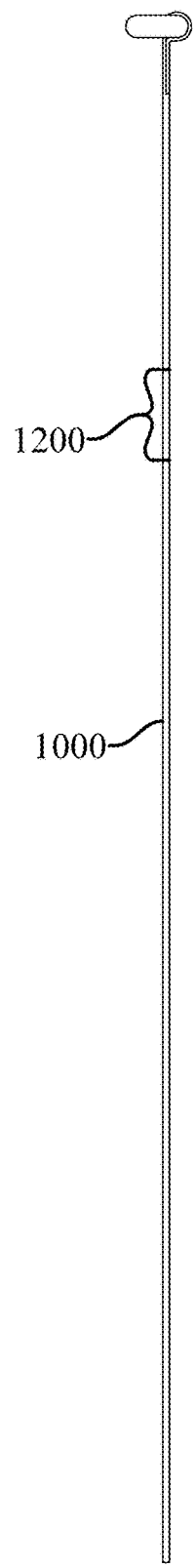
Fig. 83
Fig. 84

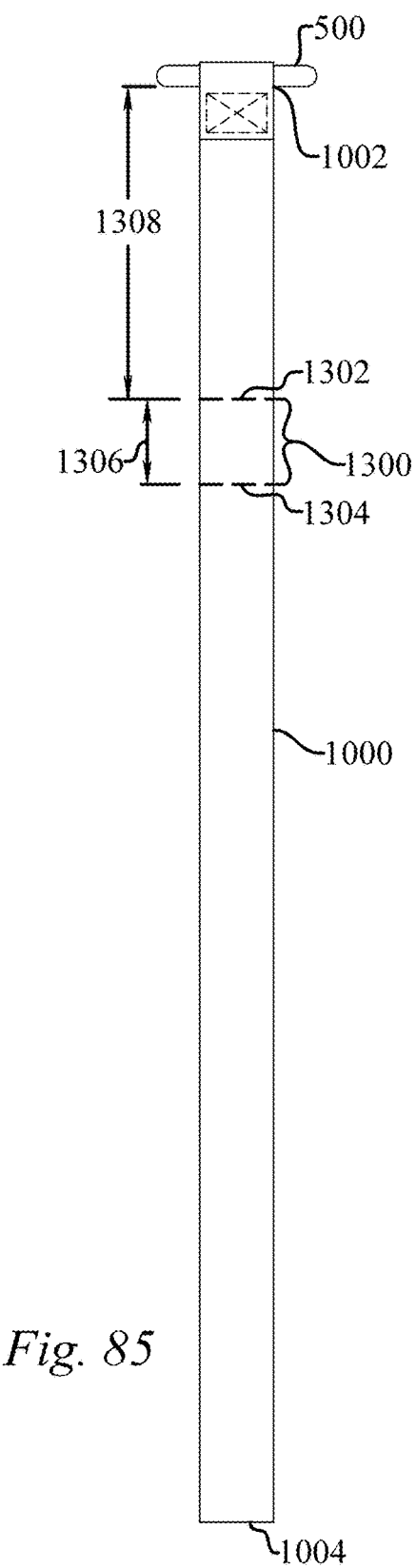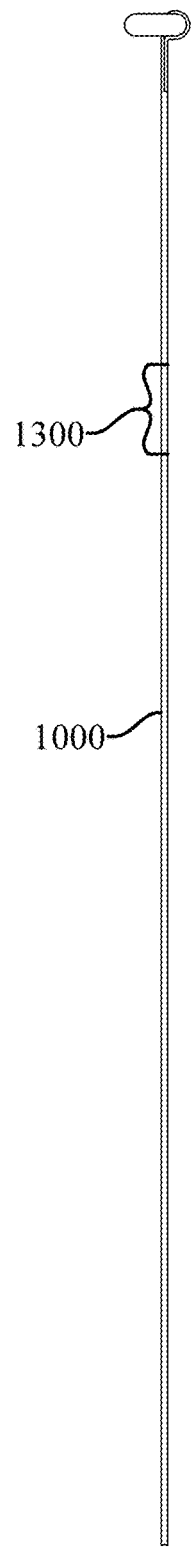
Fig. 85
Fig. 86

DOG TRAINING LEASH

CROSS-REFERENCE TO RELATED APPLICATIONS

Not applicable.

TECHNICAL FIELD

The present disclosure relates to the field of pet leashes, more specifically grip slip lead dog leashes.

BACKGROUND OF THE INVENTION

Training a dog can be challenging and many different systems and methods have been developed to aid the dog trainer in their task. One of these methods is the use of a slip lead leash. Unlike regular leashes that fasten onto buckle collars, slip lead leashes are designed as a loop. A portion of leash is fed through a ring on the other end, thereby creating a contractible loop. After which, the slip lead leash loop is placed around the dog's neck. As a result, the dog is now ready for training. A trainer gives the slip lead leash a slight tug to correct a dog's behavior. When the leash is tugged, the slip collar will contract around the dog's neck and apply pressure as the dog tries to pull or strain against the leash. It allows for a method of aversion training designed to teach the dog behavior that is not acceptable.

Unfortunately, slip lead leashes have some serious issues that can lead to physical injury, and even death, to the dogs that they are used on. With proper placement of the slip lead leash around an animal's neck the dangers of injury or death are reduced. The proper placement of a slip lead leash is high on the animal's neck just behind the ears and jaw line of the animal, with the other end of the leash in the handler's hand. However, when a typical slip lead leash is put into actual practice, slip lead leashes are hard to keep in proper placement on a dog's neck and often slips downwards into a dangerous position when a dog lunges forward, after which the slip lead leash can physically harm the dog. In addition to the physical harm that a typical slip leash can cause, the leash slipping into lower position on the dog's neck expands the slip lead leash's collar loop opening from which a dog can then escape.

Pre-existing slip lead leashes remain a valuable training tool, however they leave much to be desired. The current invention seeks to remedy the short comings found in prior art slip lead leashes.

SUMMARY OF INVENTION

A dog training leash having a ring formed with a ring aperture, a flexible body having a first end attached to the ring and a second end, wherein the second end passes through the ring aperture, and a stop is repositionably engaged with the flexible body between the ring and the second end. The flexible body includes a leash material property differential region, a leash contrast region, or a leash grip enhancement region, which improve the performance of the leash.

BRIEF DESCRIPTION OF THE DRAWINGS

Without limiting the scope of the grip slip lead dog leash and system as claimed below and referring now to the drawings and figures:

FIG. 4A is a side elevation view of a prior art leash embodiment in the proper position on a dog, not to scale;

FIG. 4B is an isometric view of a prior art leash embodiment in the proper position on a dog, not to scale;

FIG. 5A is a side elevation view of a prior art leash embodiment that has slipped into an improper position on a lunging dog, not to scale;

FIG. 5B is an isometric view of a prior art leash embodiment that is in an improper position on a post lunged dog, not to scale;

FIG. 6A is a side elevation view of a leash embodiment on a dog in the proper position, not to scale;

FIG. 6B is an isometric view of a leash embodiment on a dog in the proper position, not to scale;

FIG. 7A is a side elevation view of a leash embodiment on a lunging dog in the proper position, not to scale;

FIG. 7B is an isometric view of a leash embodiment on a post lunged dog in the proper position, not to scale;

FIG. 12 is a top plan view of a ring embodiment, not to scale;

FIG. 13 is a side elevation view of a ring embodiment, not to scale;

FIG. 14 is a front elevation view of a ring embodiment, not to scale;

FIG. 15 is a partial elevation view of a collar embodiment having a ring secured by a collar ring securement area, not to scale;

FIG. 16 side elevation view of a collar embodiment having a ring and a magnified view, not to scale;

FIG. 37A is a partial elevation view of a grip embodiment showing the grip second side, not to scale;

FIG. 37B is a partial dextral side elevation view of a grip embodiment having magnified views, not to scale;

FIG. 38A is a partial elevation view of a grip embodiment showing the grip second side, not to scale;

FIG. 38B is a partial dextral side elevation view of a grip embodiment having magnified views, not to scale;

FIG. 40A is a partial elevation view of a grip embodiment showing the grip second side, not to scale;

FIG. 40B is a partial dextral side elevation view of a grip embodiment having magnified views, not to scale;

FIG. 42A is a partial elevation view of a grip embodiment showing the grip second side, not to scale;

FIG. 42B is a partial dextral side elevation view of a grip embodiment having magnified views, not to scale;

FIG. 43A is a partial elevation view of a lead embodiment showing the lead second side, not to scale;

FIG. 43B is a partial dextral side elevation view of a lead embodiment having magnified views, not to scale;

FIG. 44A is a partial elevation view of a lead embodiment showing the lead second side, not to scale;

FIG. 44B is a partial dextral side elevation view of a lead embodiment having magnified views, not to scale;

FIG. 45A is a partial elevation view of a lead embodiment showing the lead second side, not to scale;

FIG. 45B is a partial dextral side elevation view of a lead embodiment having magnified views, not to scale;

FIG. 46A is a partial elevation view of a lead embodiment showing the lead second side, not to scale;

FIG. 46B is a partial dextral side elevation view of a lead embodiment having magnified views, not to scale;

FIG. 47A is a partial elevation view of a lead embodiment showing the lead second side, not to scale;

FIG. 47B is a partial dextral side elevation view of a lead embodiment having magnified views, not to scale;

FIG. 48A is a partial elevation view of a lead embodiment showing the lead second side, not to scale;

FIG. 48B is a partial dextral side elevation view of a lead embodiment having magnified views, not to scale;

FIG. 54A is a partial elevation view of a collar embodiment showing the collar second side, not to scale;

FIG. 54B is a partial dextral side elevation view of a collar embodiment having magnified views, not to scale;

FIG. 57A is an isometric view of a grip slip lead dog leash embodiment having a magnified view, not to scale;

FIG. 57B is partial side elevation view of an leash embodiment, not to scale;

FIG. 58A is an isometric view of a grip slip lead dog leash embodiment having a magnified view, not to scale;

FIG. 58B is partial side elevation view of an leash embodiment, not to scale;

FIG. 59A is an isometric view of a grip slip lead dog leash embodiment having a magnified view, not to scale;

FIG. 59B is partial side elevation view of an leash embodiment, not to scale;

FIG. 77 is table of test data;

FIG. 83 is a plan view of an embodiment of the leash;

FIG. 84 is a side view of an embodiment of the leash;

FIG. 85 is a plan view of an embodiment of the leash;

FIG. 86 is a side view of an embodiment of the leash;

FIG. 89 is a partial perspective view of an embodiment of the leash material property differential region;

FIG. 90 is a partial perspective view of an embodiment of the leash material property differential region;

FIG. 91 is a plan view of an embodiment of the ring;

FIG. 92 is a side view of an embodiment of the ring;

FIG. 93 is a side view of an embodiment of the ring;

FIG. 94 is a partial perspective view of an embodiment of the leash;

FIG. 95 is a partial perspective view of an embodiment of the leash;

FIG. 96 is a partial perspective view of an embodiment of the leash;

FIG. 97 is a partial perspective view of an embodiment of the leash;

FIG. 98 is a partial perspective view of an embodiment of the leash;

FIG. 99 is a partial perspective view of an embodiment of the leash;

FIG. 100 is a partial perspective view of an embodiment of the leash;

Figure 101:
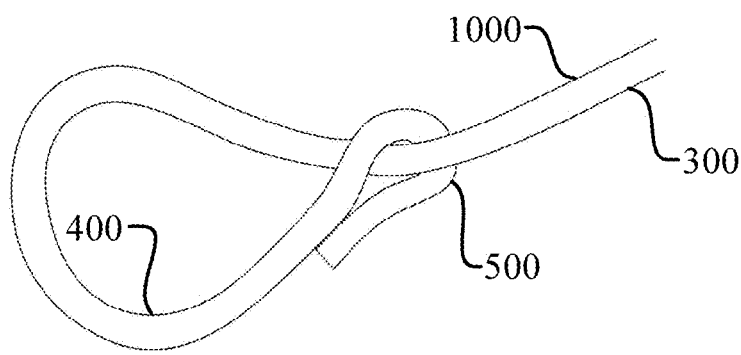
Figure 102:
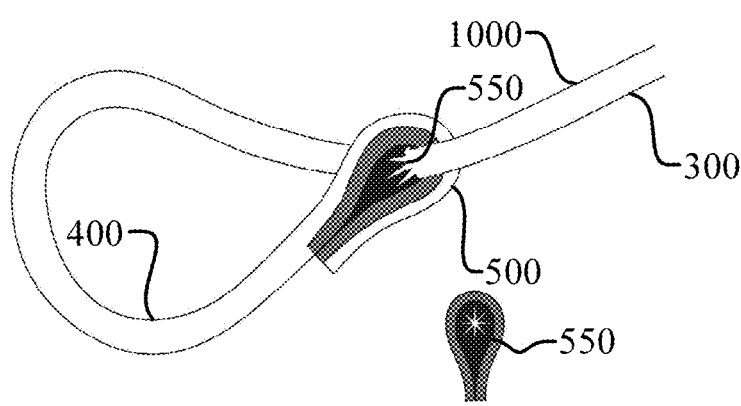
Figure 103:
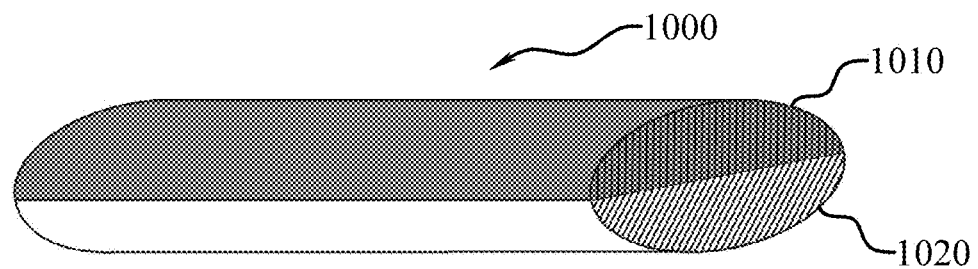
Figure 104:
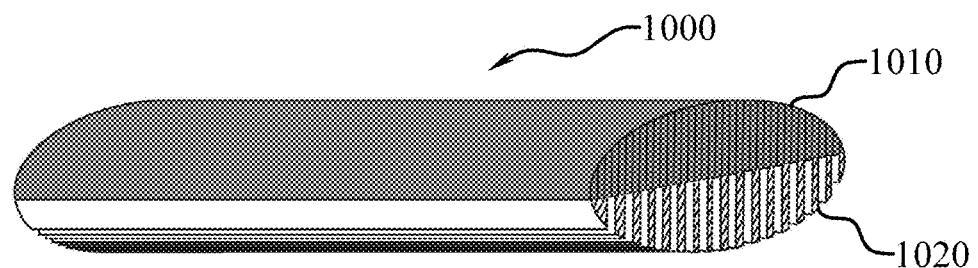
Figure 105:
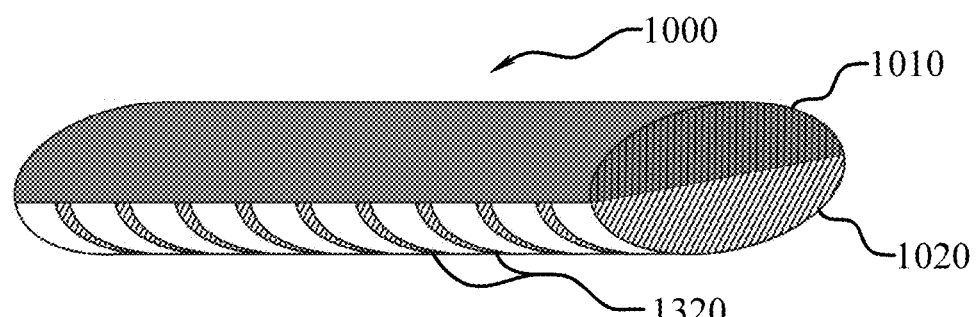
Figure 106:
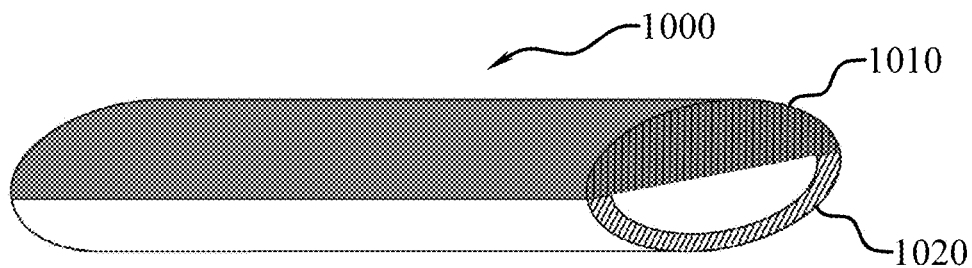
Figure 107:
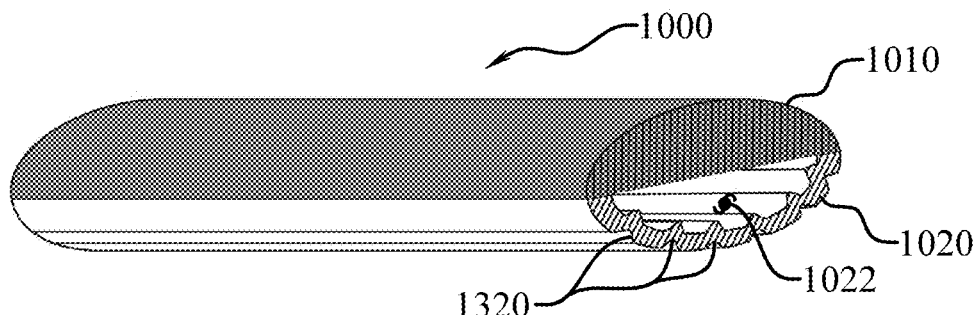
Figure 108:
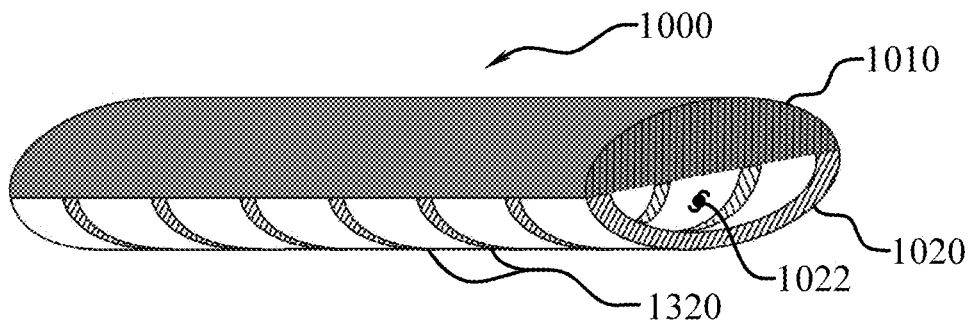

FIG. 101 is a partial perspective view of an embodiment of the leash;

FIG. 102 is a partial perspective view of an embodiment of the leash;

FIG. 103 is a partial perspective view of an embodiment of the leash;

FIG. 104 is a partial perspective view of an embodiment of the leash;

FIG. 105 is a partial perspective view of an embodiment of the leash;

FIG. 106 is a partial perspective view of an embodiment of the leash;

FIG. 107 is a partial perspective view of an embodiment of the leash;

FIG. 108 is a partial perspective view of an embodiment of the leash; and

Figure 109:
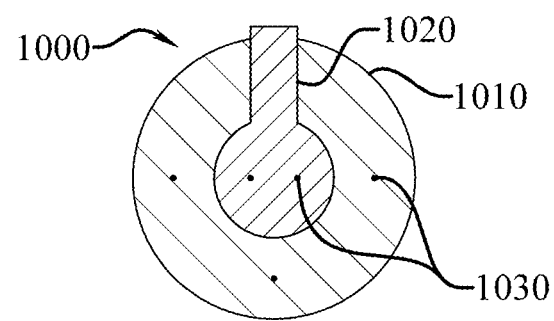

FIG. 109 is a cross-sectional view of a portion of the leash.

These drawings are provided to assist in the understanding of the exemplary embodiments of the presently disclosed hangar entrapment system, as described in more detail below and should not be construed as unduly limiting the hangar entrapment system. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The dog training leash (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Training a dog can be challenging and many different systems and methods have been developed to aid the dog trainer in their task. One of these methods is the use of a slip lead leash. Unlike regular leashes that fasten onto buckle collars, slip lead leashes are designed as a loop. A portion of leash is fed through a ring on the other end, thereby creating a contractible loop. After which, the slip lead loop is placed around the dog's neck. As a result, the dog is now ready for training. A trainer gives the slip lead leash a slight tug to correct a dog's behavior. When the leash is tugged, the slip collar will contract around the dog's neck and apply pressure as the dog tries to pull or strain against the leash. It allows for a method of aversion training designed to teach the dog behavior that is not acceptable.

Unfortunately, slip lead leashes have some serious issues that can lead to physical injury, and even death, to the dogs that they are used on. With proper placement of the slip lead leash around an animal's neck the dangers of injury or death are reduced. The proper placement of a slip lead leash is high on the animal's neck just behind the ears and jaw line of the animal, with the other end of the leash in the handler's hand. However, when a typical slip lead leash is put into actual practice, slip lead leashes are hard to keep in proper placement on a dog's neck and often slip downward into a dangerous position when a dog lunges forward, after which the slip lead leash can physically harm the dog. In addition to the physical harm that a typical slip leash can cause, the leash slipping into lower position on the dog's neck expands the slip lead leash's collar loop opening from which a dog can then escape.

Pre-existing slip lead leashes remain a valuable training tool, however they leave much to be desired. The current invention seeks to remedy the short coming found in prior art slip lead leashes in numerous manners, including selectively controlling the grip, movement, and/or interaction on various surfaces of the leash (100), which improves proper positioning on the neck, the ability to stay on the neck in the proper position, improved feedback both to the trainer and the animal, and provides a visual indication of proper orientation, all while not negatively influencing the benefits associated with slip leash training.

Figure 78:
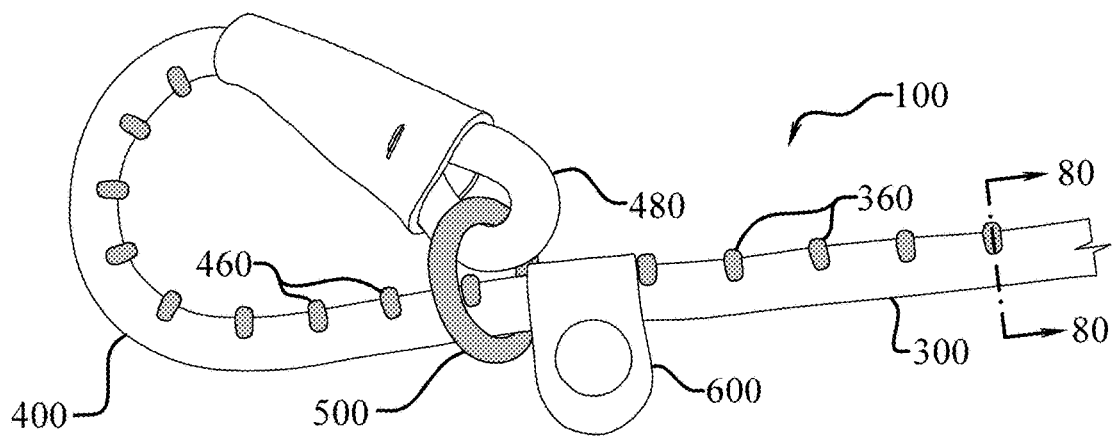
FIG. 78 is partial perspective view of an embodiment of the leash, not to scale.
Figure 81:
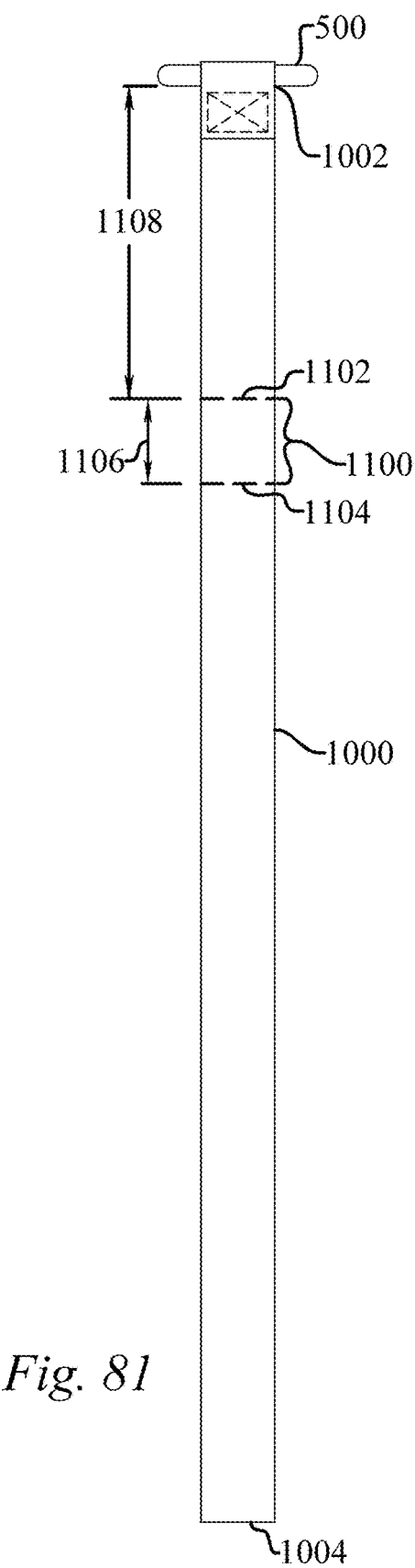
FIG. 81 is a plan view of an embodiment of the leash.
Figure 82:
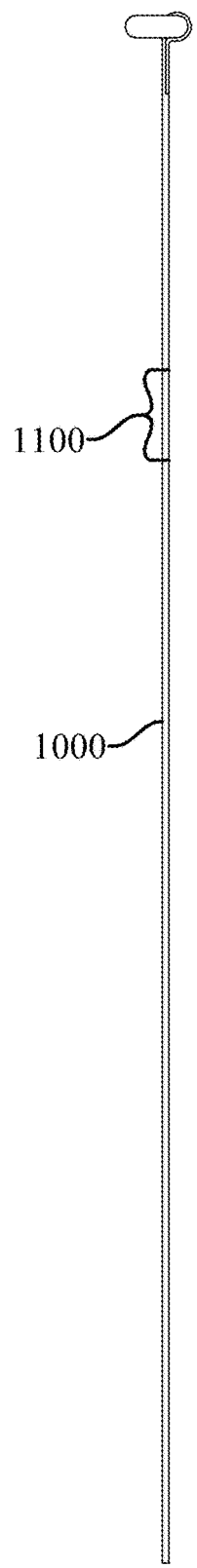
FIG. 82 is a side view of an embodiment of the leash.
Figure 88:
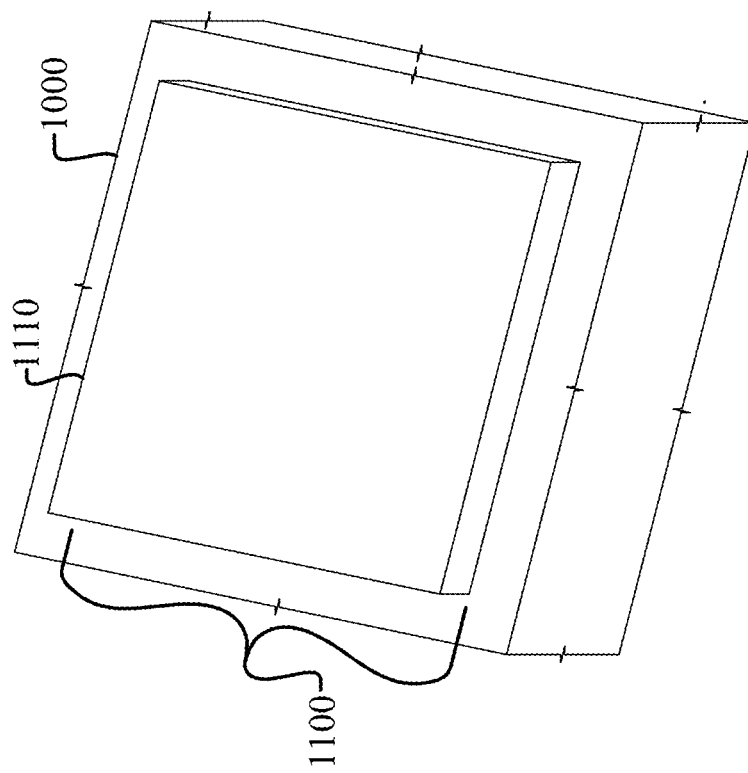
FIG. 88 is a partial perspective view of an embodiment of the leash material property differential region.
Figure 94:
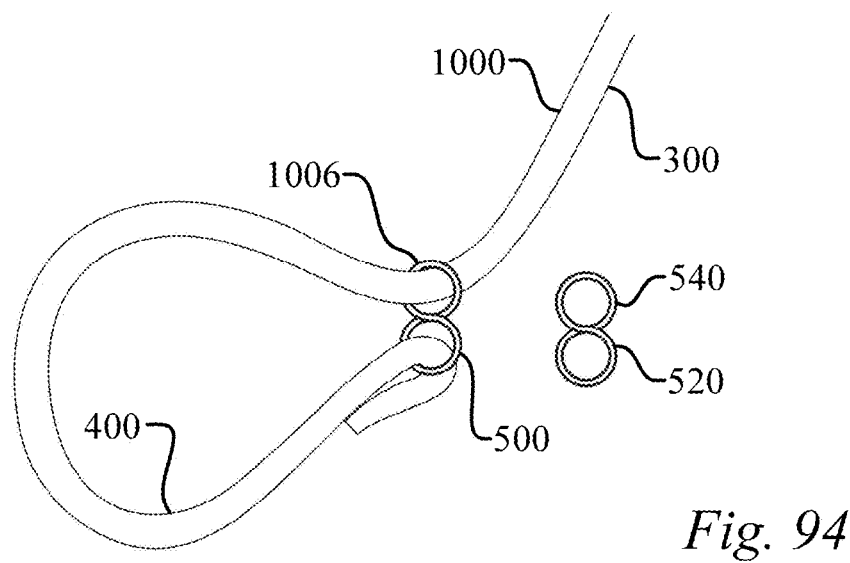
Figure 95:
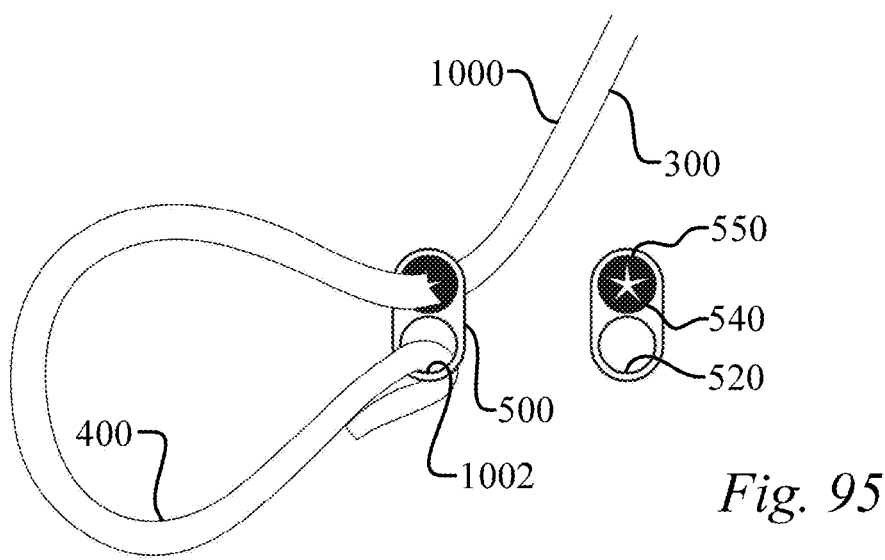
Figure 96:
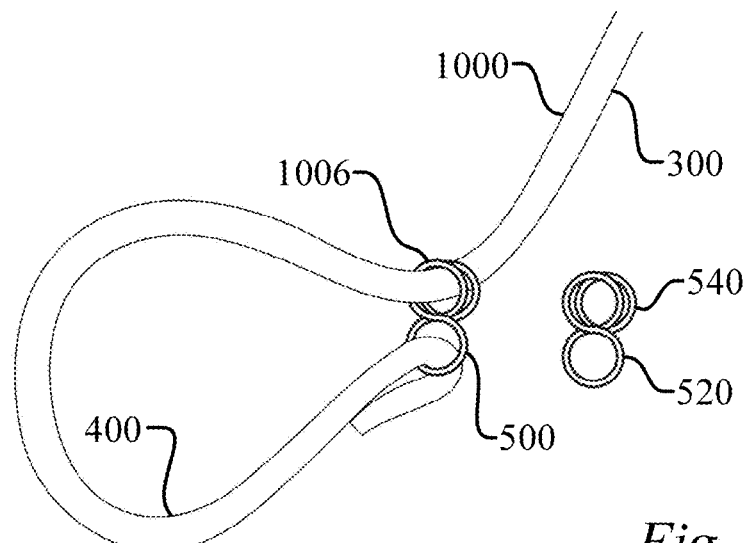
Figure 97:
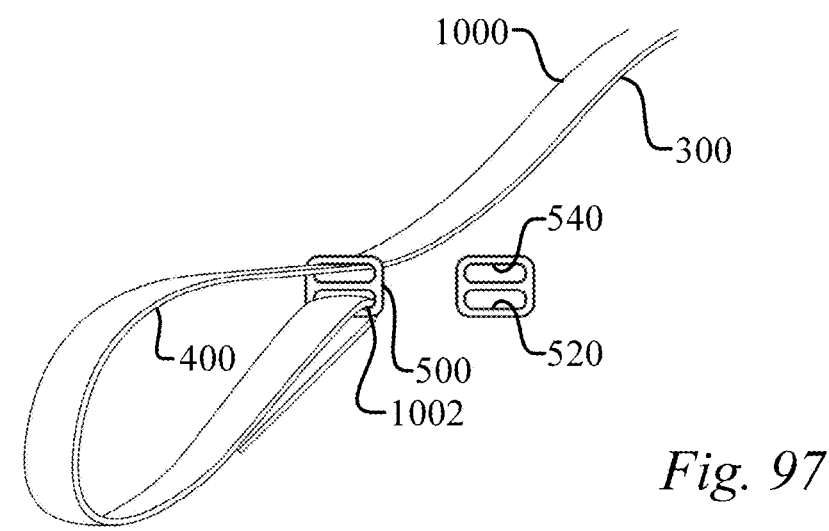
Figure 99:
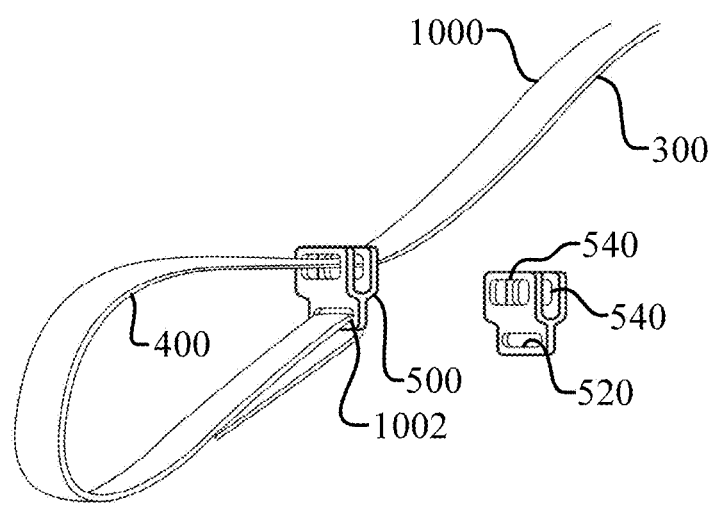

First it is important to lay out some preliminary nomenclature with respect to FIGS. 81-86. The leash (100) may include a ring (500) formed with a ring aperture (520), seen in FIG. 91. With reference now to FIG. 81-82, the leash (100) includes a flexible body (1000), abbreviated FB, having a FB first end (1002) and a FB second end (1004). The FB first end (1002) is attached to the ring (500), and the FB second end (1004) may be looped over and attached to the flexible body (1000) to form a grip (200), or may be attached to a grip (200), or may be free as shown. A collar (400) is formed by the portion of the flexible body (1000) between the first end (1002) and a pass-though point (1006), seen in FIG. 94, where the flexible body (1000) first enters the ring aperture (520) thereby defining a collar opening. The ring (500) may contain a single aperture (520), or multiple ring apertures including a secondary ring aperture (540) as illustrated in FIG. 94. A lead (300) formed by the portion of the flexible body (1000) between the ring (500) and the second end (1004). A stop (600), seen in FIG. 78, is repositionably engaged with the flexible body (1000) between the ring (500) and the second end (1004), whereby the stop (600) cannot pass through the ring aperture (520) and permitting the flexible body (1000) to pass through the ring aperture (520) in a tightening direction thereby reducing the collar opening and defining an opening distance along the flexible body (1000) between the first end (1002) and the pass-through point (1006), while preventing the flexible body (1000) from passing through the ring aperture (520) in a loosening direction, opposite the tightening direction. Further, a separate distinct ring (500) is not required in some embodiments, as seen in FIGS. 101-102, whereby the flexible body (1000) may be looped and attached to itself to create a ring (500). The embodiments of FIGS. 96 and 99 include at least two secondary ring aperture (540), which in a further embodiment are offset from one another such that their centers are not aligned. In one such embodiment the offset is at least 15% of a maximum cross-sectional dimension of the flexible body (1000), and at least 25%, 35%, and 45% in further embodiments. Such offsets may serve to eliminate the need for a separate stop (600). Such secondary ring aperture (540) embodiments eliminate interaction of the flexible body (1000) upon itself, thereby reducing wear and tear on the flexible body (1000) and improving the feedback to the handler of a dog's impending movements, as well as feedback of the handler's corrective actions to the dog. The Y-shaped ring (500) of FIG. 99 has improved tightening, loosening, wear, and feedback characteristics.

Figure 98:
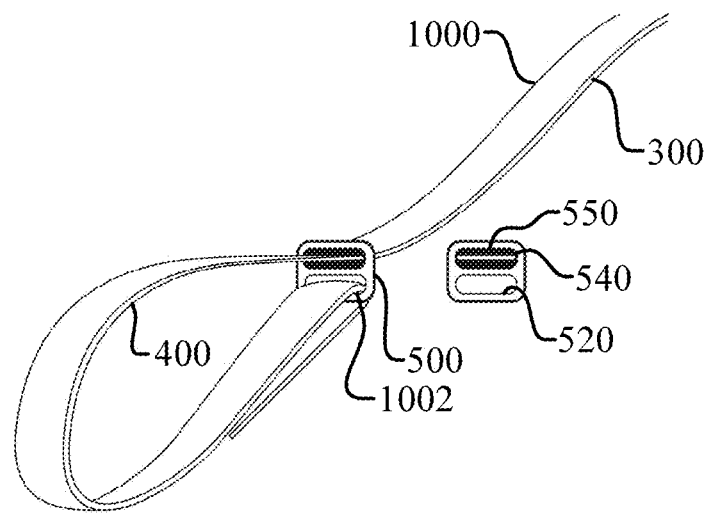
Figure 100:
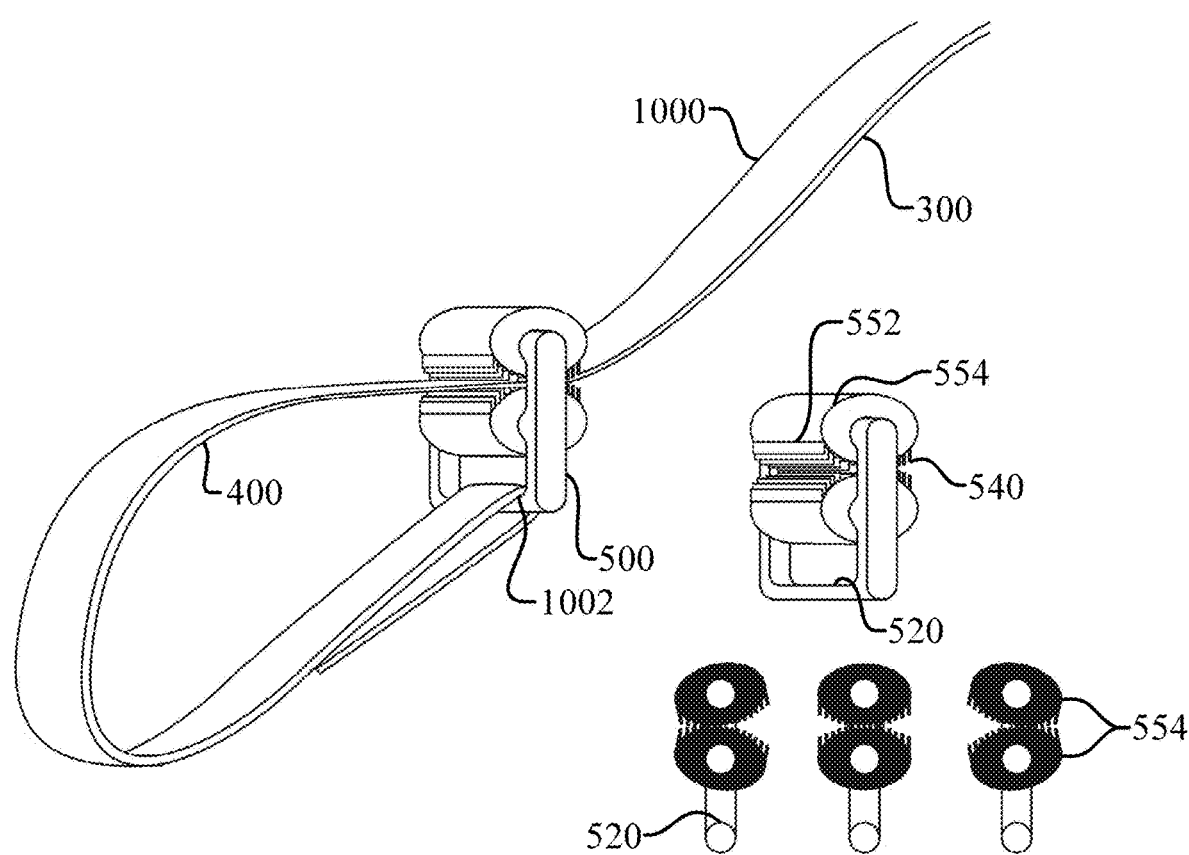

As seen in FIGS. 95, 98, 100, and 102, the ring (500) may include a ring engager (550), which in the embodiment of FIG. 102 includes at least two flapper projections, which may serve the function of the stop (600). A further embodiment includes at least four flapper projections that take the form of slits when not deflected, yet deflect when the flexible body (1000) is fed through the slits. The embodiment of FIG. 102 includes six flapper projections created by three slits, which in one embodiment are equally spaced radially. The embodiment of FIG. 95 includes five flapper projections. Thus, one embodiment has at least 3 flapper projections, while further embodiments have at least 4, at least 5, at least 6, and at least 7; while a further series of embodiments limits the number of flapper projections to no more than 14, and no more than 12, 10, and 8 in further embodiments. The embodiment of FIG. 98 illustrates a ring engager (550) that does not form separate flapper projections, rather it reduces the size of the aperture to an engager aperture having a minimum engager aperture dimension that is equal to, or less than, a minimum cross-sectional dimension of the flexible body (1000), but is deformable to still permit passage of the flexible body (1000) when subjected to a tightening axial load, yet require a loosening axial, in an opposite direction, that is greater than the tightening axial load in order to enlarge the collar (400). The ring engager (550) may include at least one pivoting or rotating engager surface (552), which pivots or rotates about an engager mount (554), as seen in FIG. 100, and may be biased via a spring or simply via the material and the engager mount (554), thereby creating a secondary ring aperture (540). Such a configuration creates a locking ring engager (550) that allows passage of the flexible body (1000) in the tightening direction but automatically prevents passage of the flexible body (1000) in the loosening direction and thus preventing enlargement of the collar (400) until the user manually positions the engager surface (552) to permit movement of the flexible body (1000) in the loosening direction.

This introductory disclosure is necessary to define certain regions on the flexible body (1000), which helps put the rest of the disclosure into perspective. Specifically, the flexible body (1000) may have a leash material property differential region (1100), abbreviated MPDR and seen in FIGS. 81-82, a leash contrast region (1200), abbreviated CR and seen in FIGS. 83-84, and/or a leash grip enhancement region (1300), abbreviated GER and as seen in FIGS. 85-86, all of which will be disclosed in detail. The leash material property differential region (1100) will be described at a high level first.

The leash material property differential region (1100) has a differential region exposed surface area, a MPDR first end (1102), a MPDR second end (1104), a MPDR offset (1108) measured along the longitudinal axis of the leash (100) from the FB first end (1002) to the MPDR first end (1102), and a MPDR length (1106) measured along the longitudinal axis of the leash (100) between the MPDR first end (1102) and the MPDR second end (1104). It is important to note that the MPDR offset (1108) may be zero, meaning that the MPDR first end (1102) coincides with the FB first end (1002). In one embodiment the MPDR length (1106) is at least 2", and additional embodiments will be disclosed later.

For the sake of completeness, similar elements of the leash contrast region (1200), of FIGS. 83-84, and the leash grip enhancement region (1300), of FIGS. 85-86, will now be disclosed. Thus, the leash contrast region (1200) has a contrast region exposed surface area, a CR first end (1202), a CR second end (1204), a CR offset (1108) measured along the longitudinal axis of the leash (100) from the FB first end (1002) to the CR first end (1202), and a CR length (1206) measured along the longitudinal axis of the leash (100) between the CR first end (1202) and the CR second end (1204). It is important to note that the CR offset (1208) may be zero, meaning that the CR first end (1202) coincides with the FB first end (1002). In one embodiment the CR length (1206) is at least 2", and additional embodiments will be disclosed later. Similarly, the leash grip enhancement region (1300), of FIGS. 85-86, has an enhancement region exposed surface area, a GER first end (1302), a GER second end (1304), a GER offset (1308) measured along the longitudinal axis of the leash (100) from the FB first end (1002) to the GER first end (1302), and a GER length (1306) measured along the longitudinal axis of the leash (100) between the GER first end (1302) and the GER second end (1304). It is important to note that the GER offset (1308) may be zero, meaning that the GER first end (1302) coincides with the FB first end (1002). In one embodiment the GER length (1306) is at least 2", and additional embodiments will be disclosed later. As will become self-evident upon reading the disclosure, all of the disclosure, including areas and relationships, relating to (A) the leash material property differential region (1100) of FIGS. 81-82, applies equally to the leash contrast region (1200) of FIGS. 83-84, and the leash grip enhancement region (1300) of FIGS. 85-86, (B) the leash contrast region (1200) of FIGS. 83-84, applies equally to the leash material property differential region (1100) of FIGS. 81-82, and the leash grip enhancement region (1300) of FIGS. 85-86, and (C) leash grip enhancement region (1300) of FIGS. 85-86, applies equally to the leash contrast region (1200) of FIGS. 83-84, and the leash material property differential region (1100) of FIGS. 81-82. As will be disclosed throughout, each of the regions may introduce performance benefits, some with respect to just the handler, or user, and some with respect to both the animal and the handler.

Now, turning attention back to the leash material property differential region (1100) of FIGS. 81-82, the leash material property differential region (1100) includes a first exposed material portion, having a first material exposed surface area and being formed of a first material of a plurality of first material properties, and a second exposed material portion, having a second material exposed surface area and formed of a second material having a plurality of second material properties, wherein the first material is different than the second material.

The flexible body (1000), the first material, the leash (100), or the individual sections thereof, may be made of, but not limited to: natural materials, synthetic materials, leather, braided wire, or a combination thereof. Natural materials include, but are not limited to, hemp, linen, cotton, coir, jute, straw, and sisal. Synthetic materials include, but are not limited to, polypropylene, nylon, polyesters, polyethylene, aramids, and acrylics. In one specific embodiment a portion of the flexible body (1000), the first material, the leash (100), or the individual sections thereof, is formed of polyester webbing, polypropylene webbing, or nylon webbing. In another embodiment a portion of the flexible body (1000), the first material, the leash (100), or the individual sections thereof, is formed of kermantle rope, which means that it has a core (or kern) and outer sheath (or mantle), often referred to as parachord. In one such embodiment the core is formed of at least 3 strands, and the sheath is formed of at least 16 woven strands; while in a further embodiment the core is formed of at least 5 strands, and the sheath is formed of at least 24 woven strands; and in an even further embodiment the core is formed of at least 7 strands, and the sheath is formed of at least 32 woven strands. Benefits of such synthetic materials include rot, mildew, abrasion, and UV fade resistance, as well as their quick drying mature. The second material may include, but is not limited to, elastomers, natural rubber rubbers, synthetic rubbers, silicone materials, latex materials, polymers, plastics including thermoplastics and thermosets, fluoropolymers (PTFE, PFA, FEP, and related chlorofluorocarbon polymers), polyimide, polyetheretherketone (PEEK), polyetherketoneketone (PEKK), nylon (polyamide), acetal, celcon, polyester, polycarbonate, olefins, polyethylene, polypropylene, HMWPE, UHMWPE, polystyrene, polyvinyl chloride, or any combination, and/or mixture, thereof, including films, tapes or adhesive layers, silicon based caulk, and fabric/textile paints including, but not limited to, acrylic paint and oil based paint, and mixtures and combinations thereof. In one embodiment the flexible body (1000), the first material, and/or the leash (100) overall, has a minimum tensile strength of at least 100 lbf, and in another embodiment the maximum elongation to break is no more than 30%. In another embodiment the flexible body (1000), the first material, and/or the leash (100) overall, has a minimum tensile strength of at least 200 lbf, and in another embodiment the maximum elongation to break is no more than 25%. In still a furhter embodiment the flexible body (1000), the first material, and/or the leash (100) overall, has a minimum tensile strength of at least 300 lbf, and in another embodiment the maximum elongation to break is no more than 20%.

Reference to exposed surface area is used throughout for convenience given that the size of the collar (400) is adjustable, and therefore the length of the lead (300) may change. Further, exposed surface area is a quantity that is easy to measure and still allows specification of relationships and ranges that offer unique performance benefits, and are more than simply optimizing, maximizing, or minimizing a single variable, as will be disclosed in more detail later. For simplicity, exposed surface area of the flexible body (1000), and/or a woven or webbing portion of the leash (100), is simple the area associated with the simple surface and does not include area associated with the nooks and crannies of a woven or webbing portion, rather just length multiplied by width or thickness, or similar calculation for round or curved cross-sectional shapes.

In one embodiment the first material exposed surface area is greater than the second material exposed surface area. As explained in more detail later, the exposed surface areas would be the same if the flexible body (1000) was constructed to two layers attached to one another with each layer having the same cross-sectional shape. In another embodiment the first material exposed surface area is at least 60% of the differential region exposed surface area, and the second material exposed surface area is no more than 40% of the differential region exposed surface area. While in a further embodiment the first material exposed surface area is at least 75% of the differential region exposed surface area, and the second material exposed surface area is no more than 25% of the differential region exposed surface area, and in an even further embodiment the first material exposed surface area is at least 90% of the differential region exposed surface area, and the second material exposed surface area is no more than 10% of the differential region exposed surface area. As previously noted, but worth repeating, these same surface area relationships also apply to the leash contrast region (1200) of FIGS. 83-84, and the leash grip enhancement region (1300) of FIGS. 85-86.

In one embodiment the plurality of first material properties includes a first material density, a first material static coefficient of friction, and a first material hardness, while the plurality of second material properties includes a second material density, a second material static coefficient of friction, and a second material hardness. In another embodiment the first material static coefficient of friction is different than the second material static coefficient of friction. In another embodiment the first material density is different than the second material density, and in still a further embodiment the first material hardness is different than the second material hardness.

In one embodiment the static coefficient of friction of the first material is no more than 0.30, while in another embodiment it is no more than 0.28, and no more than 0.26 and 0.24 in further embodiments. Another series of embodiments recognizes the benefits associated with a floor for the static coefficient of friction of the first material and it is at least 0.16, and at least 0.18, 0.20, and 0.22 in further embodiments. The first material also has a kinetic coefficient of friction that is no more than 0.28, while in another embodiment it is no more than 0.26, and no more than 0.24 and 0.22 in further embodiments. Another series of embodiments recognizes the benefits associated with a floor for the kinetic coefficient of friction of the first material and it is at least 0.12, and at least 0.14, 0.16, and 0.18 in further embodiments. In a further series of embodiments the coefficient differential, a measure of the static coefficient minus the kinetic coefficient, is 0.003-0.400, and 0.008-0.035 in another embodiment, and 0.012-0.260 in still a further embodiment. These ranges apply whether tested against aluminum with a surface roughness of 1.8 µm, steel with a surface roughness of 1.4 µm, or polished aluminum with a surface roughness of 0.4 µm.

Similarly, in one embodiment the static coefficient of friction of the second material is greater than the static coefficient of friction of the first material. In one embodiment it is at least 0.02 greater, while in further embodiments it is at least 0.04, 0.06, 0.08, and 0.10 greater. Further, in another embodiment the kinetic coefficient of friction of the second material is greater than the kinetic coefficient of friction of the first material. In one embodiment it is at least 0.02 greater, while in further embodiments it is at least 0.04, 0.06, 0.08, and 0.10 greater. In one embodiment the static coefficient of friction of the second material is at least 0.20, and at least 0.22, 0.24, 0.26, and 0.28 in further embodiments. Further, a series of high coefficient of friction second materials, such as latex, silicon, and various rubber compositions, have a static coefficient of friction of the second material of at least 0.30, and at least 0.32, 0.34, 0.36, and 0.38 in further embodiments and have been found to have beneficial interaction properties with the hair of most dogs and further ensure proper placement of the collar (400) on the dog's neck throughout ordinary no load training, lunges, and post-lunge slack conditions. Another series of embodiments recognizes the benefits of a cap for the static coefficient of friction of the second material and it is no more than 50% greater than the static coefficient of friction of the first material, and no more than 45% greater, 40% greater, 35% greater, 30% greater, and 25% greater in still further embodiments. The second material also has a kinetic coefficient of friction that is greater than the first material kinetic coefficient of friction, and in a further embodiment the second material kinetic coefficient of friction is greater than the first material static coefficient of friction. As with the first material, these ranges for the second material apply whether tested against aluminum with a surface roughness of 1.8 µm, steel with a surface roughness of 1.4 µm, or polished aluminum with a surface roughness of 0.4 µm.

In one embodiment the first material density is less than the second material density. In another embodiment the first material density is greater than the second material density. In still a further embodiment the first material is different than the second material, but the first material density within 25% of the second material density, and in further embodiments the first material density within 20%, 15%, 10%, and 5% of the second material density. In yet another embodiment either, or both, of the first material density and the second material density are no greater than 2.0 g/cc, and no greater than 1.8 g/cc, 1.6 g/cc, and 1.4 g/cc in additional embodiments. However, in one embodiment one of the densities is at least 2.0 g/cc, and the other is no more than 1.6 g/cc.

Referring again to FIGS. 81-82, in one embodiment the flexible body (1000) is formed of the first material and the second material is applied to the flexible body (1000) in the leash material property differential region (1100). Now it is appropriate to mention that the flexible body (1000), and thus the first material, may be thought of as the later disclosed first portions, i.e. the grip first portion (220), the lead first portion (320), and/or the collar first portion (420), which together, or individually, form a leash first portion. Similarly, the second material may be thought of at the later disclosed second portions, i.e. the grip second portion (240), the lead second portion (340), and/or the collar second portion (440), which together, or individually, form a leash second portion. Thus, one skilled in the art will have no trouble understanding how the later disclosure regarding first portions and second portions relates to the flexible body (1000), the leash material property differential region (1100), the leash contrast region (1200), and the leash grip enhancement region (1300), and the disclosed first material and second material.

Figure 87:
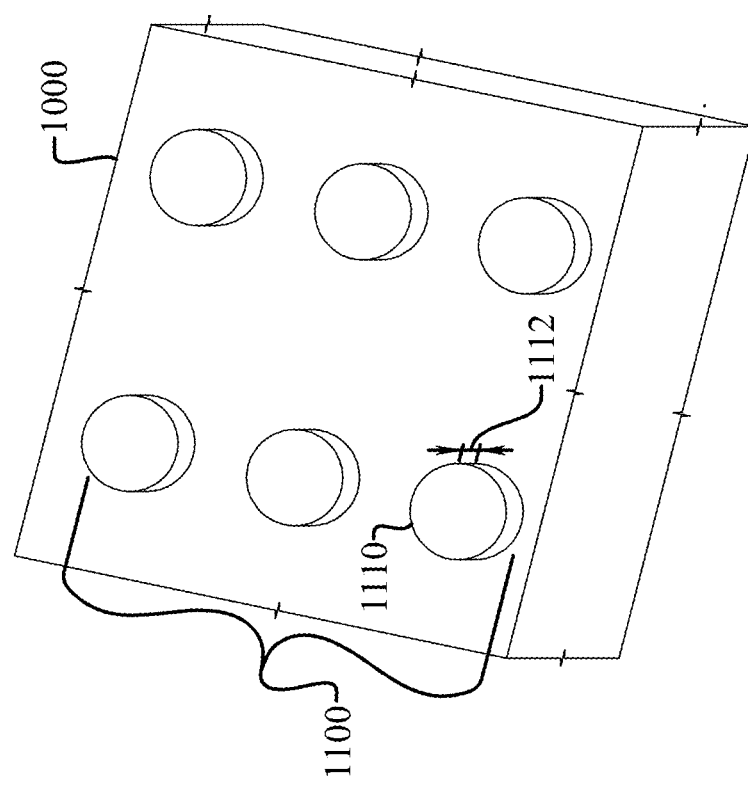
FIG. 87 is a partial perspective view of an embodiment of the leash material property differential region.
Figure 90:
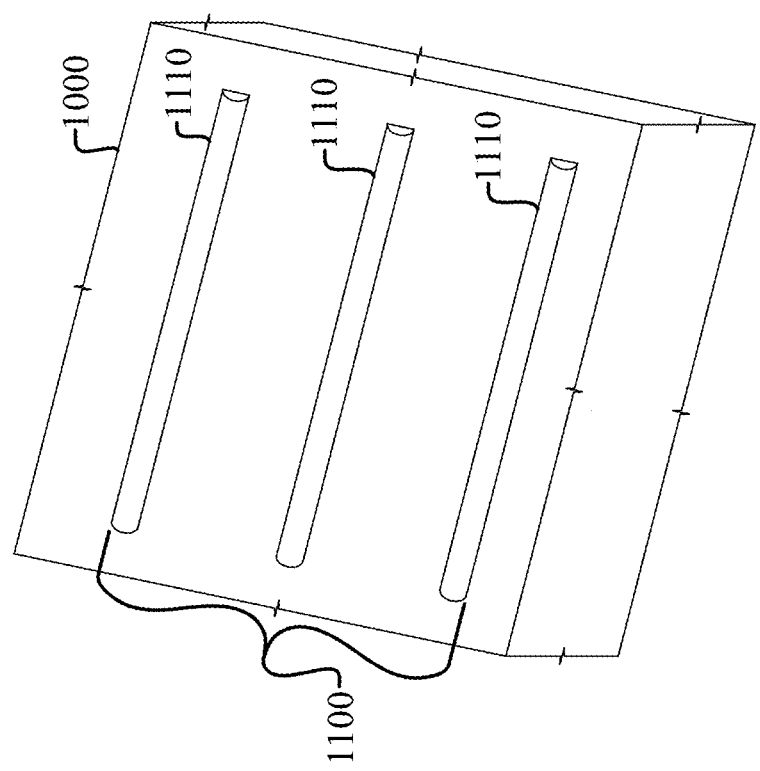
Figure 89:
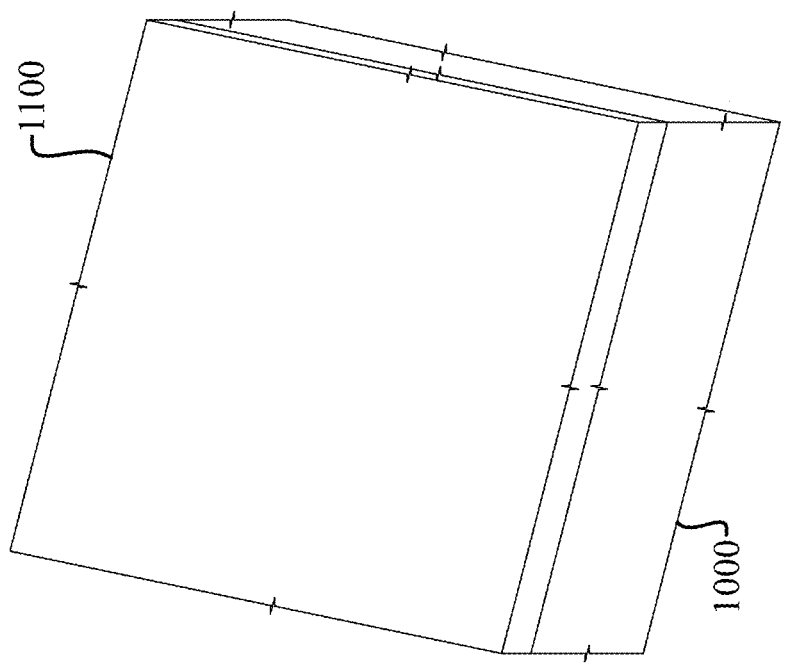

Thus, returning to the one embodiment the flexible body (1000) is formed of the first material and the second material is applied to the flexible body (1000) in the leash material property differential region (1100), the second material may be applied as a continuous layer, as seen with respect to FIGS. 1A, 31, and 88-89, and many other figures, and the grip second portion (240), the grip second portion tactile surface (260), the lead second portion (340), the lead second portion tactile surface (360), the collar second portion (440), and/or the collar second portion tactile surface (460); or the second material may be applied as discontinuous MPDR projections (1110) seen in FIGS. 87 and 90, which may be strips, dots, cones, triangles, squares, or any of the shapes later disclosed, and also as seen with respect to FIGS. 32-34, 36B-36D, 78-79, 87, and 90, and many other figures. Again, all of the disclosure is obviously applicable to the flexible body (1000), the leash material property differential region (1100), the leash contrast region (1200), and the leash grip enhancement region (1300), and the disclosed first material and second material, even without explicit reference.

Figures 36A, 36B, 36C, 36D:
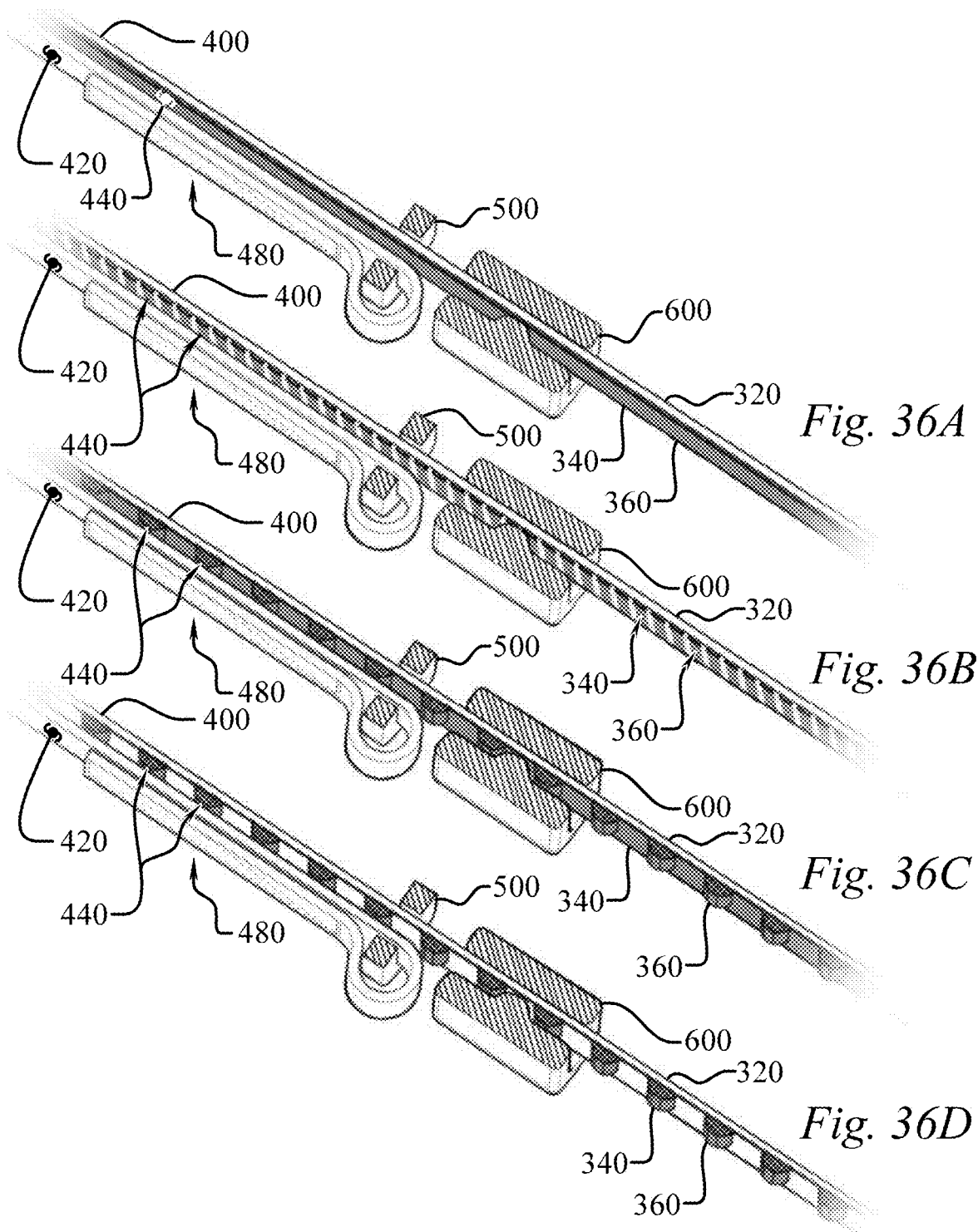
FIG. 36A is a partial cross-sectional isometric view of a leash embodiment having a ring and a sizing stop.
FIG. 36B is a partial cross-sectional isometric view of a leash embodiment having a ring and a sizing stop.
FIG. 36C is a partial cross-sectional isometric view of a leash embodiment having a ring and a sizing stop.
FIG. 36D is a partial cross-sectional isometric view of a leash embodiment having a ring and a sizing stop.

As just touched upon, in some embodiments the second material is applied and forms a plurality of MPDR projections (1110) extending from the first material, with easiest reference to FIGS. 87, 90, and 36D. In additional embodiments the projections extend a projection thickness (1112) from the first material, as easily understood to be any of the later disclosed second portion thicknesses (244, 354, 454) and/or second portion tactile surface thicknesses (274, 374, 474). Thus, all of the disclosure and relationships associated with these thicknesses is equally applicable to the leash material property differential region (1100), the leash contrast region (1200), and the leash grip enhancement region (1300), and the disclosed first material and second material, even without explicit reference. In one embodiment the projection thickness (1112) is no more than 5 mm, and in further embodiments no more than 4 mm, 3 mm, 2 mm, and 1 mm. However, in additional series of embodiments the projection thickness (1112) is at least 0.25 mm, and in further embodiments at least 0.50 mm, 0.75 mm, and 1.0 mm.

With continued reference to FIGS. 87, 90, and 36D for convenience, in one embodiment the plurality of MPDR projections (1110) includes at least 1-25 MPDR projections (1110) per inch of the MPDR length (1106), seen in FIG. 81. A further embodiment include no more than 20 MPDR projections (1110) per inch of the MPDR length (1106), and no more than 15, 10, 7, and 4 in further embodiments. Yet another embodiment includes at least 2 MPDR projections (1110) per inch of the MPDR length (1106), and at least 3 and 4 in still further embodiments. In the interest of brevity, the shape of the MPDR projections (1110) may be any of those later disclosed with respect to the lead second portion tactile surfaces (360), as they are essentially one and the same. In a further embodiment, such as that seen in FIG. 90, and numerous other figures, the plurality of MPDR projections (1110) include ribs.

While some embodiments refer to the second material being applied to the flexible body (1000), or first material, this is not required. In fact, the first and second materials may be extruded, molded, or cast to form the flexible body (1000), as seen in FIGS. 103-109, with the first material being a FB first portion (1010) and the second material being a FB second portion (1020). In fact, as seen in FIGS. 106-108, the FB second portion (1020) may be formed to create a FB second portion void (1022) in the flexible body (1000), which may be empty or filled with a lightweight flexible material. As seen in a co-molded embodiment of FIG. 109, the FB first portion (1010) and/or the FB second portion (1020) may include one or more longitudinal strength enhancement members (1030), which may include wire, rope, natural fibers, and/or synthetic fibers, that need not be continuous from end-to-end, but are continuous in one embodiment. It is important to note that the FB first portion (1010) may also be formed to create a void like the FB second portion void (1022). Further, such voids are not limited to a multiple component flexible body (1000), for instance the flexible body (1000) may be a single material formed to contain the disclosed void. In one such embodiment, the FB second portion void (1022), or any of the disclosed voids, has a void volume that is at least 5% of the total exterior volume of the leash (100), and at least 10%, 15%, 20%, and 25% in further embodiments. A further series of embodiments caps the void volume so that it is no more than 90% of the total exterior volume of the leash (100), and no more than 80%, 70%, 60%, and 50% in further embodiments. The FB second portion void (1022) may be sealed to prevent communication with the external environment, or it may be vented via at least one aperture. In embodiments having such an aperture, the total exterior volume is measured using a displacement test with such apertures sealed so that no measurement fluid enters the FB second portion void (1022). Such voids may be present only within the disclosed grip like the disclosed features of the leash grip enhancement region (1300), or the void may be present through the length of the flexible body (1000). In another embodiment, like FIGS. 106-108, the FB first portion (1010) is solid, while the FB second portion (1020) had a FB second portion void (1022).

Figure 79:
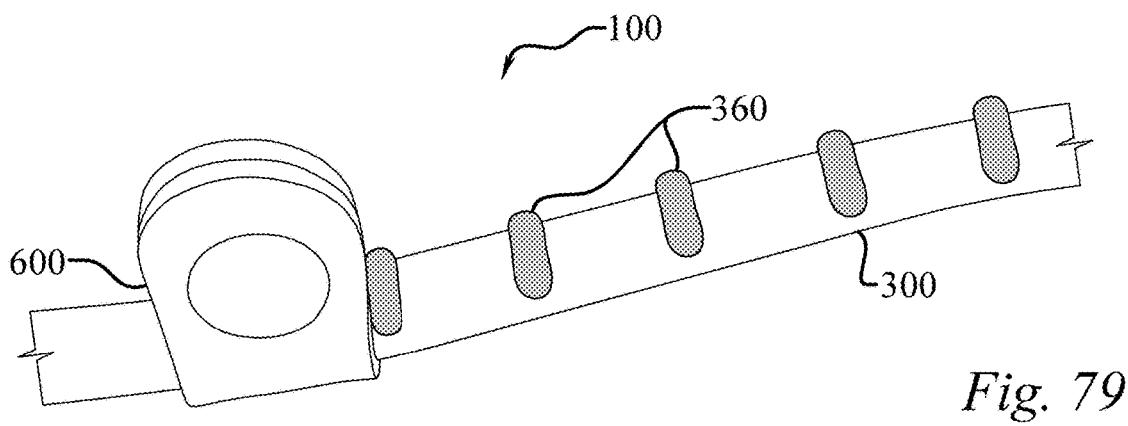
FIG. 79 is partial perspective view of an embodiment of the leash, not to scale.
Figure 91:
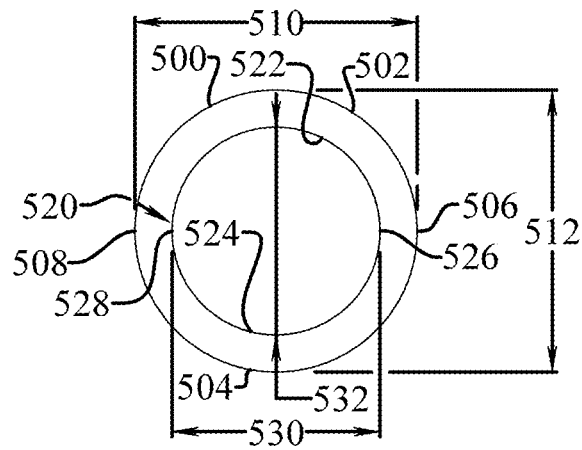
Figure 92:
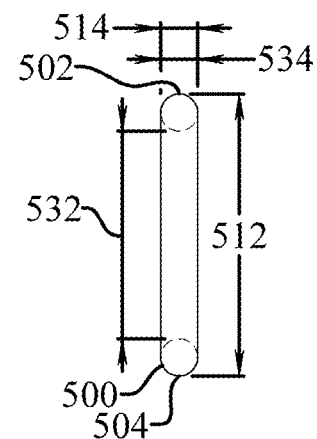
Figure 93:
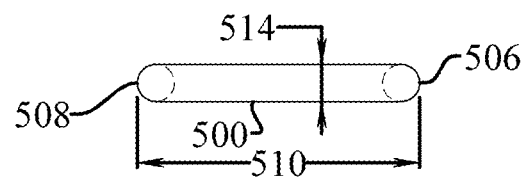

Later figures and embodiments disclose flexible body (1000) members having non-round cross-sectional shapes in great detail, even if with reference to first portions (220, 320, 420) instead of the flexible body (1000), one skilled in the art will recognize they are one in the same and disclosure for one is disclosure for all, and therefore such non-round disclosure will not be repeated here for the sake of brevity. However, as seen in many of the figures, the flexible body (1000), or any part thereof, may have a round cross-sectional shape. In one such embodiment the round cross-sectional shape has a body diameter of 0.125-0.500", while in a further embodiment the body diameter is 0.125-0.375", and 0.125-0.250" in still another embodiment. Likewise, the ring (500) is later disclosed in great detail, however it is worth presently noting that in one embodiment, as seen in FIGS. 91-93, the ring (500) is round and having a ring diameter, i.e. ring aperture width (530), that is 2-5 times the body diameter. Further, the stop (600) is later disclosed in great detail, however it is worth presently noting that in one embodiment, as seen in FIGS. 79-79, the stop (600) has a stop aperture (620), seen in FIG. 19, through which the flexible body (1000) passes, and the stop aperture (620) has a stop aperture length (632), seen in FIG. 17, that is 2-5 times the body diameter. In one such embodiment the stop (600) is formed of a material different than both the first material and the second material, and in an even further embodiment the stop (600) is formed of leather. Even a leather thickness as small as 1 mm has been found to adequately catch the edge of the disclosed protrusions or recesses and improve the performance of the leash (100). Additionally, the disclosed protrusions and recesses reduce the twisting of the flexible body (1000) on the neck, also improving the performance of the leash (100). In another embodiment, the stop aperture length (632) is no more than 150% of a distance between adjacent MPDR projections (1110). Now referring to a non-round embodiment of the ring (500), such as that seen in FIGS. 17-22, in one such embodiment the ring aperture (520) has a ring aperture height (534) and a ring aperture width (530) that is not equal to the ring aperture height (534), and the MPDR projection thickness (1112) is no more than 15% of the ring aperture height (534). Further, the stop (600) may be formed with an internal ridge (640), seen in FIG. 20, having an internal ridge height (654) that is greater than the projection thickness (1112). Additionally, in one embodiment the portion of the ring (500) that contacts the flexible body (1000) at the FP pass-through point (1006) has a surface roughness at least 0.6 µm, and at least 1.0 µm, 1.4 µm, 1.8 µm, and 2.0 µm in still further embodiments. In another embodiment the portion of the ring (500) that contacts the flexible body (1000) at the FP pass-through point (1006) may be coated with any of the materials disclosed with respect to the second material.

Now with the leash material property differential region (1100), abbreviated MPDR and seen in FIGS. 81-82, it should be easily understandable how the grip second portion tactile surface (260), the lead second portion tactile surface (360), and the collar second portion tactile surface (460) may individually, or in combinations, form the leash material property differential region (1100), and all the disclosure, performance benefits, and relationships of these surfaces apply to the leash material property differential region (1100).

Further, while the leash material property differential region (1100) includes multiple different materials, such is not required of the leash contrast region (1200), abbreviated CR and seen in FIGS. 83-84, whereby benefits are afforded via creation of a region of contrasting visual appearance, as will be explained in detail with respect to the grip first portion (220), the grip second portion (240), the lead first portion (320), the lead second portion (340), the collar first portion (420), and/or the collar second portion (440), which may individually, or in combinations, form the leash contrast region (1200), and all the disclosure, performance benefits, and relationships of these portions apply to the leash contrast region (1200).

Further, while the leash material property differential region (1100) includes multiple different materials, such is not required of the leash grip enhancement region (1300), abbreviated GER and as seen in FIGS. 85-86, whereby benefits are afforded via creation of a region of improved grip via design features incorporated in the flexible body (1000). Thus, a single material flexible body (1000) may include a leash grip enhancement region (1300) having features formed out of the same material as the flexible body (1000) and still providing the performance benefits disclosed throughout. Thus, the leash grip enhancement region (1300) includes any of the design features disclosed with respect to the grip second portion tactile surface (260), the lead second portion tactile surface (360), and/or the collar second portion tactile surface (460), only now such features are formed of the same material as the flexible body (1000), and may be integrally formed with the flexible body (1000), attached separately, or formed by having material removed from the flexible body (1000). For instance, o-rings may be fitted onto the flexible body (1000) and attached by adhesive or heat, or held in place by the tightness of the o-ring and the associated friction fit. One such friction fit embodiment allows the user to position the o-rings in their desired locations. Further, the plurality of GER recesses (1320) may be formed by material removal techniques such as milling, cutting, laser ablation/etching, and chemical material removal techniques.

Thus, the leash grip enhancement region (1300) may include a plurality of GER projections that are the equivalent of the MPDR projections (1110), only now formed of the same material as the portion of the flexible body (1000) that they project from. Likewise, the GER projections may have a GER projection thickness that is the equivalent of the MPDR projection thickness (1112). Accordingly, all of the disclosure with respect to the leash material property differential region (1100) applies to the leash grip enhancement region (1300), particularly that associated with the MPDR projections (1110), as well as the disclosure relating to the grip second portion (240), the grip second portion tactile surface (260), the lead second portion (340), the lead second portion tactile surface (360), the collar second portion (440), and/or the collar second portion tactile surface (460), which also applies to the leash material property differential region (1100) and MPDR projections (1110).

Further embodiments contain recesses as opposed to projections. Such recesses are shown in FIGS. 105, 107, 108, and 104 only with respect to the leash grip enhancement region (1300), abbreviated GER and as seen in FIGS. 85-86, but may also be present in embodiments of the leash material property differential region (1100). The leash grip enhancement region (1300) may include a plurality of GER recess (1320) having a GER recess depth, as opposed to the disclosed projections having a grip second portion thickness (244), grip second portion tactile surface thickness (274), lead second portion thickness (354), lead second portion tactile surface thickness (374), collar second portion thickness (454), and/or collar second portion tactile surface thickness (474), however all of the disclosure and relationships regarding these thicknesses apply equally to the GER recess depth. Similarly, all of the disclosure regarding the surface areas, widths (350, 370, 450, 470), and lengths (352, 372, 452, 472) apply equally to the GER recess surface area, GER width, and GER length, not illustrated individually but easily understood in light of the disclosure. Additionally, with the leash grip enhancement region (1300), abbreviated GER and as seen in FIGS. 85-86, it should be easily understandable how design features of the grip second portion tactile surface (260), the lead second portion tactile surface (360), and the collar second portion tactile surface (460) may individually, or in combinations, form the leash grip enhancement region (1300), and all the disclosure, performance benefits, and relationships of these surfaces apply to the leash grip enhancement region (1300). In one embodiment, seen in FIG. 104, the GER recess (1320) are formed in the FB second portion (1020) in the longitudinal direction of the flexible body (1000), which in embodiments such as seen in FIG. 42A are filled with another material. One such embodiment includes at least two such longitudinal recesses, whereas further embodiments include at least four, at least six, at least ten, at least fourteen, or at least sixteen, as illustrated. Each recess has a recess depth, and in one embodiment at least two of the recesses have different recess depths, while in further embodiments at least four, six, and eight of the recesses have different recess depths. Obviously such features influence the compressibility of the flexible body (1000) and therefore impact its interaction with the ring (500) and/or stop (600).

Figure 80:
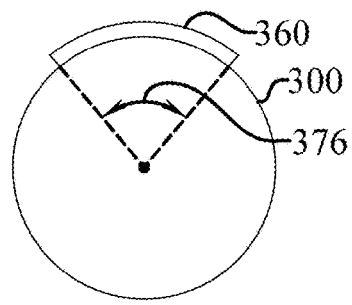
FIG. 80 is a cross-sectional view of an embodiment of the leash.

Now, with the high-level disclosure of the flexible body (1000), the leash material property differential region (1100), abbreviated MPDR and seen in FIGS. 81-82, the leash contrast region (1200), abbreviated CR and seen in FIGS. 83-84, and the leash grip enhancement region (1300), abbreviated GER and as seen in FIGS. 85-86, complete, the remainder of the disclosure, generally referring to FIGS. 1A-80, should be reviewed with an eye for the fact that is applies to these three regions even though it often makes reference to the grip (200), lead (300), and/or collar (400), because these regions may enlarge or reduce based upon the position of the ring (500) and/or stop (600), while the regions are established based upon their location with respect to the ring (500). Thus, it should go without saying that any of these regions may include all of the collar (400), or only a portion of the collar (400), likewise any of these regions may include all of the lead (300), or only a portion of the lead (400), and any of these regions may include all of the grip (200), or only a portion of the grip (200), and any combinations thereof. In a common embodiment, any of the regions includes at least a portion of the collar (400) and a portion of the lead (300); while a second common embodiment has any of the regions including all of the collar (400) and at least a portion of the lead (300); while a third common embodiment has any of the regions including at least a portion of the collar (400), at least a portion of the lead (300), and at least a portion of the grip (200).

FIGS. 1A-3 and 55-60A show an improved slip lead leash (100) embodiment having a grip (200), a lead (300), a collar (400), a ring (500) which allows the collar (400) opening size to expand and contract, and a sizing stop (600) which allows the user to set and adjustably fix the collar (400) opening size. One skilled in the art will appreciate that the grip (200), the lead (300), and the collar (400) may be formed of a continuous piece that is affixed, permanently or releasably, to the ring (500) at one end, and then is fed through an opening in the ring (500) to create the collar (400) portion, and then is looped, or folded over, at the opposite end and connected to itself, permanently or releasably, to create the grip (200) portion; however, multiple individual pieces may be attached to one another, permanently or releasably for form the leash (100), and the grip (200) may take forms other than a closed loop.

Figure 8:
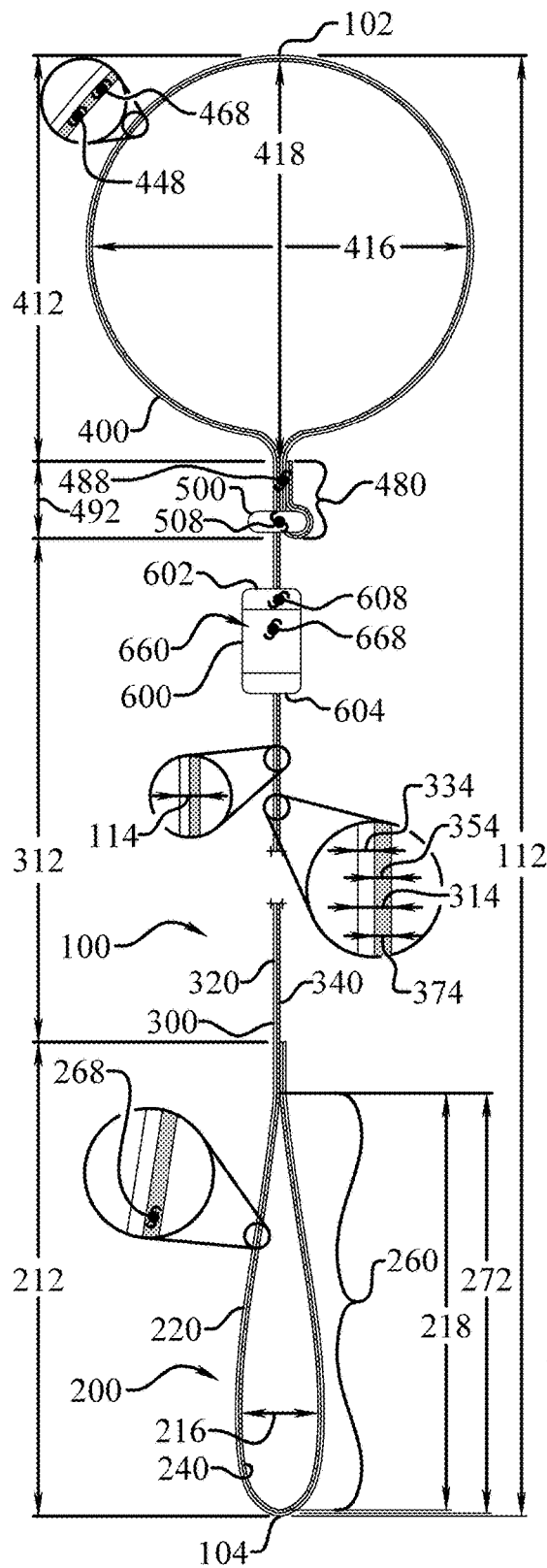
FIG. 8 is a sinistral side elevation view of a leash embodiment, not to scale.
Figure 10:
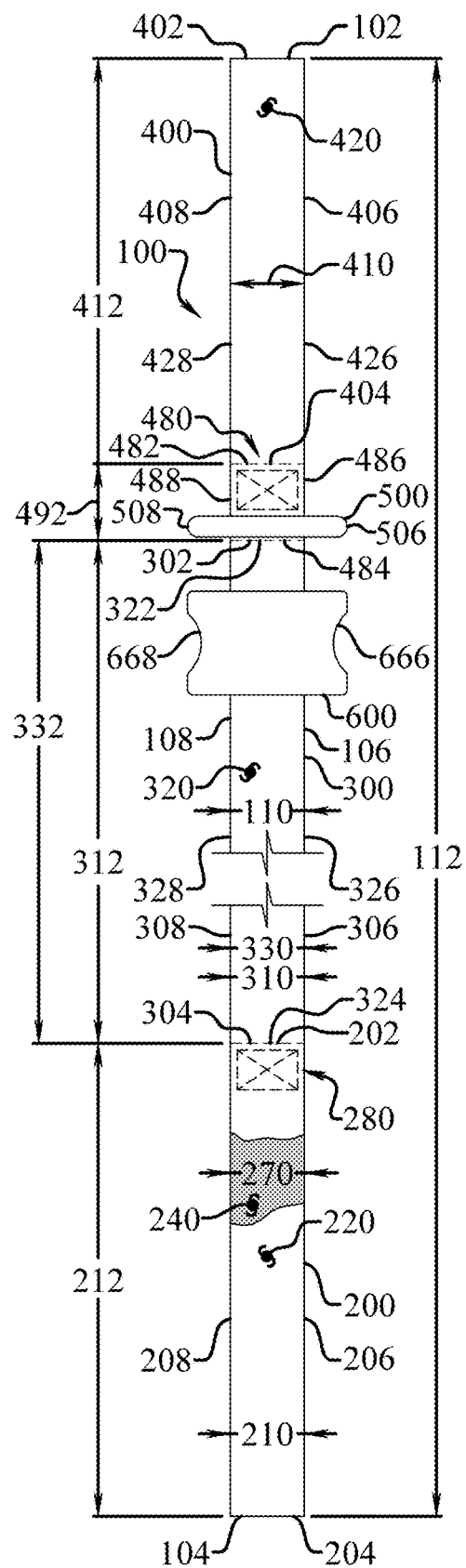
FIG. 10 is a rear side elevation view of a leash embodiment, not to scale.

As seen in FIG. 8, the leash (100) may further have a leash proximal side (102), which in some embodiments is the collar end, a leash distal side (104), which in some embodiments is the grip end, a leash dextral side (106) and a leash sinistral side (108), seen in FIG. 10, a leash width (110), defined as the distance between the leash dextral side (106) and the leash sinistral side (108), and a leash length (112), defined as the distance between the leash proximal side (102) and the leash distal side (104), and a leash thickness (114), as seen in FIG. 8. While most of the disclosure and figures illustrate a relatively flat leash profile, i.e. a rectangular cross-sectional shape, this is not required, and the leash (100) may have a round cross-sectional profile, such as the embodiments of FIGS. 78-79, or any other cross-sectional profile including, but not limited to, triangular, square, rectangular, rhombus, parallelogram, trapezoid, kite, trapezium, polygon (convex and concave, regular and irregular), circular, ellipse, oval, crescent, convex curves, and concave curves, just to name a few. Further, the cross-sectional profile need not be continuous throughout the leash (100), and thus the various sections, such as the grip (200), lead (300), and/or collar (400), may have different cross-sectional profiles and the cross-sectional profile may vary within a section.

Likewise, the leash width (110), seen in FIG. 10, may be uniform throughout the leash (100), as in the illustrated embodiments. However, the leash width (110) may vary within an individual section such as the grip (200), lead (300), and/or collar (400), or it may be constant within an individual section but vary between and of the sections. Furthermore, the leash thickness (114), shown generally in FIG. 8 and defined in more detail later, may also vary within an individual section such as the grip (200), lead (300), and/or the collar (400), or it may be constant within an individual section but vary between the sections. The leash (100), or the individual sections thereof, may be made of, but not limited to: any of the materials previously disclosed with respect to the flexible body (1000) or portions of it, natural materials, synthetic materials, leather, braided wire, or a combination thereof. Natural materials include, but are not limited to, hemp, linen, cotton, coir, jute, straw, and sisal. Synthetic materials include, but are not limited to, polypropylene, nylon, polyesters, polyethylene, aramids, and acrylics. In one specific embodiment a portion of the leash (100) is formed of polyester webbing, polypropylene webbing, or nylon webbing.

Figure 9:
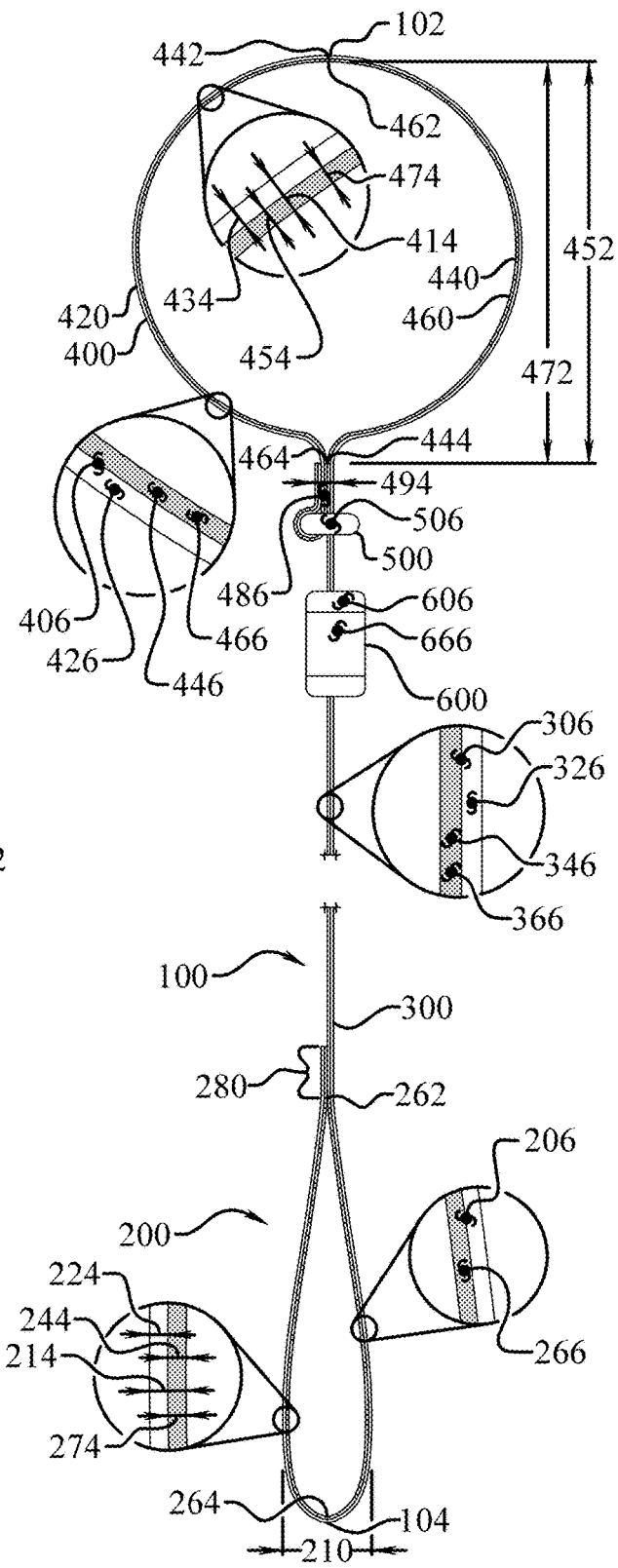
FIG. 9 is a dextral side elevation view of a leash embodiment, not to scale.

As seen in FIG. 10, the grip (200) may include a grip proximal side (202), a grip distal side (204), a grip dextral side (206), a grip sinistral side (208), a grip width (210), defined as the distance between the grip dextral side (206) and the grip sinistral side (208), a grip length (212), defined as the distance between the grip proximal side (202) and the grip distal side (204), a grip thickness (214), seen in FIG. 9, a grip opening width (216), seen in FIG. 8, and a grip opening length (218). Unless noted otherwise, with respect to the grip (200) the grip opening length (218) is the maximum length when the two primary sides are pressed flat against each other, while the grip opening width (216) is the largest diameter that fits within the grip opening. The grip length (212) may be 2 to 40 percent of the leash length (112), in one embodiment. While in another embodiment, the grip length (212) may be 5 to 30 percent of the leash length (112). In yet embodiment, the grip length (212) is less than 20 percent of the leash length (112). Additionally the grip (200) may also have a grip first portion (220), or exterior portion, having a grip first portion thickness (224), as seen in FIG. 9, a grip second portion (240), or interior portion, having a grip second portion thickness (244), and a grip securement area (280), illustrated in FIGS. 1A, and 8-11.

The grip second portion thickness (244) may be 20 to 300 percent of the grip first portion thickness (224). In another embodiment, the grip second portion thickness (244) is 75 to 200 percent of the grip first portion thickness (224). In still another embodiment, the grip second portion thickness (244) is 100 to 175 percent of the grip first portion thickness (224). In yet another embodiment, the grip second portion thickness (244) is at least 100 percent of the grip first portion thickness (224). As illustrated in FIGS. 8-11 and specifically in FIGS. 37A-42B, the grip second portion (240) may further include a grip second portion tactile surface (260) having a grip second portion tactile surface proximal side (262), a grip second portion tactile surface distal side (264), a grip second portion tactile surface dextral side (266), a grip second portion tactile surface sinistral side (268), a grip second portion tactile surface width (270), defined as the distance between the grip second portion tactile surface dextral side (266) and the grip second portion tactile surface sinistral side (268), a grip second portion tactile surface length (272), defined as the distance between the grip second portion tactile surface proximal side (262) and the grip second portion tactile surface distal side (264), and a grip second portion tactile surface thickness (274).

It is important to appreciate that the grip second portion tactile surface (260) is not necessarily independent of the grip second portion (240). A grip second portion tactile surface (260) exists when the grip second portion (240) has a different texture, hardness, and/or frictional or adhesion characteristics, later defined in detail, than that of the grip first portion (220), and as previously disclosed with respect to the leash material property differential region (1100). Thus, for example, if the grip second portion (240) is the same material as the grip first portion (220) and has the same texture, hardness, and frictional or adhesion characteristics, then the embodiment truly only has a grip second portion (240), which may be thought of as a 2-layer leash (100), namely a grip first portion (220) and a grip second portion (240), which may incorporate regions of contrasting visual appearance, as in the case of the previously disclosed leash contrast region (1200). However, if that embodiment then also has a material that has different texture, hardness, and/or frictional or adhesion characteristics than those of the grip first portion (220), and inherently the grip second portion (240) in this embodiment, then the grip second portion (240) has a separate grip second portion tactile surface (260), which is a portion of the leash material property differential region (1100). However, many embodiments have a grip second portion (240) that is formed of material having different texture, hardness, and/or frictional or adhesion characteristics than those of the grip first portion (220), in which case the grip second portion (240) and the grip second portion tactile surface (260) are one in the same and reference will generally just be made to this element as the grip second portion tactile surface (260). This same delineation is also applied to the lead first portion (320), lead second portion (340), and lead second portion tactile area (360), as well as the collar first portion (420), collar second portion (440), and the collar second portion tactile surface (460), as well as a generic leash material property differential region (1100), as previously disclosed, that is not tied to a location within one of the three main sections, namely the grip (200), lead (300), and/or collar (400), as well as a leash contrast region (1200), as previously disclosed and will be explained in more detail later.

The grip second portion tactile surface width (270) attributes of the grip second portion tactile surface (260) allow an increase in tactile feedback between the grip (200) and the user's hand, thereby decreasing risk of rope burns caused by a slipping grip (200) in a trainer's hand, typically upon lunging or pulling by the animal. The grip second portion tactile surface (260) material, as well as any tactile surface or area disclosed herein including the collar second portion tactile surface (460) and the lead second portion tactile area (360), discussed later, may include, but are not limited to, the materials disclosed with respect to the flexible body (1000), the leash material property differential region (1100), elastomers, natural rubber rubbers, synthetic rubbers, silicone materials, latex materials, polymers, plastics including thermoplastics and thermosets, fluoropolymers (PTFE, PFA, FEP, and related chlorofluorocarbon polymers), polyimide, polyetheretherketone (PEEK), polyetherketoneketone (PEKK), nylon (polyamide), acetal, celcon, polyester, polycarbonate, olefins, polyethylene, polypropylene, HMWPE, UHMWPE, polystyrene, polyvinyl chloride, or any combination, and/or mixture, thereof, including films, tapes or adhesive layers, silicon based caulk, and fabric/textile paints including, but not limited to, acrylic paint and oil based paint, and mixtures and combinations thereof.

Further, the grip second portion tactile surface (260) may be created without the addition of anything to the grip first portion (220) by changing the surface finish of the grip first portion (220) such as by laser ablation of a portion of the first grip portion, melting a portion of the grip first portion (220), providing a different weave pattern on a portion of the grip first portion (220), or physically altering a portion of the weave of a portion of the grip first portion (220), such as by cutting a portion of the fibers in selected areas of the weave; which is also true of the collar second portion tactile surface (460) and the lead second portion tactile area (360), as well as the leash material property differential region (1100). Additionally, it is worth noting that any disclosure relating to the grip second portion tactile surface width (270) and the grip second portion tactile surface length (272) applies equally to the general grip second portion (240), akin to the later disclosed lead second portion width (350) and lead second portion length (352), in other words—embodiments in which the material properties do not vary between the grip first portion (220) and the grip second portion (240), as well as the leash contract region (1200) and the leash grip enhancement region (1300).

FIGS. 61, 62, 67-70 show a grip (200) that is being properly held by the dog handler's hand. Thus, a difference between the texture, hardness, and/or frictional or adhesion characteristics of the grip second portion (240) and the grip first portion (220), and/or the lead first portion (320) when held as illustrated, provides the user with instant tactile feedback as to whether the leash (100) is being properly held. Likewise, a difference in the color between the grip second portion (240) and the grip first portion (220), and/or the lead first portion (320) and/or second lead portion (340), and/or the collar first portion (420) and/or the collar second portion (440), when held as illustrated, provides the user with instant visual feedback as to whether the leash (100) is being properly held.

Figure 62:
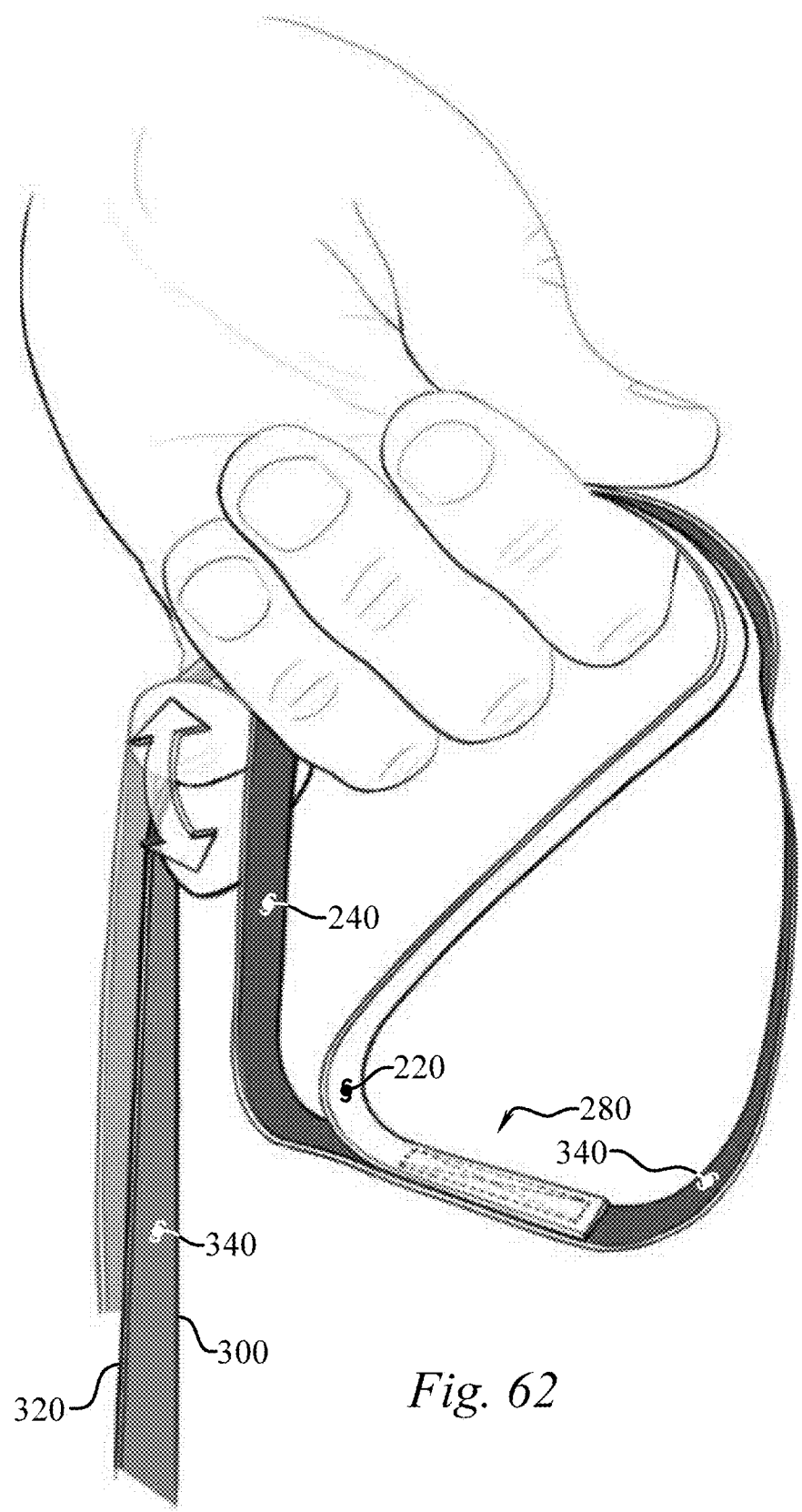
FIG. 62 is an isometric view of a leash embodiment being held in the proper manner by a human hand, not to scale.

In the illustrated position the lead (300) portion passes over the user's pinky finger with the lead second portion (340) in contact with the palm side of the pinky finger, thereby allowing better feedback of the dog's movements to the handler and the ability to easily correct with dog with only slight movement of the pinky finger, particularly in light of the improved grip associated with the lead second portion (340). Additionally, as seen in FIG. 62, the lead (300) portion passing over the user's pinky finger allows the user to also give effective feedback to the dog as well by small movements of user's pinky finger.

FIGS. 37A and 37B and 55-57B show one embodiment of a grip (200) having a grip second portion (240) that also acts as a grip second portion tactile surface (260). The grip second portion (240), and thus the grip second portion tactile surface (260), need not be continuous or completely cover the grip first portion (220), as seen in FIGS. 37A-42B, yet all the disclosed relationships may apply regardless. Likewise with respect to the lead (300) portion, the lead second portion (340), and thus the lead second portion tactile surface (360), need not be continuous or completely cover the lead first portion (320), as seen in FIGS. 43A-48B, yet all the disclosed relationships may apply regardless. And further likewise with respect to the collar (400) portion, the collar second portion (440), and thus the collar second portion tactile surface (460), need not be continuous or completely cover the collar first portion (420), as seen in FIGS. 49A-54B, yet all the disclosed relationships may apply regardless.

Now referring back to the grip (200) section and FIGS. 37A and 37B and 55-57B, in one embodiment, the grip first portion thickness (224) is 20 to 300 percent of the grip second portion tactile surface thickness (274), which is the same as the grip second portion thickness (244), as seen in FIG. 37B. At this point it is worth explaining the distinction between the grip second portion (240) versus the grip second portion tactile surface (260), which also applies to the distinction between the lead second portion (340) versus the lead second portion tactile surface (360), as well as the distinction between the collar second portion (440) versus the collar second portion tactile surface (460). In some embodiments one may think of the second portions, i.e. the grip second portion (240), the lead second portion (340), and/or the collar second portion (440), which together, or individually, form a leash second portion, as a layer attached to the associated first portions, i.e. the grip first portion (220), the lead first portion (320), and/or the collar first portion (420), which together, or individually, form a leash first portion, whether covering approximately 50% of the exterior surface area of the associated first portion, as would be the case with two equally sized layers attached to one another as seen in FIGS. 8-11, or only a portion of it, to change how the leash (100) performs or improves the use of the leash (100). In the preceding sentence "layer" is to mean any of the materials disclosed herein, but also the selective changes to the surface finish of the grip first portion (220) disclosed herein, in other words, not necessarily an independent additive material. The following examples will be discussed generally with respect to one section, but the disclosure applies equally to the grip (200) section, the lead (300) section, and/or the collar (400) section, as well as the leash material property differential region (1100), the leash contrast region (1200), and/or the leash grip enhancement region (1300), which are not tied to a location within one of the three main sections, namely the grip (200), lead (300), and/or collar (400).

Figure 1:
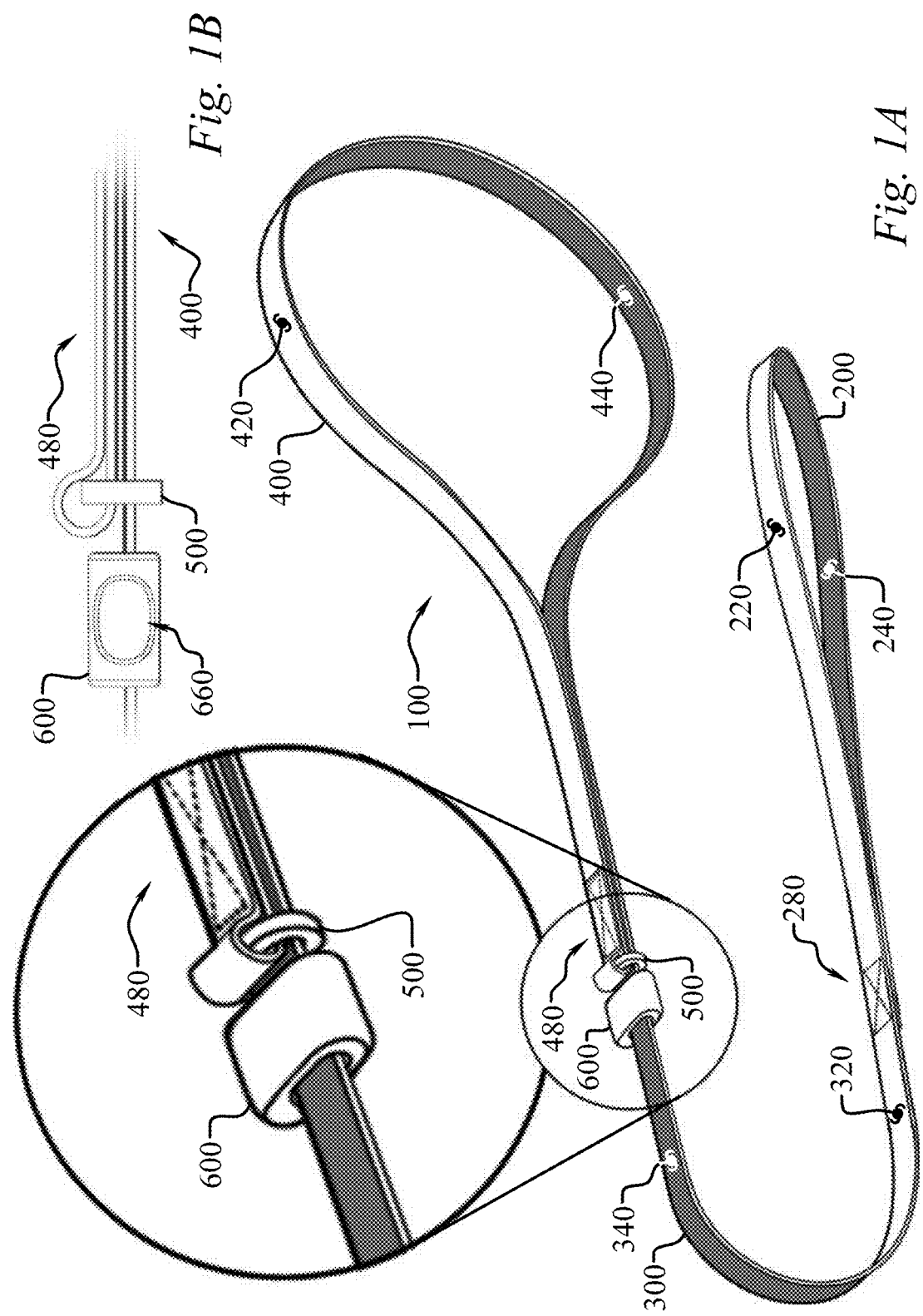
FIG. 1A is an isometric view of a grip slip lead dog leash embodiment having a magnified view, not to scale.
FIG. 1B is partial side elevation view of an leash embodiment, not to scale.
Figure 2:
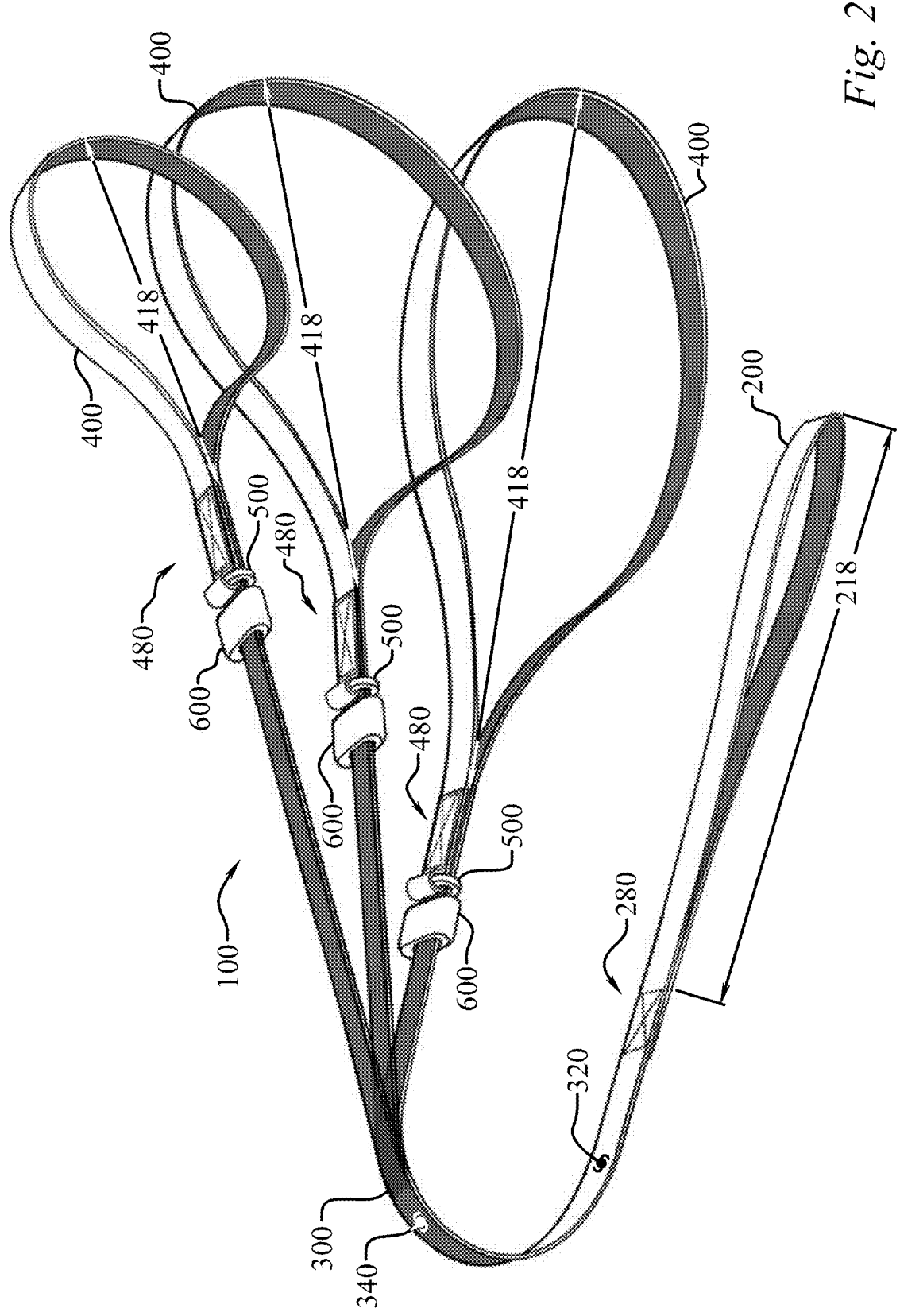
FIG. 2 is an isometric view of a leash embodiment showing the collar section in three separate states, not to scale.
Figure 3:
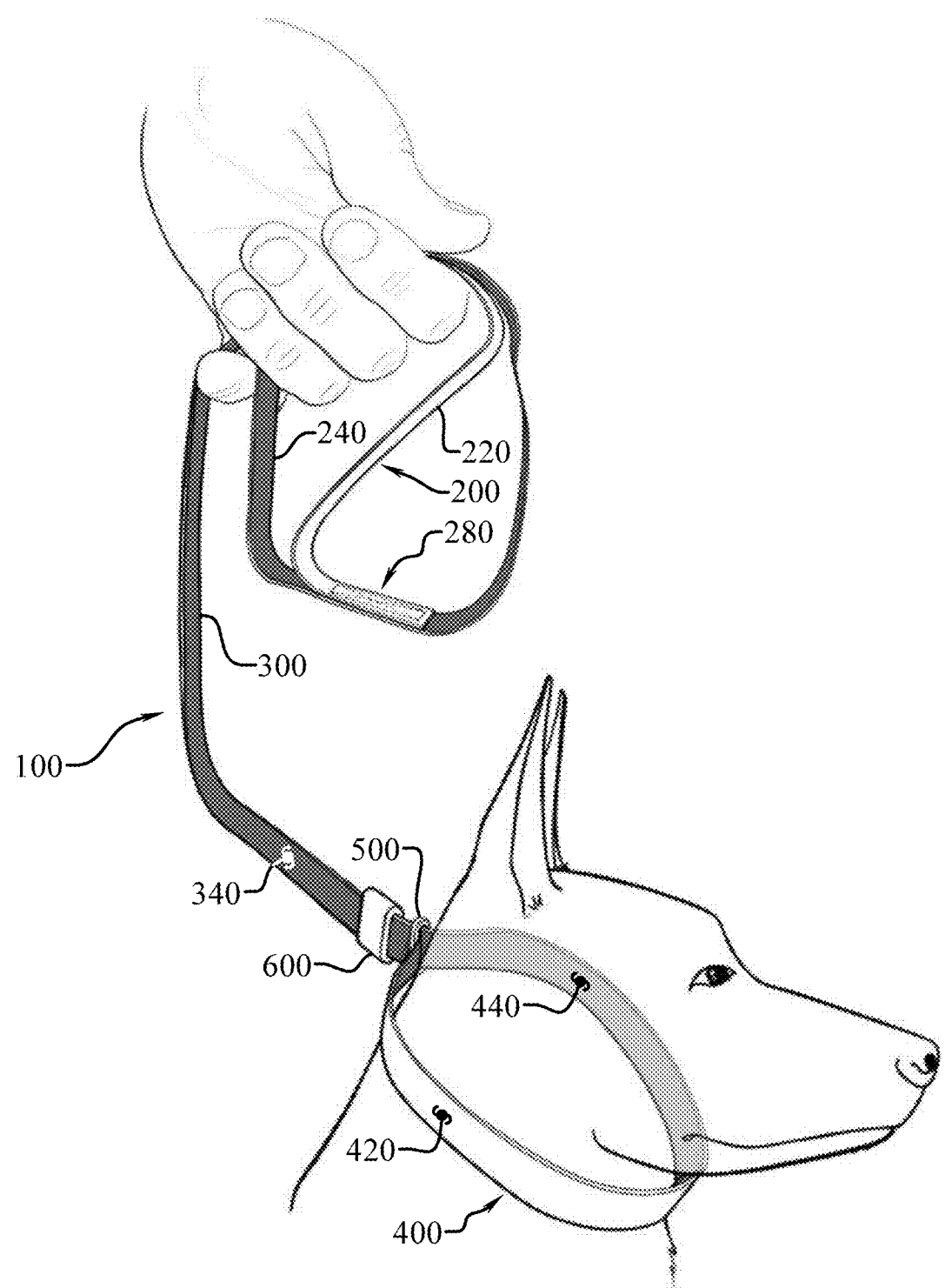
FIG. 3 is an isometric view of a leash embodiment on a dog and the grip in a human hand, not to scale.

First, with respect to improving the use of the leash (100), the lead second portion (340) may be a different color than the lead first portion (320), and thus provides a visual indication of whether it is correctly installed, meaning a visual indication of whether the leash (100) passes through the ring (500) and under the dog's neck before eventually wrapping around the neck and attaching to the ring (500), as seen in FIG. 3, or does the leash (100) pass through the ring (500) and over the dog's neck before eventually wrapping around the neck and attaching to the ring (500). Proper installation is key to effective training and is a common mistake of novice dog handlers, and the color difference provides the handler with immediate visual feedback. Thus, in this embodiment the lead second portion (340) may be a layer of paint or die, continuous or discontinuous, applied to the lead first portion (320) to result in the color difference, however in a further embodiment lead second portion (340) it is a separate layer of material attached to the lead first portion (320), which may be the same material only of a different color, texture, or weave pattern, or it may be different material altogether, and it need not cover an entire flat surface of the lead first portion (320) or an entire 180 degrees of a round lead first portion (320).

In one embodiment an entire side of the leash (100) is a different color, meaning a flat side or approximately 180 degrees of a round profile. However, it is easiest to think of the external surface area of the overall leash (100) over an established contrast region (1200) having a contrast region length (1206). For instance, in one embodiment at least 10% of the external surface area of the overall leash (100) within the contrast region length (1206) contains a contrasting color, and at least 15%, at least 25%, and at least 35% in further embodiments. A further set of embodiments limits this range to ensure usability and prevent confusion by limiting the contrasting color to no more than 55% of the external surface area of the overall leash (100) within the contrast region length (1206) contains a contrasting color, and no more than 50%, no more than 45%, and no more than 40% in further embodiments. In one such embodiment the contrast region length (1206) is at least 8", and in another embodiment it is at least 12", and at least 16", 24", and 32" in further embodiments. While a further series of embodiments caps the contrast region length (1206) to no more than 96" in one embodiment, no more than 84" in another embodiment, and no more than 72" in still a further embodiment.

In one embodiment the contrast region (1200) extends across at least two of the sections, specifically the contrast region (1200) is found on at least a portion of at least two of (a) the lead (300), (b) the grip (200), and (c) the collar (400); in a further embodiment the contrast region (1200) is found on at least a portion of the lead (300) and at least a portion of either (a) the grip (200), and (b) the collar (400); while in a further embodiment at least a portion of the lead (300), the grip (200), and the collar (400) each contain a contrast region (1200). While this paragraph describes the contrast region (1200) with respect to color, this applies equally to a contrast region (1200) created by the disclosed difference in texture, weave pattern, and/or surface finish.

One skilled in the art will recognize the relative luminance can be calculated from any color code (like HEX or RGB). Additionally, a contrast can be defined by the relative luminance of the lighter color (L1) is divided by the relative luminance of the darker color (L2) via a contrast ratio equal to (L1+0.05)/(L2+0.05). For the purposes of this application and the area percentages, the contrasting color is the one with the higher relative luminance value. In a further embodiment the contrast ratio of the contrasting color to an adjacent color is at least 3.0, while in a further embodiment the contrast ratio is at least 5.0, and at least 7.0, and at least 9.0 in additional embodiments. In a further series of embodiments the contrast ratio is 21 or less, and 19 or less in another embodiment, and 17 or less in yet a further embodiment.

Second, with respect to improving the performance of the leash (100), one, or all, of the second portions (240, 340, 440) have at least one material property different than the same material property of the associated first portion (220, 320, 440), thereby, as previously noted, creating the grip second portion tactile surface (260), the lead second portion tactile surface (360), and/or the collar second portion tactile surface (460). At the risk of repetition, but to be explicit, in one embodiment the grip second portion (240) has at least one material property different than that of the grip first portion (220) creating the grip second portion tactile surface (260), which may be continuous or discontinuous as disclosed; in another embodiment the lead second portion (340) has at least one material property different than that of the lead first portion (320) creating the lead second portion tactile surface (360), which may be continuous or discontinuous as disclosed; and in still a further embodiment the collar second portion (440) has at least one material property different than that of the collar first portion (420) creating the collar second portion tactile surface (460), which may be continuous or discontinuous as disclosed. Such differences in at least one material property selectively influence the performance of the leash (100), as will be described in more detail. However, in some embodiments the material of the second portions may be the same material of the first portions, but configured and/or arranged to influence the performance, as in the previously described grip enhancement region (1300), and as will be described in more detail later. Again, the second portion need not cover an entire flat surface of the first portion or an entire 180 degrees of a round portion.

In one embodiment an entire side of the leash (100) has at least one material property different than the same material property of the associated first portion (220, 320, 440), meaning a flat side or 180 degrees of a round profile, as in FIGS. 103-108. However, as previously noted, it is easiest to think of the external surface area of the leash (100) over an established material property differential region (1100) having a material property differential region length (1106). For instance, in one embodiment at least 10% of the external surface area within the material property differential region length (1106) contains a differing material property, and at least 15%, at least 25%, and at least 35% in further embodiments. A further set of embodiments limits this range to ensure usability and prevent confusion by limiting the material property differential region (1100) to no more than 55% of the external surface area within the material property differential region length (1106) contains a differing material property, and no more than 50%, no more than 45%, and no more than 40% in further embodiments. In one such embodiment the material property differential region length (1106) is at least 2", and in another embodiment it is at least 4", and at least 8", 12", 16", and 24" in further embodiments. While a further series of embodiments caps the material property differential region length (1106) to no more than 96" in one embodiment, no more than 84" in another embodiment, and no more than 72" in still a further embodiment.

Just as with the visual distinctions previously described, with respect to the tactile, or material property, distinctions, one may think of the second portions, i.e. the grip second portion (240), the lead second portion (340), and/or the collar second portion (440), which together, or individually, form a leash second portion, or flexible body second portion (1020), as a layer attached to the associated first portions, i.e. the grip first portion (220), the lead first portion (320), and/or the collar first portion (420), which together, or individually, form a leash first portion, or flexible body first portion (1010), whether covering approximately 50% of the associated first portion, as would be the case with two equally sized layers attached to one another as seen in FIGS. 8-11, or only a portion of it, to change how the leash (100) performs or improves the use of the leash (100). The following examples will be discussed generally with respect to one section, but the disclosure applies equally to the grip (200) section, the lead (300) section, and/or the collar (400) section.

First, a high-level discussion of the second portions will be made with reference to the collar (400), however this discussion applies equally to the lead (300) and the grip (200). For example, FIGS. 36A-36D illustrate embodiments of the second collar portion (440) and the lead second portion (340), which are also applicable to the grip second portion (240), seen in FIGS. 38A-42B, and generally with respect to the material property differential region (1100). With reference again to FIGS. 36A-36D, it is clear that the attributes of the first collar portion (420), the second collar portion (440), the lead first portion (320), and the lead second portion (340) play significant roles in the functioning of the sizing stop (600), the ring (500), as well as how the leash (100) interacts with the ring (500) and/or stop (600), and the second collar portion (440), as how the second collar portion (440) interacts with the neck, as well as hair, of different breeds of dogs. Additionally the size and design of the ring (500) and sizing stop (600), as well as how they interact with the other portions of the leash (100) significantly impact the performance of the leash, as does the disclosed widths, lengths, and thicknesses. These variables, and the associated relationships, are essential to improving the performance of the leash (100), often balancing competing interests, are much more than simply maximizing or minimizing a single variable, and are far more than optimizing a variable, as the combination of multiple variables and/or relationships has been found to produce unexpected performance benefits.

For instance, in the embodiment of FIG. 36A the shows a continuous lead second portion (340) and a continuous second collar portion (440) applied to the lead first portion (320) and the first collar portion (420), accounting for approximately 50% of the surface area of the leash (100). As previously noted, this is an example where the second portions are the same material as the first portions, and in some embodiments presenting the disclosed contrast region. Whereas, when the second portions have different material properties than the first portions, they become tactile surfaces such as a lead second portion tactile surface (360) and/or a collar second portion tactile surface (460), hence the dual labeling of elements 340 and 360, as well as elements 440 and 460, within FIGS. 36A-36D. Additional embodiments and relationships are disclosed elsewhere herein.

Figure 50A:
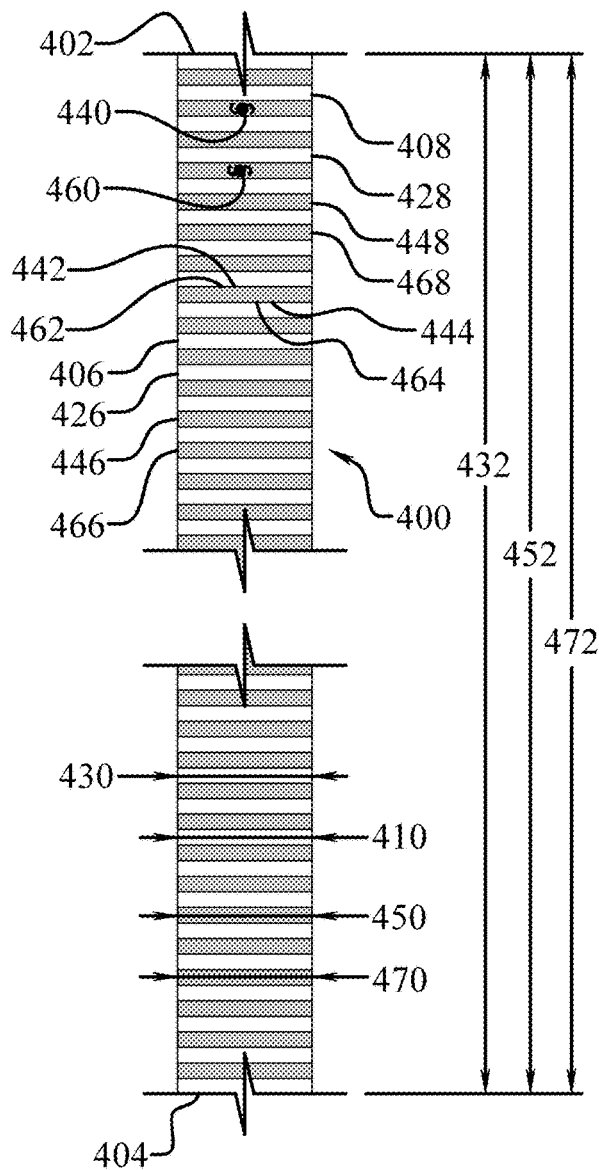
FIG. 50A is a partial elevation view of a collar embodiment showing the collar second side, not to scale.
Figure 50B:
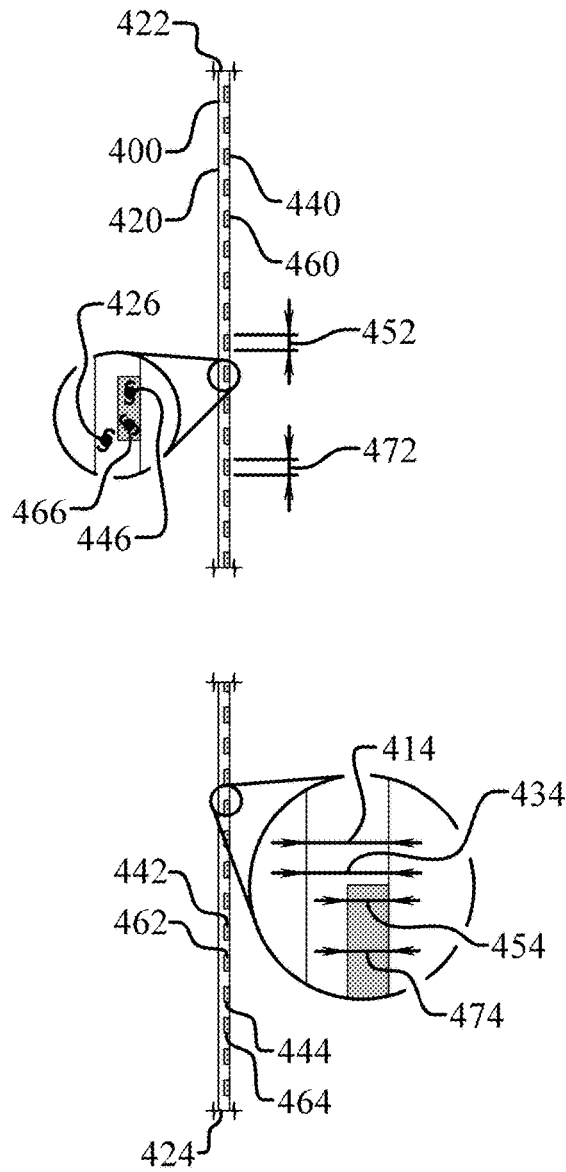
FIG. 50B is a partial dextral side elevation view of a collar embodiment having magnified views, not to scale.
Figure 51A:
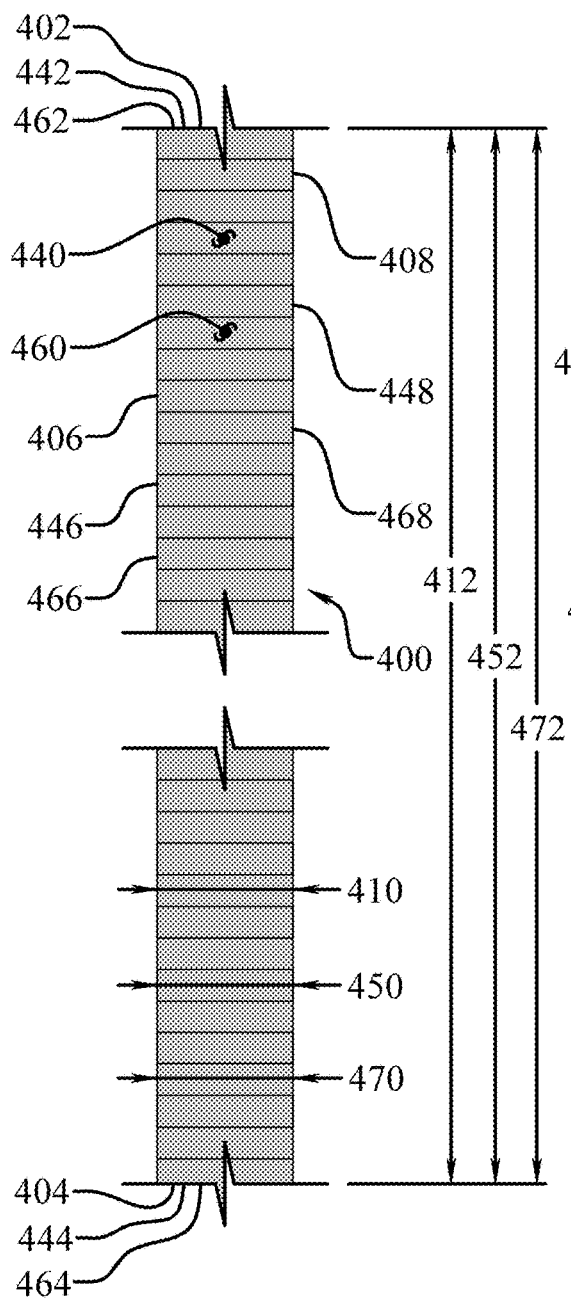
FIG. 51A is a partial elevation view of a collar embodiment showing the collar second side, not to scale.
Figure 51B:
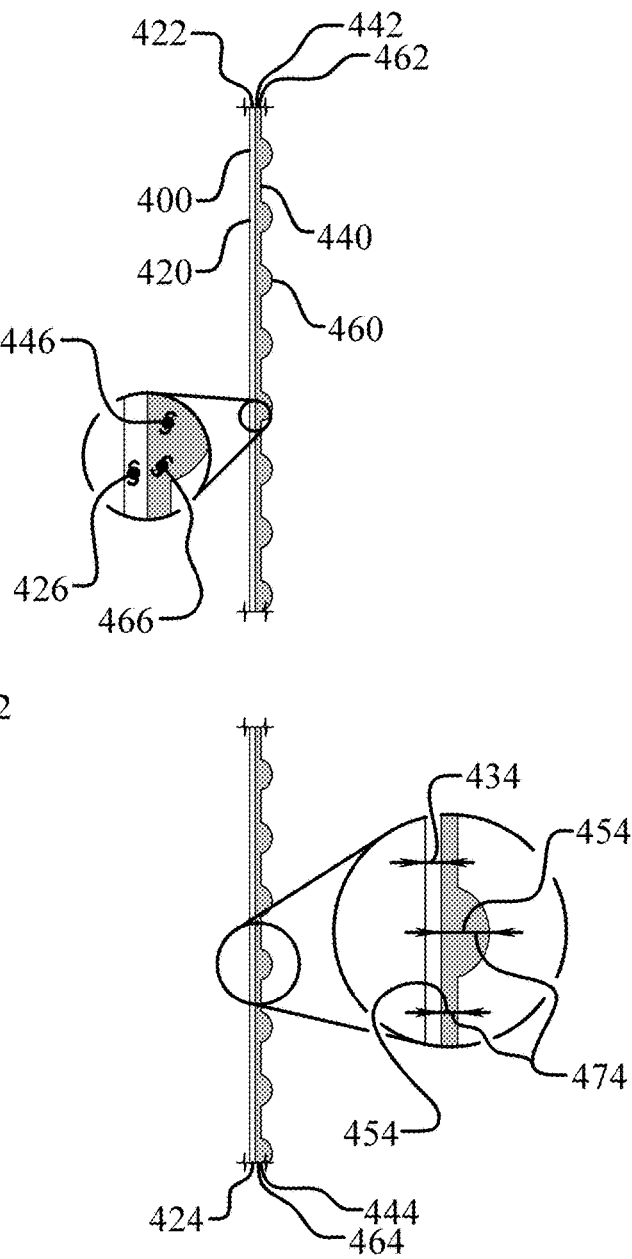
FIG. 51B is a partial dextral side elevation view of a collar embodiment having magnified views, not to scale.
Figure 52A:
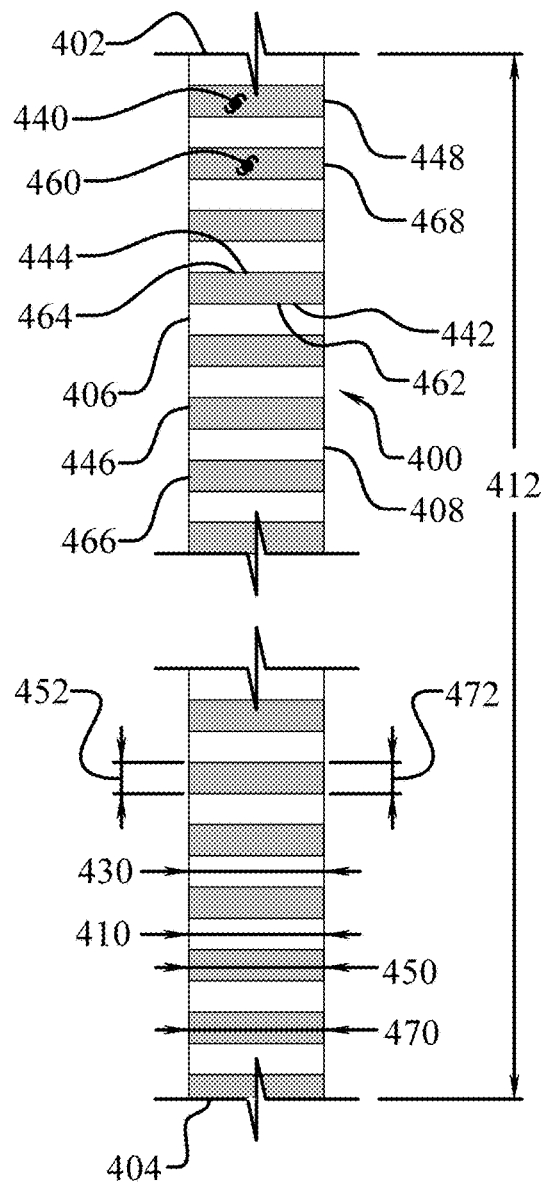
FIG. 52A is a partial elevation view of a collar embodiment showing the collar second side, not to scale.
Figure 52B:
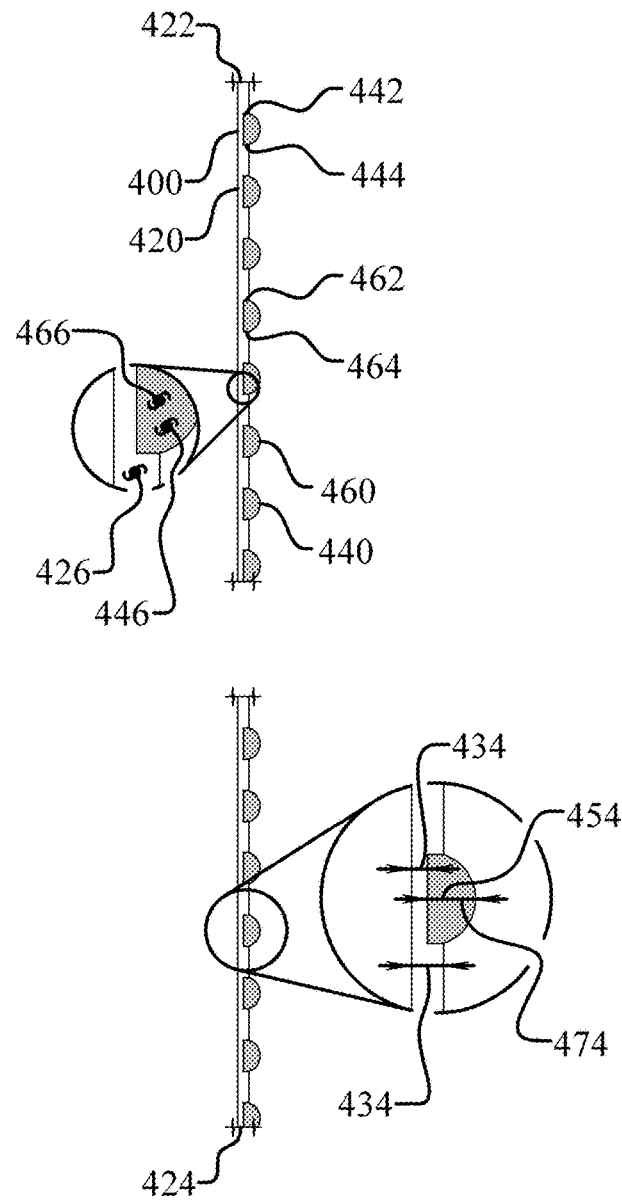
FIG. 52B is a partial dextral side elevation view of a collar embodiment having magnified views, not to scale.

Further, FIG. 36B illustrates an embodiment in which sections of tactile surfaces, namely lead second portion tactile surfaces (360) and/or collar second portion tactile surfaces (460) are embedded within the lead second portion (340) and the second collar portion (440), where they are flush, however in further embodiments they protrude, or may be recessed, as disclosed and illustrated in other embodiments which apply equally here. Similar embodiments are shown in FIGS. 44B and 50B where the lead second portion tactile surfaces (360) and/or collar second portion tactile surfaces (460) are embedded within the lead first portion (320) and the first collar portion (420), where they are flush, however in further embodiments they protrude, or may be recessed, as disclosed and illustrated in other embodiments which apply equally here. However, again to be explicit, such embodiments apply equally to visually contrast region (1200) embodiments and grip enhancement region (1300) embodiments, not just material property differential region (1100) embodiments, hence the dual labeling of elements 340 and 360, as well as elements 440 and 460, within FIGS. 36A-36D.

Additionally, the embodiment shown in FIG. 36C is similar to that of FIG. 36A, in that it has a continuous lead second portion (340) and a continuous second collar portion (440) applied to the lead first portion (320) and the first collar portion (420), accounting for approximately 50% of the surface area of the leash (100), but now includes a series of protrusions. In one such embodiment the second portions are the same material as the first portions, as are the protrusions, as would be the case in a grip enhancement region (1300). Whereas, when the second portions have different material properties than the first portions, they become tactile surfaces such as a lead second portion tactile surface (360) and/or a collar second portion tactile surface (460), hence the dual labeling of elements 340 and 360, as well as elements 440 and 460, within FIGS. 36A-36D, and as would be the case in a material property differential region (1100). As disclosed throughout, the protrusions may consist of a at least 2 straight segments forming a tooth, at least 3 straight segments, which may appear as a simple square or rectangular protrusion with sides meeting at 90 degree angles, or with sides meeting with obtuse internal angles, such as those illustrated in FIG. 41B, or with a curved surface as seen in FIGS. 45B and 78, as will be described in more detail later, and the same configurations apply for recesses disclosed throughout. Further, the embodiment shown in FIG. 36D may be thought of as a discontinuous version of the embodiment of FIG. 36A.

Applicable to any of the disclosed embodiments and sections, with reference now to FIGS. 37A-42B, in another embodiment, the grip first portion thickness (224), also the flexible body thickness, is 75 to 200 percent of the grip second portion tactile surface thickness (274), which is akin to the MPDR thickness (1112). In still another embodiment, the grip first portion thickness (224) is 100 to 175 percent of the grip second portion tactile surface thickness (274). In yet another embodiment, the grip first portion thickness (224) is at least 100 percent of the grip second portion tactile surface thickness (274). Stated alternatively, in one embodiment the tactile surface thickness (274), which is akin to the MPDR thickness (1112), is at least 2.5% of the grip first portion thickness (224), particularly applicable to round embodiments such as that seen in FIG. 78, while in further embodiments the tactile surface thickness (274) is at least 5%, 10%, 15%, 20%, and 25% of the grip first portion thickness (224). A further series of embodiments caps this relationship recognizing diminishing returns and negative aspects of too large of a thickness via a tactile surface thickness (274), akin to the MPDR thickness (1112), of no more than 100% of the grip first portion thickness (224), and no more than 90%, 80%, 70%, and 60% in still further embodiments. These thickness relationships apply equally to the lead first portion thickness (334) and the lead second portion tactile surface thickness (374), as well as the collar first portion thickness (434) and the collar second portion tactile surface thickness (474), as well as the MPDR thickness (1112), GER thickness, and GER recess depth In another embodiment, seen in FIGS. 38A, 38B, 58A and 58B, a multitude of grip second portion tactile surfaces (260) may be inlaid within the grip first portion (220); thereby forming a multitude of grip second portions (240). Additionally, each grip second portion tactile surfaces (260) inlay has: a grip second portion tactile surface proximal side (262); a grip second portion tactile surface distal side (264);

a grip second portion tactile surface dextral side (266); a grip second portion tactile surface sinistral side (268); a grip second portion tactile surface width (270), defined as the distance between the grip second portion tactile surface dextral side (266) and the grip second portion tactile surface sinistral side (268); a grip second portion tactile surface length (272), defined as the distance between the grip second portion tactile surface proximal side (262) and the grip second portion tactile surface distal side (264); and a grip second portion tactile surface thickness (274). In this embodiment, the grip dextral side (206) is equivalent to the grip second portion tactile surface dextral side (266); the grip sinistral side (208) is equivalent to the grip second portion tactile surface sinistral side (268); and the grip width (210) is equivalent to the grip second portion tactile surface width (270).

In one embodiment, the grip second portion tactile surface thickness (274) may be 5 to 80 percent of the grip first portion thickness (224). In another sub-embodiment, the grip second portion tactile surface thickness (274) may be 10 to 70 percent of the grip first portion thickness (224). In yet another embodiment, the grip second portion tactile surface thickness (274) may be at least 20 percent of the grip first portion thickness (224). As usual, these thickness relationships apply equally to the lead first portion thickness (334) and the lead second portion tactile surface thickness (374), as well as the collar first portion thickness (434) and the collar second portion tactile surface thickness (474).

FIGS. 39A, 39B, 59A and 59B show additional embodiments of the grip (200) having a grip second portion (240) that also functions as a grip second portion tactile surface (260), and thus a portion of the material property differential region (1100). In these embodiments, the grip second portion tactile surface (260) has ridges, or protrusions, that transverse from the grip second portion tactile surface dextral side (266) to the grip second portion tactile surface sinistral side (268), although they need not extend all the way from side to side. In fact, in one embodiment the grip second portion tactile surface width (270) is at least 10% of the grip width (210), and at least 20%, 30%, 40%, 50%, 60%, 70%, 80%, and 90% in further embodiments, which apply also to the lead second portion tactile surface width (370) and lead width (310), as well as the collar second portion tactile surface width (470) and collar width (410).

Figure 39A:
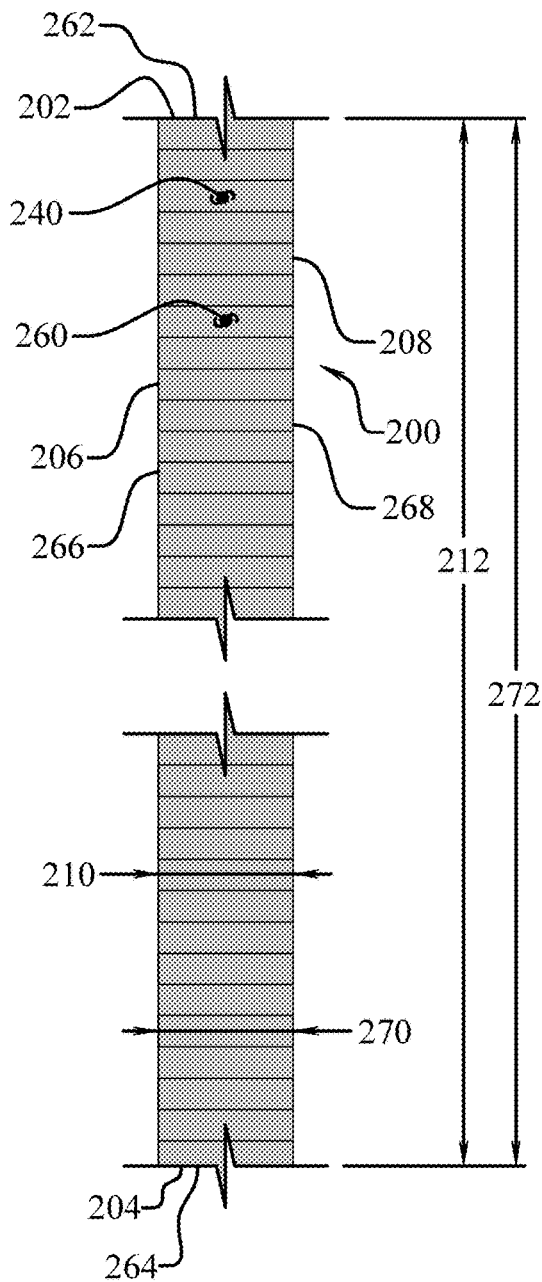
FIG. 39A is a partial elevation view of a grip embodiment showing the grip second side, not to scale.
Figure 39B:
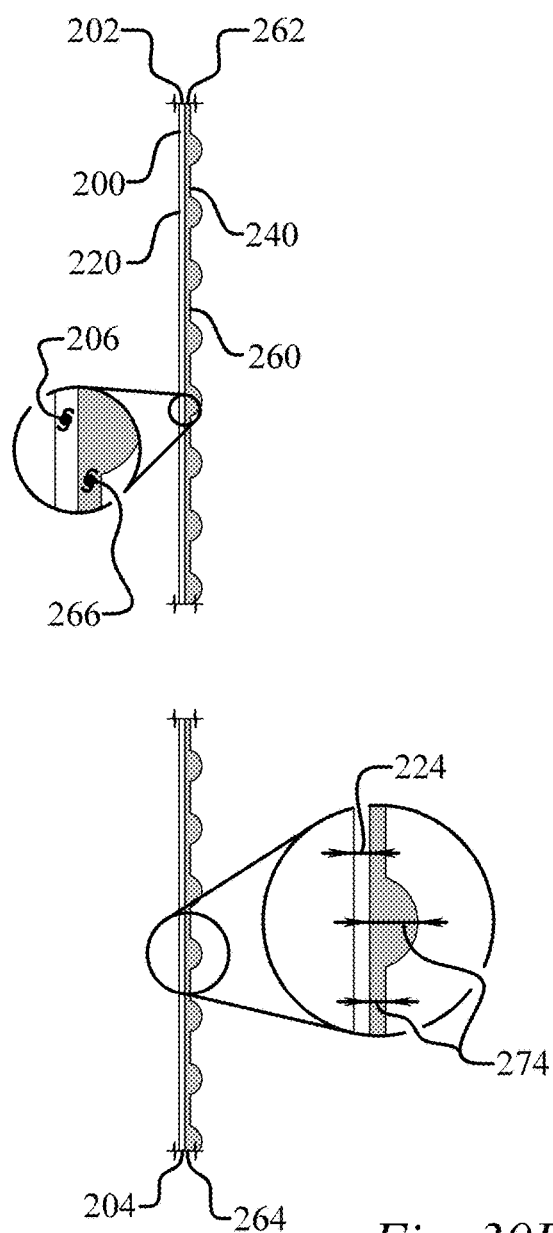
FIG. 39B is a partial dextral side elevation view of a grip embodiment having magnified views, not to scale.

These embodiments of grip have a maximum grip second portion tactile surface thickness (274) located at the apex of the ribs, and a minimum grip second portion tactile surface thickness (274) located in between the ribs, as seen in FIG. 39B. Furthermore in one embodiment, the maximum grip second portion tactile surface thickness (274) may be 1 to 300 percent of the minimum grip second portion tactile surface thickness (274), and 25-200%, 50-150%, and 75-125% in still further embodiments. In still yet another embodiment, the minimum grip second portion tactile surface thickness (274) is greater than 25 percent of the maximum grip second portion tactile surface thickness (274), and at least 50%, 75%, and 100% in further embodiments. In an additional embodiment, the maximum grip second portion tactile surface thickness (274) is 10 to 40 percent of the grip second portion tactile surface width (270), and 20-30% in another embodiment. In still another embodiment, the maximum grip second portion tactile surface thickness (274) is less than 50 percent of the grip second portion tactile surface width (270), and less than 40%, 30%, and 20% in further embodiments.

In another embodiment of grip (200), seen in FIGS. 40A, 40B, 60A and 60B, a multitude of grip second portions (240), or grip second portion tactile surfaces (260), may be inlaid within the grip first portion (220). The grip first portion (220) may have a minimum grip first portion thicknesses (224) where the grip second portion tactile surfaces (260) are inlaid, and a maximum grip first portion thicknesses (224) in areas of the grip first portion (220) lacking inlaid grip second portion tactile surfaces (260), as seen in the magnified view of FIG. 40B. Additionally, each grip second portion tactile surfaces (260) inlay has: a grip second portion tactile surface proximal side (262); a grip second portion tactile surface distal side (264); a grip second portion tactile surface dextral side (266); a grip second portion tactile surface sinistral side (268); a grip second portion tactile surface width (270), defined as the distance between the grip second portion tactile surface dextral side (266) and the grip second portion tactile surface sinistral side (268); a grip second portion tactile surface length (272), defined as the distance between the grip second portion tactile surface proximal side (262) and the grip second portion tactile surface distal side (264); and a grip second portion tactile surface thickness (274). In this embodiment, the grip dextral side (206) is equivalent to the grip second portion tactile surface dextral side (266); the grip sinistral side (208) is equivalent to the grip second portion tactile surface sinistral side (268); and the grip width (210) is equivalent to the grip second portion tactile surface width (270). All of the disclosed relationships apply equally to these embodiments. In one embodiment a distance between adjacent ridges, or projections, is no more than 300% of the grip second portion tactile surface length (272), and no more than 250%, 200%, 150%, and 100% in further embodiments. In another series of embodiments the distance between adjacent ridges, or projections, is at least 25% of the grip second portion tactile surface length (272), and at least 50%, 70%, and 90% in further embodiments.

Figure 41A:
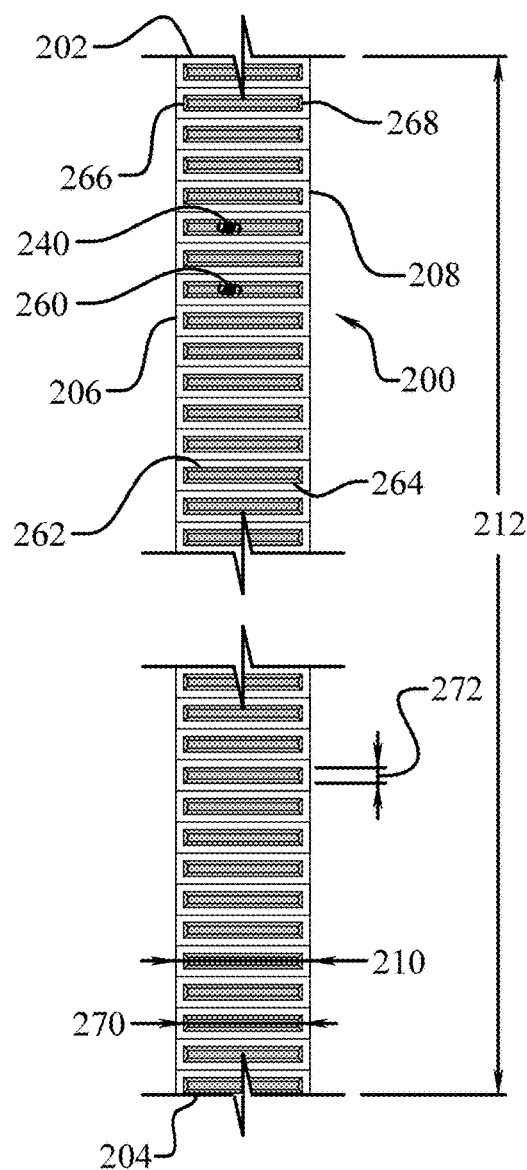
FIG. 41A is a partial elevation view of a grip embodiment showing the grip second side, not to scale.
Figure 41B:
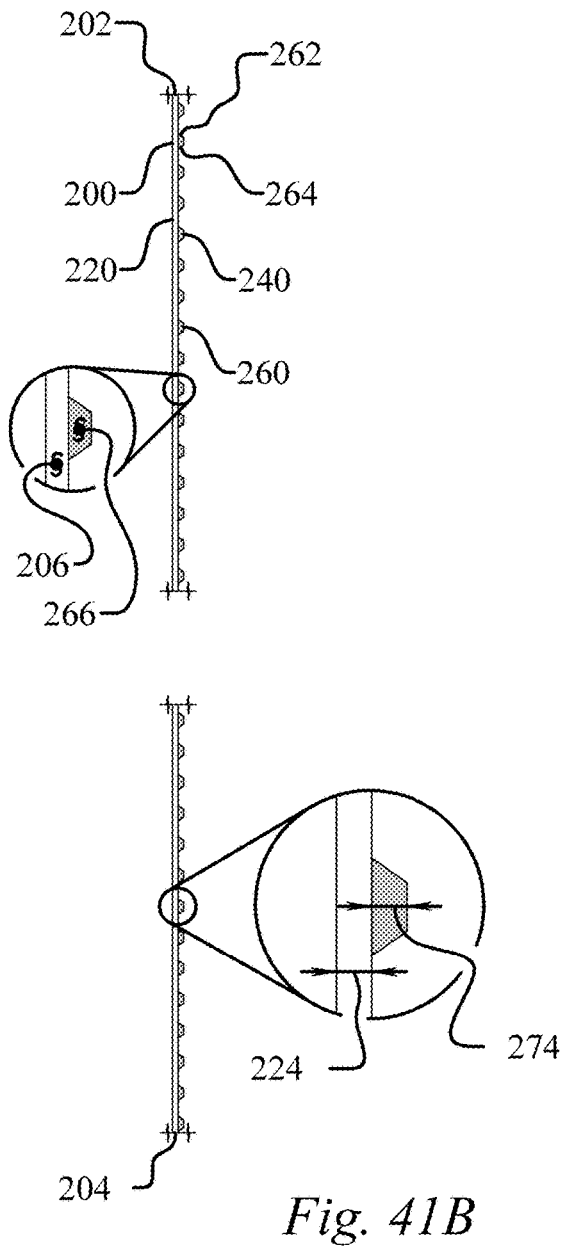
FIG. 41B is a partial dextral side elevation view of a grip embodiment having magnified views, not to scale.
Figure 49A:
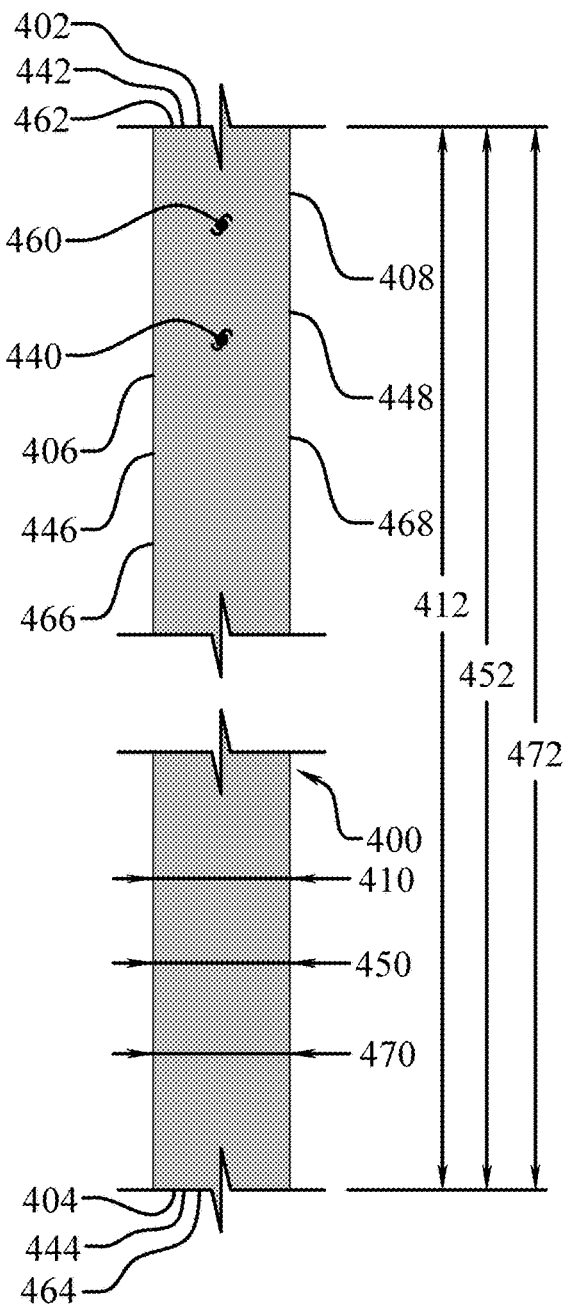
FIG. 49A is a partial elevation view of a collar embodiment showing the collar second side, not to scale.
Figure 49B:
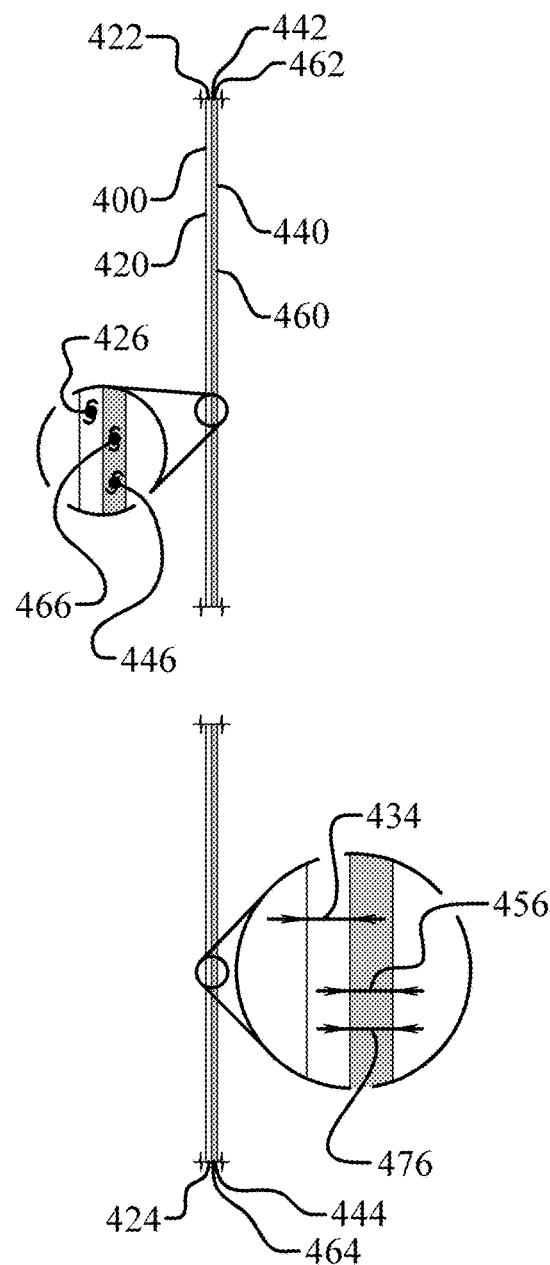
FIG. 49B is a partial dextral side elevation view of a collar embodiment having magnified views, not to scale.

Now referring to FIGS. 41A and 41B, another embodiment of grip (200) has a multitude of grip second portions (240), and/or grip second portion tactile surfaces (260). This is an illustration of a discontinuous grip second portion (240). In the embodiment of FIG. 41B the ridges, or protrusions, have symmetric ramped surfaces, which may be joined together to form a tooth cross-sectional shape, or may intersect with a flat apex surface as illustrated, In the illustrated embodiment the internal angle between the ramp surface and the flat apex surface is at least 90 degrees, and at least 100, 110, 120, 130, and 140 degrees in further embodiments. In a further series of embodiments the internal angle is no more than 170 degrees, and no more than 160, 150, and 140 degrees in further embodiments. All of the disclosed relationships apply equally to these embodiments.

Now referring to FIGS. 42A and 42B, another embodiment of grip (200) has at least one grip second portions (240), and/or grip second portion tactile surfaces (260), extending in a direction orthogonal to the previously disclosed embodiments, namely extending in a direction from the grip proximal side (202) to the grip distal side (204). As usual, all of the disclosed relationships apply equally to these embodiments. One such embodiment has at least two, at least three, or at least four, grip second portions (240), and/or grip second portion tactile surfaces (260), running parallel to each other for a length that is greater than the grip second portion tactile surface width (270), while in the illustrated embodiment there are three running parallel. In a further embodiment the length is at least 100% greater than the grip second portion tactile surface width (270), and at least 150%, 200%, 250%, and 300% in further embodiments. In further embodiments the grip second portions (240), and/or grip second portion tactile surfaces (260) are not parallel, and in a further embodiment they intersect to form a series of V patterns, or chevron shapes, but may also form a herringbone pattern (single, double, square, and/or diagonal), a brick pattern, and/or basket pattern (diagonal or square).

In one embodiment, the grip (200) is formed by folding a portion of the leash (100) back upon itself and securing it into position by the grip securement area (280), as seen in FIG. 1A. In another embodiment, the grip (200) may be pre-formed and attached to the leash lead (300) at the grip securement area (280). The securement of the grip (200) at the grip securement area (280) may be accomplished by, but not limited to the following methods: snaps, braiding, sewing, gluing, the use of a mechanical fastener, or a combination thereof, and may be permanent or releasable.

Now turning attention to another section, namely the lead (300), which may include a lead proximal side (302), a lead distal side (304), a lead dextral side (306), a lead sinistral side (308), a lead width (310), defined as the distance between the lead dextral side (306) and the lead sinistral side (308), a lead length (312), defined as the distance between the lead proximal side (302) and the lead distal side (304), a lead thickness (314), a lead first portion (320), and a lead second portion (340), as illustrated in FIGS. 1A, and 8-11. All of the disclosed relationships with respect to other sections, namely the grip (200) and collar (400), as well as the material property differential region (1100), the contrast region (1200), and the grip enhancement region (1300), also apply to the analogous aspects of the lead (300) and won't be repeated in the interest of brevity. In one embodiment the lead length (312) is 5 to 75 percent of the leash length (112). In another embodiment, the lead length (312) is 10 to 70 percent of the leash length (112), and 20 to 60 percent of the leash length (112) in a further embodiment.

Similar to the disclosure of the grip (200), as seen in FIGS. 8-11, the lead first portion (320) may have a lead first portion proximal side (322), a lead first portion distal side (324), a lead first portion dextral side (326), a lead first portion sinistral side (328), a lead first portion width (330), defined as the distance between the lead first portion dextral side (326) and the lead first portion sinistral side (328), a lead first portion length (332), defined as the distance between the defined as the distance between the lead first portion proximal side (322) and the lead first portion distal side (324), and a lead first portion thickness (334). The lead second portion (340) may have a lead second portion proximal side (342), a lead second portion distal side (344), a lead second portion dextral side (346), a lead second portion sinistral side (348), a lead second portion width (350), defined as the distance between the lead second portion dextral side (346) and the lead second portion sinistral side (348), a lead second portion length (352), defined as the distance between the lead second portion proximal side (342) and the lead second portion distal side (344), and a lead second portion thickness (354), as illustrated in FIGS. 31-34 and 43A-48B.

Figure 11:
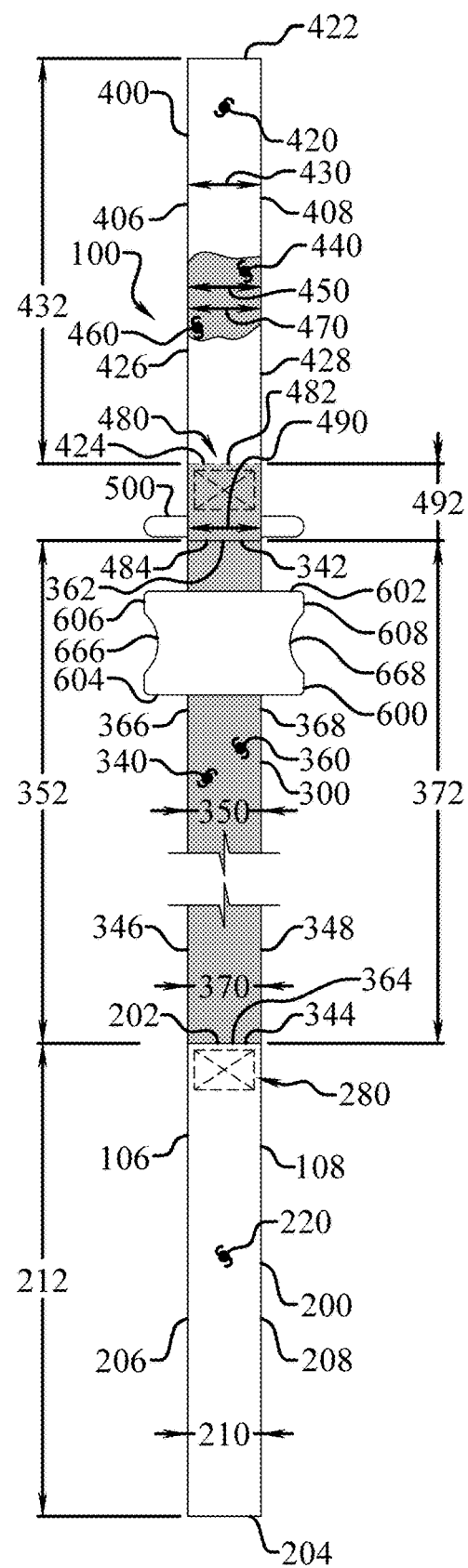
FIG. 11 is a front side elevation view of a leash embodiment, not to scale.
Figures 31, 32, 33, 34:
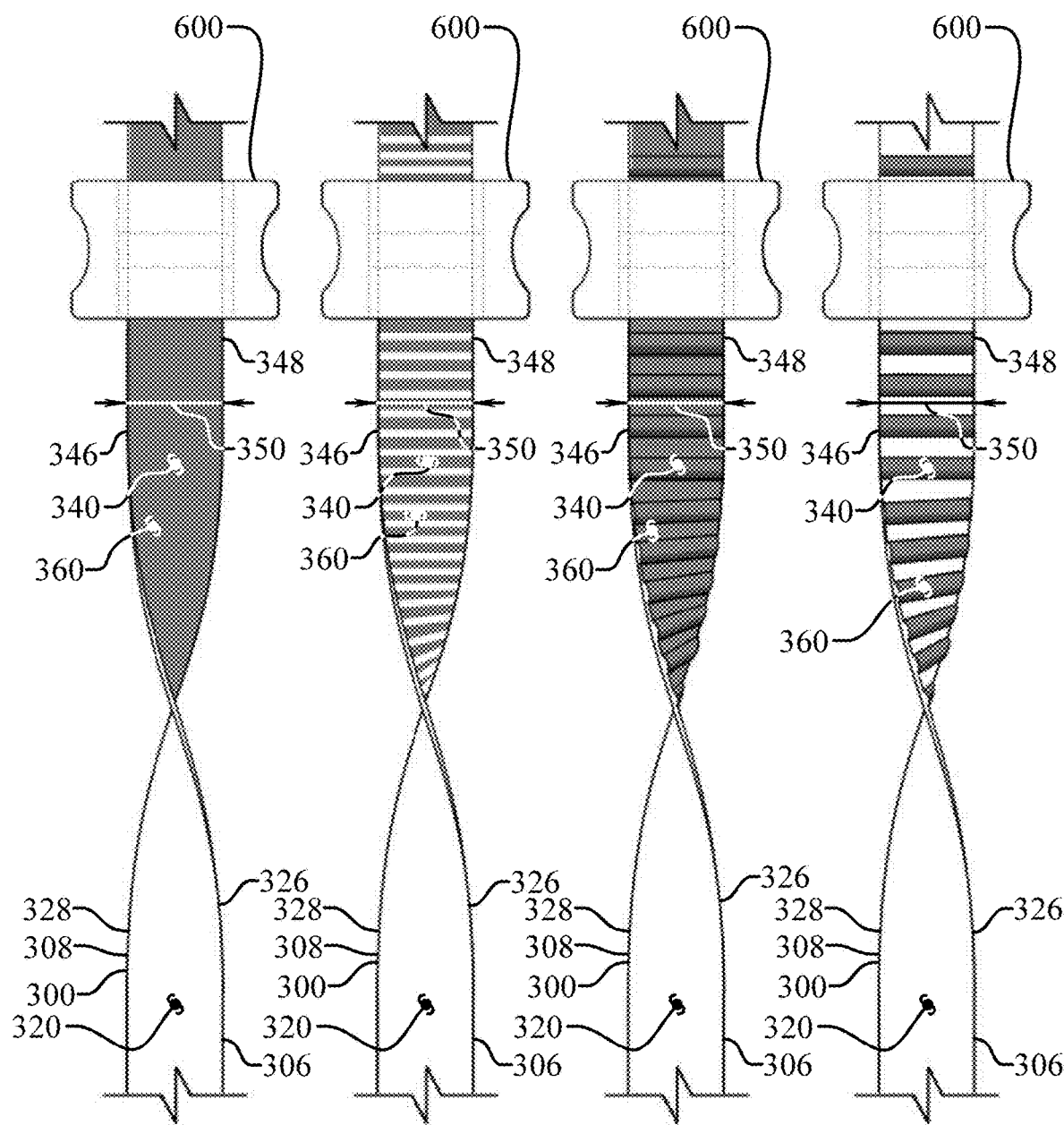
FIG. 31 is a partial elevation view of a leash embodiment in a twisted state showing both a first side and a second side, not to scale.
FIG. 32 is a partial elevation view of a leash embodiment in a twisted state showing both a first side and a second side, not to scale.
FIG. 33 is a partial elevation view of a leash embodiment in a twisted state showing both a first side and a second side, not to scale.
FIG. 34 is a partial elevation view of a leash embodiment in a twisted state showing both a first side and a second side, not to scale.
Figure 35:
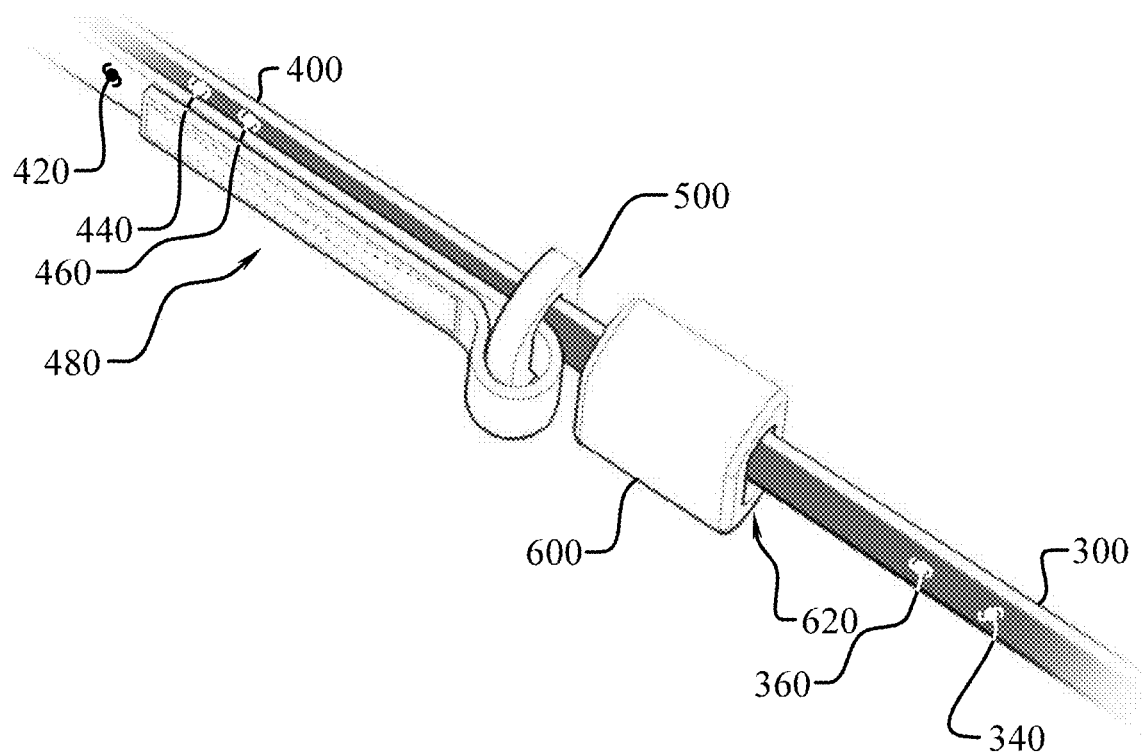
FIG. 35 is a partial isometric view of a leash embodiment having a ring and a sizing stop.

In one embodiment the lead second portion width (350) is at least 50% of the lead first portion width (330), and at least 60%, 70%, 80%, 90%, and 100% in further embodiments. Just to be clear, in embodiments having round cross-sectional profiles, the width is the diameter. As with the grip second portion (240), the lead second portion (340), and inherently the lead second portion tactile surface (360), may be continuous, as seen in FIGS. 11 and 31, or discontinuous, as seen in FIGS. 32 and 34, just to name a few. It is worth noting that the disclosure relating to the lead second portion width (350) and the lead second portion length (352) applies equally to the grip second portion (240) and collar second portion (440).

The lead second portion (340) may further include a lead second portion tactile surface (360) having: a lead second portion tactile surface proximal side (362); a lead second portion tactile surface distal side (364); a lead second portion tactile surface dextral side (366); a lead second portion tactile surface sinistral side (368); a lead second portion tactile surface width (370), defined as the distance between the lead second portion tactile surface distal side (364) and the lead second portion tactile surface dextral side (366); a lead second portion tactile surface length (372), defined as the distance between the lead second portion tactile surface proximal side (362) and the lead second portion tactile surface distal side (364); and a lead second portion tactile surface thickness (374), as illustrated in FIGS. 43A-48B. As previously noted, the lead second portion tactile surface (360) material may include, but not limited to, any of the materials disclosed for the grip second portion tactile surface (260), which is also true of the later discussed collar second portion tactile surface (460).

In fact, all of the disclosure relating to the grip first portion (220), the grip second portion (240), and the grip second portion tactile surface (260) applies equally to the lead first portion (320), the lead second portion (340), and the lead second portion tactile surface (360), as well as the material property differential region (1100), contrast region (1200), and grip enhancement region (1300), and will not be repeated for the sake of brevity. To be explicit, all of the disclosure and relationships related to the grip (200) applies equally to the lead (300) and the collar (400), as well as the material property differential region (1100), contrast region (1200), and grip enhancement region (1300), and vice versa. Likewise, all of the disclosure and relationships related to the grip width (210), grip length (212), and grip thick thickness (214) applies equally to the lead width (310), lead length (312), lead thick thickness (314), collar width (410), collar length (412), and collar thickness (414), and vice versa. Similarly, all of the disclosure and relationships related to the grip second portion tactile surface width (270), grip second portion tactile surface length (272), and the grip second portion tactile surface thickness (274) applies equally to the lead second portion tactile surface width (370), lead second portion tactile surface length (372), lead second portion tactile surface thickness (374), collar second portion tactile surface width (470), collar second portion tactile surface length (472), and collar second portion tactile surface thickness (474), and vice versa. Likewise, all of the disclosure relating to the discontinuous embodiments of the grip second portion tactile surface (260), spacing, surfaces, placement, material property differential region, material property differential region surface area, material property differential region length, and orientation, applies equally to the lead second portion tactile surface (360) and the collar second portion tactile surface (460), as well as the material property differential region (1100), contrast region (1200), and grip enhancement region (1300), and vice versa, and will not be repeated for the sake of brevity. Nonetheless, general disclosure will be made of the structural aspects of the lead (300) and collar (400) so that all the elements labeled in the figures are explicitly mentioned within the specification, keeping in mind that all of the disclosure and relationships disclosed with respect to the grip (200) apply equally to the analogous elements of the lead (300) and collar (400), as well as the material property differential region (1100), contrast region (1200), and grip enhancement region (1300), and vice versa.

Therefore, FIGS. 31, 43A, 43B, 55-57B show one embodiment of a lead (300) having a lead second portion (340) that also acts as a lead second portion tactile surface (360). Similar to the grip (200), in another embodiment, seen in FIGS. 32, 44A, 44B, 58A and 58B, a multitude of lead second portions (340), or a multitude of lead second portion tactile surfaces (360), may be inlaid within the lead first portion (320). Additionally, each lead second portion tactile surface (360) inlay has: a lead second portion tactile surface proximal side (362); a lead second portion tactile surface distal side (364); a lead second portion tactile surface dextral side (366); a lead second portion tactile surface sinistral side (368); a lead second portion tactile surface width (370), defined as the distance between the lead second portion tactile surface dextral side (366) and the lead second portion tactile surface sinistral side (368); a lead second portion tactile surface length (372), defined as the distance between the lead second portion tactile surface proximal side (362) and the lead second portion tactile surface distal side (364); and a lead second portion tactile surface thickness (374). In this embodiment, the lead dextral side (306) is equivalent to the lead second portion tactile surface dextral side (366); the lead sinistral side (308) is equivalent to the lead second portion tactile surface sinistral side (368); and the lead width (310) is equivalent to the lead second portion tactile surface width (370).

FIGS. 33, 45A, 45B, 59A and 59B show another embodiment of lead (300) having a lead second portion (340) that also functions as a lead second portion tactile surface (360). In this embodiment, the lead second portion tactile surface (360) has ridges, or protrusions, that transverse from the lead second portion tactile surface dextral side (366) to the lead second portion tactile surface sinistral side (368), although as disclosed with respect to the grip (200), they need not extend all the way from side to side. This embodiment of lead has a maximum lead second portion tactile surface thickness (374) located at the apex of the ribs, and a minimum lead second portion tactile surface thickness (374) located in the area between the ribs, as seen in FIG. 45B.

In another embodiment of lead (300), seen in FIGS. 34, 46A, 46B, 60A and 60B a multitude of lead second portion tactile surfaces (360), or lead second portions (340), may be inlaid within the lead first portion (320) The lead first portion (320) may have a minimum lead first portion thickness (334) in the areas where the lead second portion tactile surfaces (360) are inlaid, and a maximum lead first portion thickness (334) in areas of the lead first portion (320) lacking inlaid lead second portion tactile surfaces (360), as seen in the magnified view of FIG. 46B. Additionally, each lead second portion tactile surfaces (360) inlay has: a lead second portion tactile surface proximal side (362); a lead second portion tactile surface distal side (364); a lead second portion tactile surface dextral side (366); a lead second portion tactile surface sinistral side (368); a lead second portion tactile surface width (370), defined as the distance between the lead second portion tactile surface dextral side (366) and the lead second portion tactile surface sinistral side (368); a lead second portion tactile surface length (372), defined as the distance between the lead second portion tactile surface proximal side (362) and the lead second portion tactile surface distal side (364); and a lead second portion tactile surface thickness (374). In this embodiment, the lead dextral side (306) is equivalent to the lead second portion tactile surface dextral side (366); the lead sinistral side (308) is equivalent to the lead second portion tactile surface sinistral side (368); and the lead width (310) is equivalent to the lead second portion tactile surface width (370).

Now referring to FIGS. 47A and 47B, in another embodiment of lead (300) has a multitude of lead second portions (340), and/or lead second portion tactile surfaces (360). Additionally, each of the multitude of lead second portion tactile surfaces (360) has: a lead second portion tactile surface proximal side (362); a lead second portion tactile surface distal side (364); a lead second portion tactile surface dextral side (366); a lead second portion tactile surface sinistral side (368); a lead second portion tactile surface width (370), defined as the distance between the lead second portion tactile surface dextral side (366) and the lead second portion tactile surface sinistral side (368); a lead second portion tactile surface length (372), defined as the distance between the lead second portion tactile surface proximal side (362) and the lead second portion tactile surface distal side (364); and a lead second portion tactile surface thickness (374).

FIGS. 78 and 79 show another embodiment of leash (100) having a round lead (300) and multitude of lead second portion tactile surfaces (360) on a portion of the lead (300), which may also be true of the grip (200) and the collar (400), as well as the material property differential region (1100), contrast region (1200), and grip enhancement region (1300). In fact, all of the disclosure applies to embodiments having cross-sectional profiles that are other than flat rectangular in shape, and thus the use of surface areas in many embodiments. FIG. 80 illustrates one embodiment of a cross-sectional profile and a tactile surface coverage angle (376), which in one embodiment is at least 22.5 degrees, and at least 45 degrees, 67.5 degrees, 90 degrees, 112.5 degrees, and 135 degrees in further embodiments. A further series of embodiments caps the tactile surface coverage angle (376) to no more than 355 degrees, and no more than 315 degrees, 270 degrees, 225 degrees, 202.5 degrees, 180 degrees, and 157.5 degrees in further embodiments. It is worth noting that just as the lead second portion tactile surface (360) need not be continuous along the longitudinal axis of the leash (100), the lead second portion tactile surface (360) need not be continuous in a transverse direction throughout the tactile surface coverage angle (376). In other words, the lead second portion tactile surface (360) need not be continuous as seen in FIG. 80, but may be a series of separate discrete lead second portion tactile surface (360), that one many think of as individual nubs or projections, such as the disclosed MPDR projections (1110) and GER projections. Thus, the lead second portion tactile surface (360) of FIG. 80 may comprise 2 individual lead second portion tactile surfaces (360) separated by a gap, and at least 3, 4, 5, 6, and 7 in even further embodiments. Such individual lead second portion tactile surfaces (360) may have a number of potential shapes when considering the shape of the perimeter of the individual nubs or projections, ranging from a simple circular, or dot, perimeter, to more complex perimeter shapes such as: triangles, polygons, including, but not limited to, concave polygons, constructible polygons, convex polygons, cyclic polygons, decagons, digons, dodecagons, enneagons, equiangular polygons, equilateral polygons, henagons, hendecagons, heptagons, hexagons, Lemoine hexagons, Tucker hexagons, icosagons, octagons, pentagons, regular polygons, stars, and star polygons; triangles, including, but not limited to, acute triangles, anticomplementary triangles, equilateral triangles, excentral triangles, tritangent triangles, isosceles triangles, medial triangles, auxiliary triangles, obtuse triangles, rational triangles, right triangles, scalene triangles, Reuleaux triangles; parallelograms, including, but not limited to, equilateral parallelograms: rhombuses, rhomboids, and Wittenbauer's parallelograms; Penrose tiles; rectangles; rhombus; squares; trapezium; quadrilaterals, including, but not limited to, cyclic quadrilaterals, tetrachords, chordal tetragons, and Brahmagupta's trapezium; equilic quadrilateral kites; rational quadrilaterals; strombus; tangential quadrilaterals; tangential tetragons; trapezoids; polydrafters; annulus; arbelos; circles; circular sectors; circular segments; crescents; lunes; ovals; Reuleaux polygons; rotors; spheres; semicircles; triquetras; Archimedean spirals; astroids; paracycles; cubocycloids; deltoids; ellipses; smoothed octagons; super ellipses; and tomahawks; polyhedra; prisms; pyramids; and sections thereof, just to name a few.

It is easy to associate the round cross-sectional profile embodiments of FIGS. 78-80 with the disclosure of embodiments such as that of FIG. 47, as the diameter is both the lead first portion thickness (334) and the lead first portion width (330), illustrated in FIG. 46A. However, round cross-sectional profile embodiments may present greater lead first portion thicknesses (334), which may complicate relationships including the lead second portion tactile surface thickness (374) and the lead first portion thicknesses (334) since the diameter of a round leash is likely at least twice the thickness of a flat leash. Thus, in some embodiments the lead second portion tactile surface thickness (374) is at least 0.5 mm, and at least 0.6 mm, 0.7 mm, 0.8 mm, 0.9 mm, and 1.0 mm in additional embodiments. A further series of embodiments caps the lead second portion tactile surface thickness (374) recognizing negative performance attributes associated with too large of thicknesses. Thus, in one embodiment the lead second portion tactile surface thickness (374) is no more than 3.5 mm, and no more than 3.0 mm, 2.5 mm, 2.0 mm, 1.5 mm, and 1.25 mm in further embodiment. Further, in another embodiment usability and performance is improved when the longitudinal separation distance (378), seen in FIGS. 47B and 46B, between adjacent lead second portion tactile surfaces (360), i.e. the ridges or projections of FIG. 47B, is greater than the lead second portion tactile surface thickness (374), while in further embodiments the longitudinal separation distance (378) is at least 150% greater than the lead second portion tactile surface thickness (374), and at least 200%, 250%, 300%, 350%, and 400% in still further embodiments. Another series of embodiments caps this relationship such that the longitudinal separation distance (378) is no more than 20 times the lead second portion tactile surface thickness (374), and no more than 17 times, 14 times, 11 times, and 8 times, in still further embodiments. In one embodiment the lead first portion thickness (334) is no more than 12 mm, and no more than 10 mm, 8 mm, 6 mm, 4 mm, and 2 mm in additional embodiments. Further, in another embodiment the lead first portion width (330) is no more than 25.4 mm, and no more than 22 mm, 18 mm, 14 mm, 10 mm, and 6 mm in additional embodiments. As repeated throughout, while the disclosure of this paragraph is referencing elements of the lead (300), it applies equally to the grip (200) and the collar (400).

As with the grip (200), the lead (300) and/or collar (400) may also have a material property differential region (1100) having a material property differential region length (1106) of at least 2", and in another embodiment it is at least 4", and at least 8", 12", 16", and 24" in further embodiments. In one such embodiment, applicable to the material property differential region (1100) whether in the grip (200), lead (300), and/or collar (400), the material property region (1100) contains at least one distinct longitudinally separated second portion tactile surfaces, i.e. the ridges or projections of FIG. 47B, per longitudinal inch, while a further embodiment has no more than twenty distinct longitudinally separated second portion tactile surfaces per longitudinal inch, and no more than eight, six, and four in further embodiments. The use of "longitudinally separated" is intentional in that a single distinct longitudinally separated second portion tactile surfaces, i.e. the ridges or projections of FIG. 47B, may include multiple portions separated in a transverse direction, thus, for example, a single distinct longitudinally separated second portion tactile surfaces, i.e. the ridges or projections of FIG. 47A, may consist of multiple individually spaced apart segments in the left-to-right, or transverse direction, in FIG. 47A.

Building upon the material property differential region (1100) previously disclosed with reference to a section, namely the grip (200), lead (300), and/or collar (400), it is worth noting that the leash material property differential region (1100) is not tied to a location within a section. Thus, the overall leash (100) has a leash material property differential region (1100) that begins at a differential region offset (1108) distance measured along the leash from the point of attachment to the ring (500). In some embodiments the differential region offset (1108) distance is zero, meaning that the leash material property differential region (1100) begins at the connection to the ring (500) and extends along the longitudinal length of the leash (100) throughout a leash material property differential region length (1106). While the illustrated embodiments show the collar (400) having a collar second portion tactile surface (460) throughout the length of the collar (400), and show a lead (300) having a lead second portion tactile surface (360) throughout the length of the lead (300), this is not required.

For example, in some embodiments the differential region offset (1108) distance is zero, meaning that the leash material property differential region begins at the connection to the ring (500) and extends throughout a leash material property differential region length (1106) that is at least 10", while in further embodiments it is at least 12", 15", 18", 21", 26", and 28". Since the average collar size for a small dog is 10-14", a medium dog is 13-18", a large dog is 15-20", and an extra-large dog is 18-26", these embodiments provide the disclosed benefits with respect to maintaining proper position on the neck and with respect to the interaction with the ring (500) and in some embodiments the stop (600). However, some trainers may prefer to only have the leash material property differential region (1100) in the vicinity of the ring (500). Thus, in some embodiments the differential region offset (1108) distance is at least 6", while in further embodiments it is at least 8", 10", 12", 14", 16", and 18". Further, in such embodiments it may be desirable to have the leash material property differential region length (1106) no more than 10", and no more than 8", 6", and 4" in further embodiments. Such embodiments still provide the disclosed benefits associated with the interaction with the ring (500) and/or stop (600). This disclosure applies equally to the contrast region (1200), contrast region offset (1208), contrast region length (1206), grip enhancement region (1300), grip enhancement region offset (1308), and grip enhancement region length (1306).

Now referring to FIGS. 48A and 48B, is another embodiment of lead (300) having a multitude of lead second portions (340), and/or lead second portion tactile surfaces (360), running linear from the lead proximal side (302) to the lead distal side (304). Additionally, each of the multitude of lead second portion tactile surfaces (360) has: a lead second portion tactile surface proximal side (362); a lead second portion tactile surface distal side (364); a lead second portion tactile surface dextral side (366); a lead second portion tactile surface sinistral side (368); a lead second portion tactile surface width (370), defined as the distance between the lead second portion tactile surface dextral side (366) and the lead second portion tactile surface sinistral side (368) on the individual lead second portion tactile surfaces (360); a lead second portion tactile surface length (372), defined as the distance between the lead second portion tactile surface proximal side (362) and the lead second portion tactile surface distal side (364); and a lead second portion tactile surface thickness (374). In one embodiment, the lead second portion tactile surface width (370) is 10 to 50 percent of the lead width (310), and no more than 40%, 30%, and 20% in further embodiments.

FIG. 3 show an embodiment of the current invention that is properly positioned on a dog's neck and the grip (200) being held in a proper position by a user. The grip (200) being held properly with part of the lead (300) wrapped back over the user's fingers and over the pinky finger, as seen in FIG. 3, enhances the feedback of the animals movement to the handler and allows for a lighter/softer grip and a faster correction. The proper placement of a slip lead leash (100) is high on the animal's neck just behind the ears and jaw line of the animal. The collar second portion (440) should be in contact with the animal's neck, as seen in FIG. 3. The tactile and grip improving component helps prevent the collar (400) from slipping down the animal's neck and as a result, the slip resistant leash (100) reduces the chance for leash burns on the animal's neck and/or controller's hand.

Figure 63:
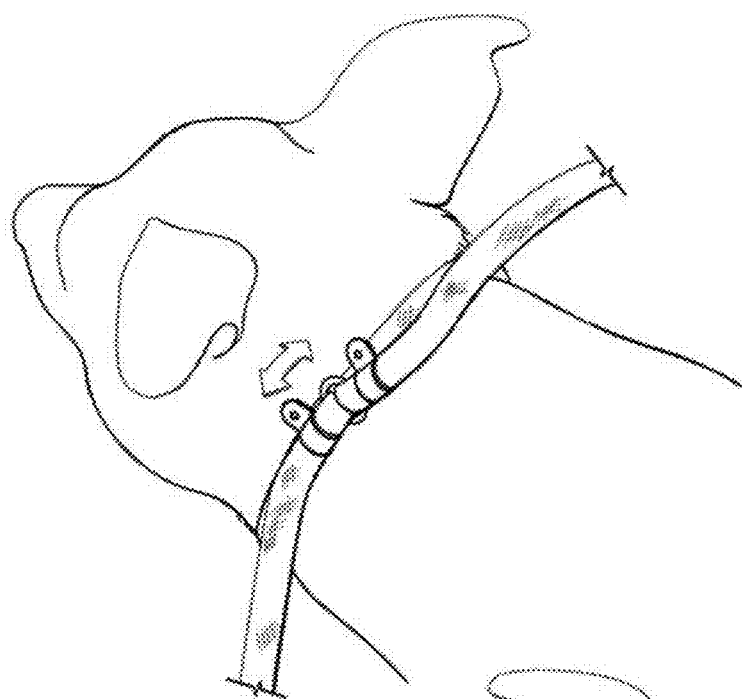
FIG. 63 is an isometric view of a prior art leash embodiment on a dog, not to scale.
Figure 64:
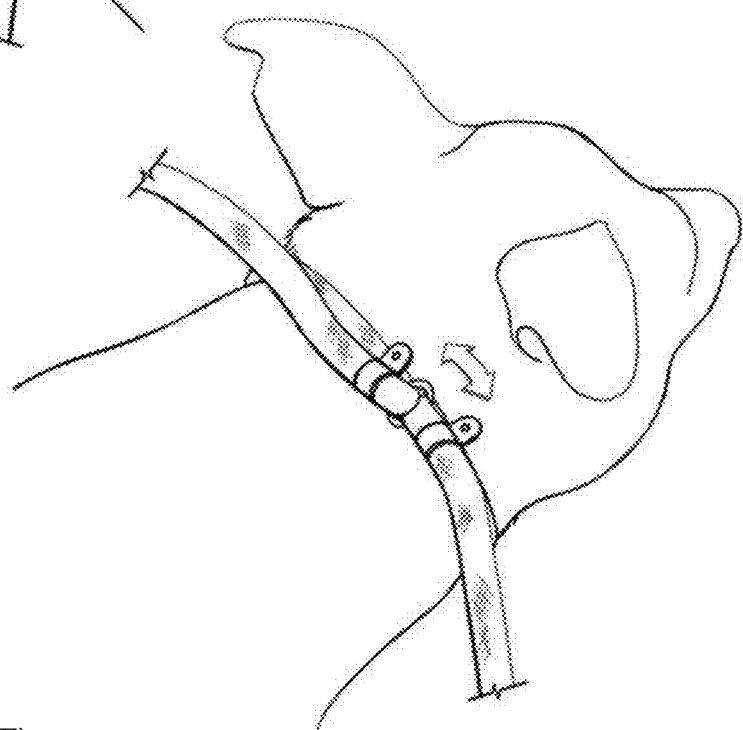
FIG. 64 is an isometric view of a prior art leash embodiment on a dog, not to scale.

FIGS. 4A, 4B, 63 and 64 show a prior art leash (100), made up of a simple round rope like material, that has been put on a dog in the proper position (A), high on the animal's neck just behind the ears and jaw line of the animal with the collar (400). FIGS. 5A and 5B show the same prior art leash (100) after the dog has lunged forward and the collar (400) slips down the dog's neck to position (B). When a collar (400) slips down a dog's neck, the dog can be physically harmed. Furthermore, prior art slip lead leashes (100) have a problem when the dog lunging against the leash (100) causing the collar (400) to expand the collar loop opening from which a dog can then escape. Prior art leashes (100) have been valuable tool for training dogs, but serious injury may result from improper use. FIGS. 63 and 64 show a prior art animal leash (100) of a single material having a grip (200) at one end and a collar (400) that that is configured by sliding a portion of the lead (300) through a ring (500) with a sizing slide stop (600) at the other end. This configuration gives no indication if an animal has been set to the right or left side of a handler. FIG. 64 shows a prior art animal leash (100) set up to be on the right side of the trainer that gives no direct visual feedback upon the event of the handler and/or the animal moving to the left side causing the leash (100) to lock and adding pressure to the animal's neck. It is also possible for the prior art animal leash (100) to be pulled and twisted during a correction causing hair pulling and/or leash burn on the animal's neck.

Figure 65:
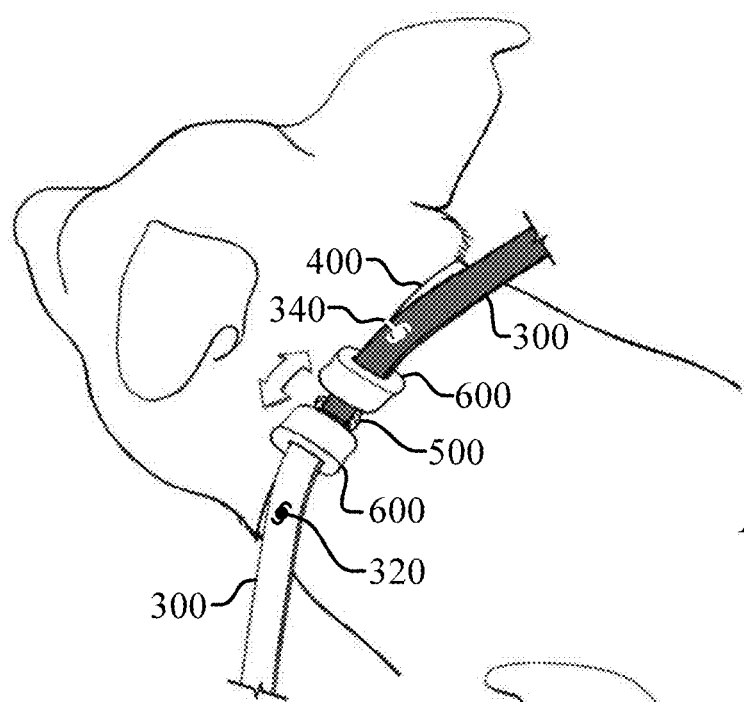
FIG. 65 is an isometric view of a leash embodiment on a dog, not to scale.
Figure 66:
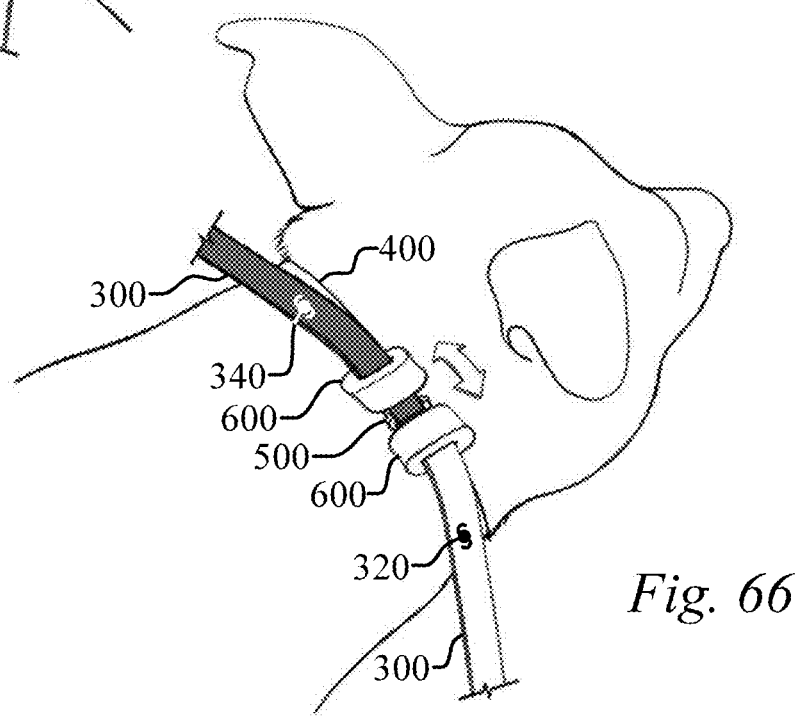
FIG. 66 is an isometric view of a leash embodiment on a dog, not to scale.
Figure 67:
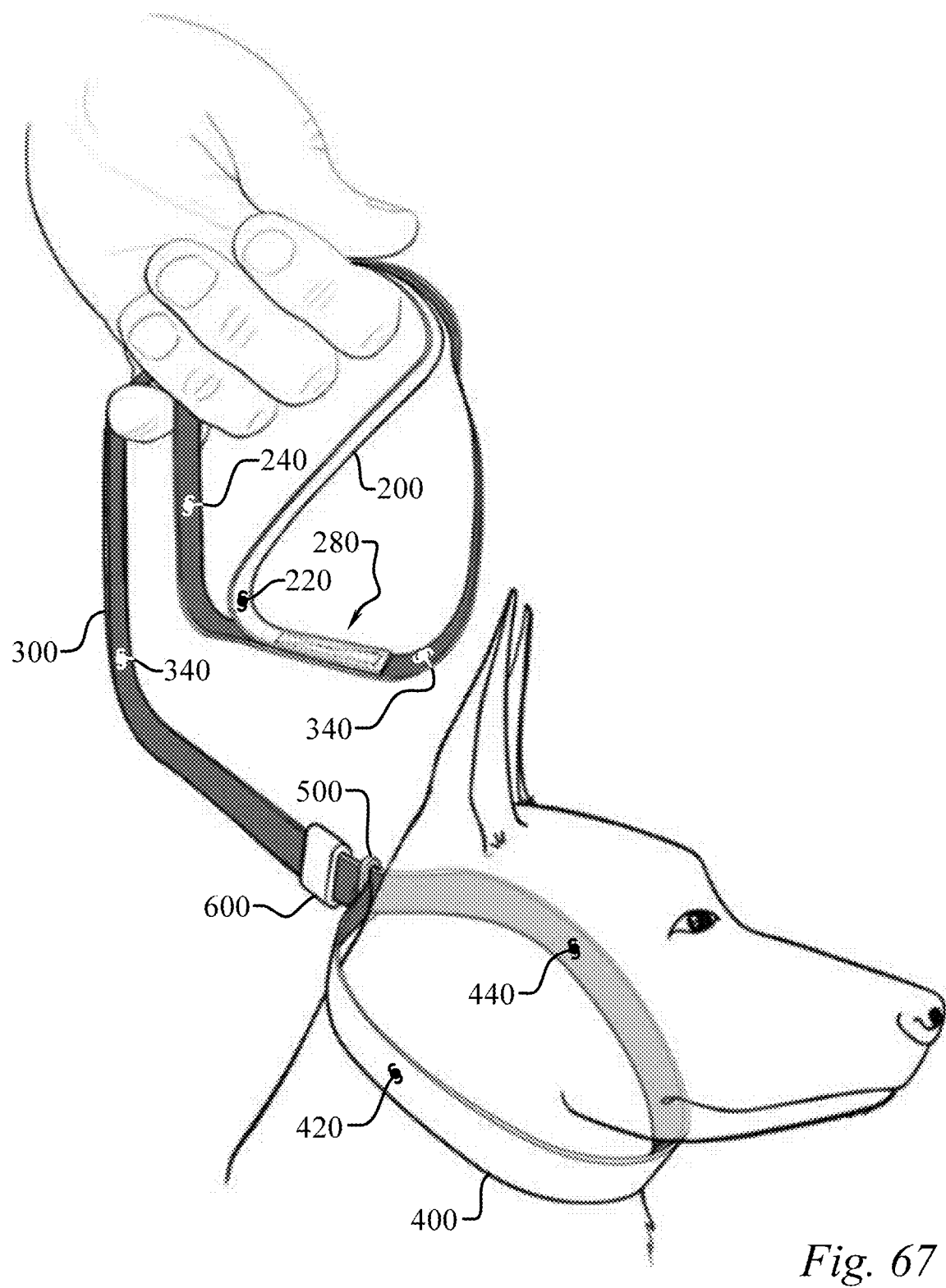
FIG. 67 is an isometric view of a leash embodiment on a dog, not to scale.
Figure 68:
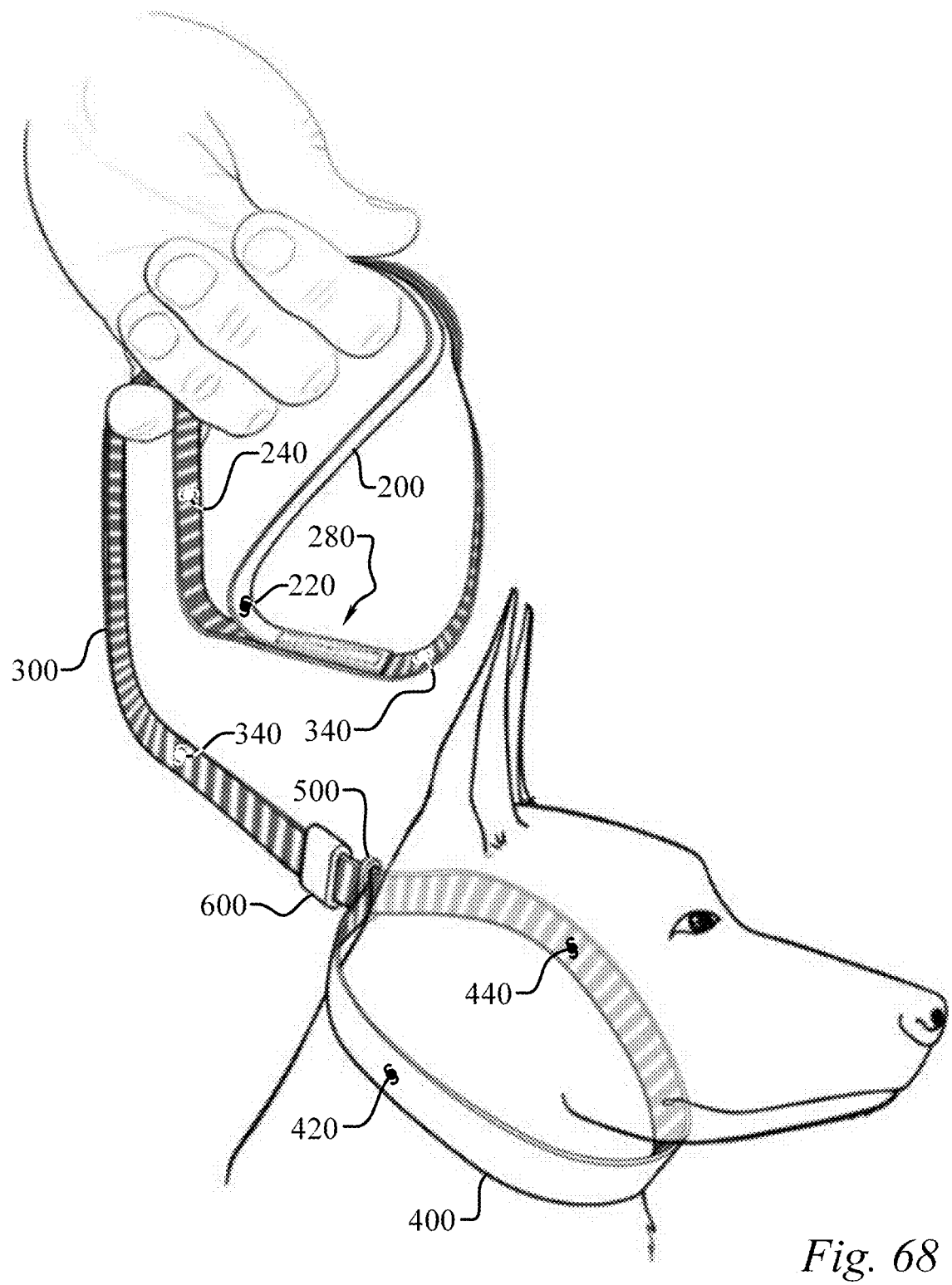
FIG. 68 is an isometric view of a leash embodiment on a dog, not to scale.
Figure 69:
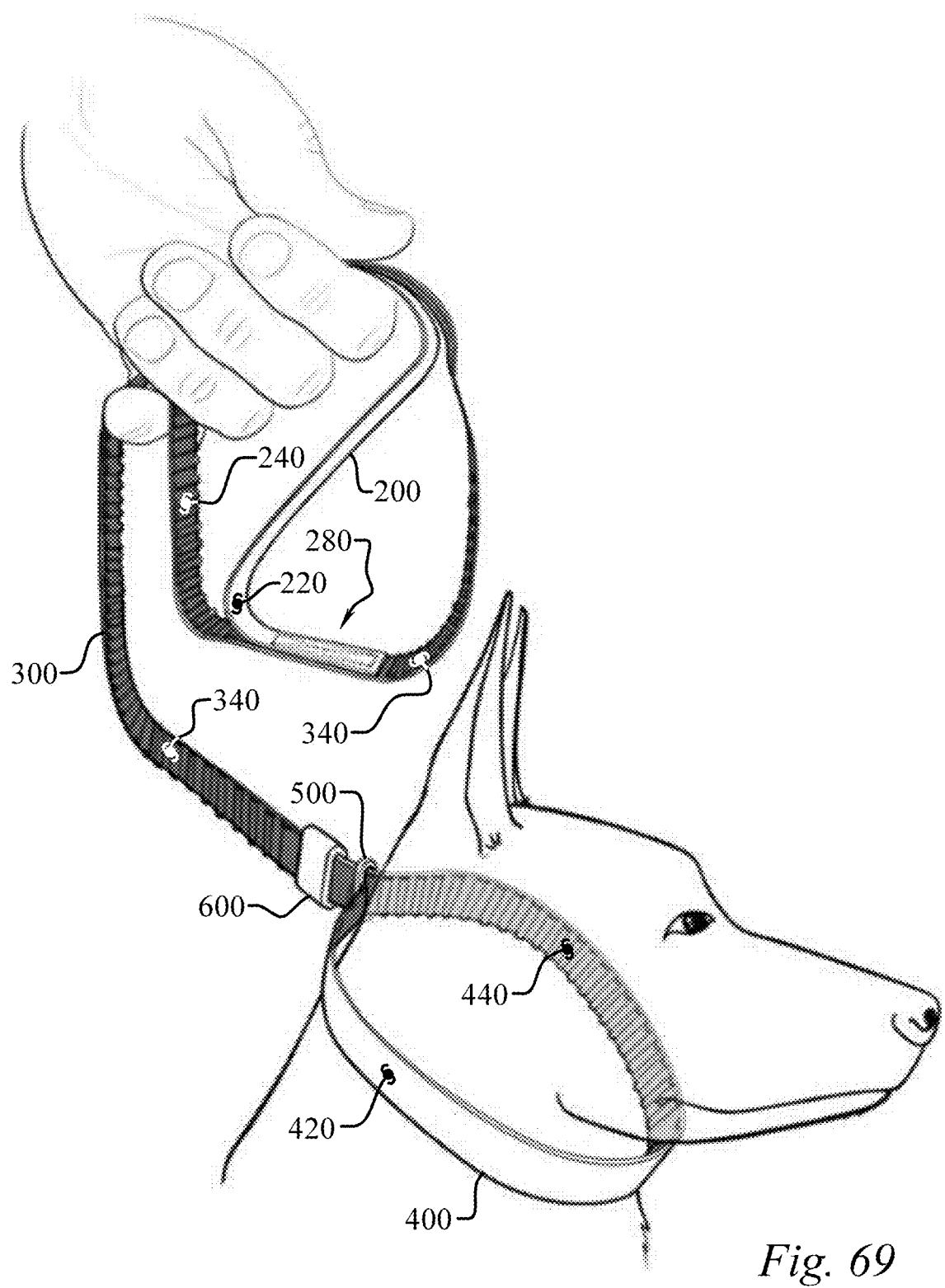
FIG. 69 is an isometric view of a leash embodiment on a dog, not to scale.
Figure 70:
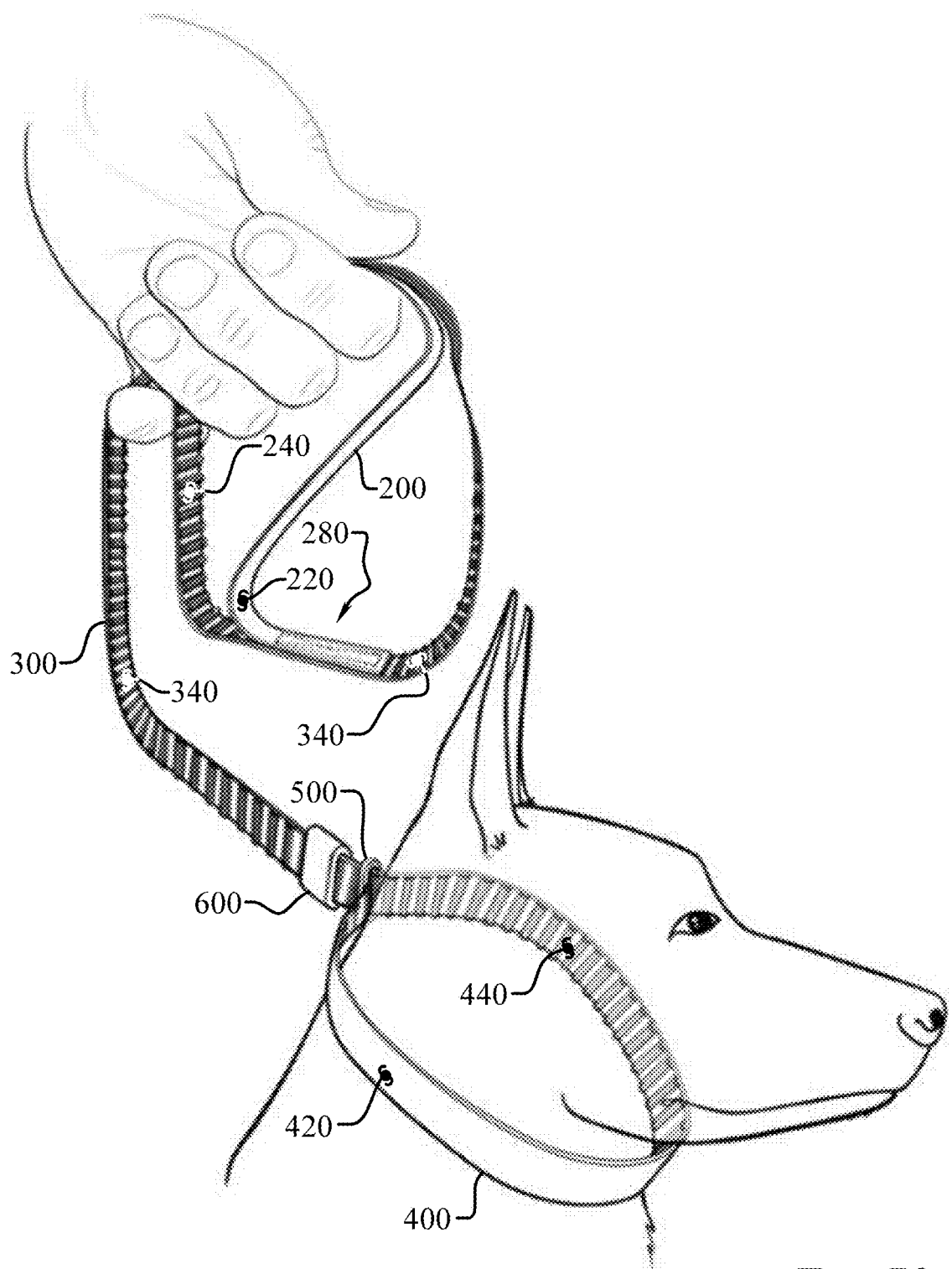
FIG. 70 is an isometric view of a leash embodiment on a dog, not to scale.

FIGS. 6A, 6B, 65-67 show embodiments of the current invention on a dog with the collar (400) in the proper installed position, which is high on the animal's neck, just behind the ears and jaw line. FIGS. 7A and 7B show the leash collar (400) remaining in the proper position after the dog has lunged forward. The collar second portion (440) abuts the animal's neck. Additionally, in one embodiment the collar second portion (440) may have a grip enhancing surface, aka collar second portion tactile surface (460), leash material property differential region (1100), and/or grip enhancement region (1300), which helps prevent the collar (400) from sliding down the animal's neck, and the slip resistant leash (100) reduces the chance for leash burns on the animal's neck and/or controller's hand. FIGS. 65 and 66 show an embodiment of the leash (100) with a lead first portion (320) and a lead second portion (340) having a different color and/or texture from the lead first portion (320) creating a contrast region (1300). The lead may be from any of the previously discussed leash (100) embodiments having a lead second portion tactile surface (360). FIGS. 65 and 66 illustrate how the dog handler has a clear visual indication if an animal has been set to the right or left side by the color and/or texture differential between the lead second portion (340) and the lead first portion (320), thereby giving the handler time to correct the animals location before the animal leash (100) locks and puts pressure to the animals neck; or causing the leash (100) to be pulled and twisted during a correction.

The collar (400) may include a collar proximal side (402), a collar distal side (404), a collar dextral side (406), a collar sinistral side (408), a collar width (410), defined as the distance between the collar dextral side (406) and the collar sinistral side (408), a collar length (412), defined as the distance between the collar proximal side (402) and the collar distal side (404), a collar thickness (414), a collar opening width (416), and a collar opening length (418), as seen in FIGS. 8-11. When the collar opening width (416) and the collar opening length (418) are proportionally equal to each other, and the grip opening width (216) and the grip opening length (218) are proportionally equal to each other As with the grip (200) and lead (300), the collar (400) may also have a collar first portion (420); a collar second portion (440), and a collar ring securement area (480).

Similar to the grip (200) and the lead (300), the collar second portion (440) may further include a collar second portion tactile surface (460) having a collar second portion tactile surface proximal side (462), a collar second portion tactile surface distal side (464), a collar second portion tactile surface dextral side (466), a collar second portion tactile surface sinistral side (468), a collar second portion tactile surface width (470), defined as the distance between the collar second portion tactile surface dextral side (466) and the collar second portion tactile surface sinistral side (468), a collar second portion tactile surface length (472), defined as the distance between the collar second portion tactile surface proximal side (462) and the collar second portion tactile surface distal side (464), and a collar second portion friction surface thickness (474), as seen in FIGS. 49A-54B. The collar second portion tactile surface (460) material may include any of those disclosed with respect to the grip (200) and/or lead (300).

FIGS. 35, 36A, 49A, 49B, and 55-57B show one embodiment of a collar (400) having a collar second portion (440) that also acts as a collar second portion tactile surface (460). As repeatedly noted, all of the disclosure relating to the grip second portion (240) and/or lead second portion (340) apply equally to the collar second portion (440), and thus the contrast region (1200) and grip enhancement region (1300), and will not be repeated for the sake of brevity In another embodiment, seen in FIGS. 36B, 50A, 50B, 58A and 58B a multitude of collar second portions (440), and/or collar second portion tactile surfaces (460), may be inlaid within the collar first portion (420). Additionally, each collar second portion tactile surfaces (460) inlay has a collar second portion tactile surface proximal side (462), a collar second portion tactile surface distal side (464), a collar second portion tactile surface dextral side (466), a collar second portion tactile surface sinistral side (468), a collar second portion tactile surface width (470), defined as the distance between the collar second portion tactile surface dextral side (466) and the collar second portion tactile surface sinistral side (468), a collar second portion tactile surface length (472), defined as the distance between the collar second portion tactile surface proximal side (462) and the collar second portion tactile surface distal side (464), and a collar second portion friction surface thickness (474).

FIGS. 36C, 51A, 51B, 59A and 59A show another embodiment of collar (400) having a collar second portion (440) that also functions as a collar second portion tactile surface (460), and thus a material property differential region (1100). In this embodiment, the collar second portion tactile surface (460) has ridges or projections that transverse from the collar second portion tactile surface dextral side (466) to the collar second portion tactile surface sinistral side (468), however, as disclosed, such side-to-side extension is not required in all embodiments. This embodiment of collar has a maximum collar second portion friction surface thickness (474) located at the apex of the ribs, and a minimum collar second portion friction surface thickness (474) located in the area between the ribs, as seen in FIG. 45B. Furthermore in one embodiment, the maximum collar second portion friction surface thickness (474) may be 100 to 300 percent of the minimum collar second portion friction surface thickness (474). In another embodiment, the maximum collar second portion friction surface thickness (474) may be 125 to 250 percent of the minimum collar second portion friction surface thickness (474). In yet another embodiment, the maximum collar second portion friction surface thickness (474) may be 175 to 225 percent of the minimum collar second portion friction surface thickness (474).

In additional embodiments of the collar (400), seen in FIGS. 36D, 52A, 52B, 60A and 60B, a multitude of collar second portion tactile surfaces (460) may be inlaid within the collar first portion (420); thereby forming a multitude of collar second portions (440). The collar first portion (420) may have a minimum collar first portion thickness (434) in the areas where the collar second portion tactile surfaces (460) are inlaid, and a maximum collar first portion thickness (434) in areas of the collar first portion (420) lacking inlaid collar second portion tactile surfaces (460), as seen in the magnified view of FIG. 52B.

Figure 53A:
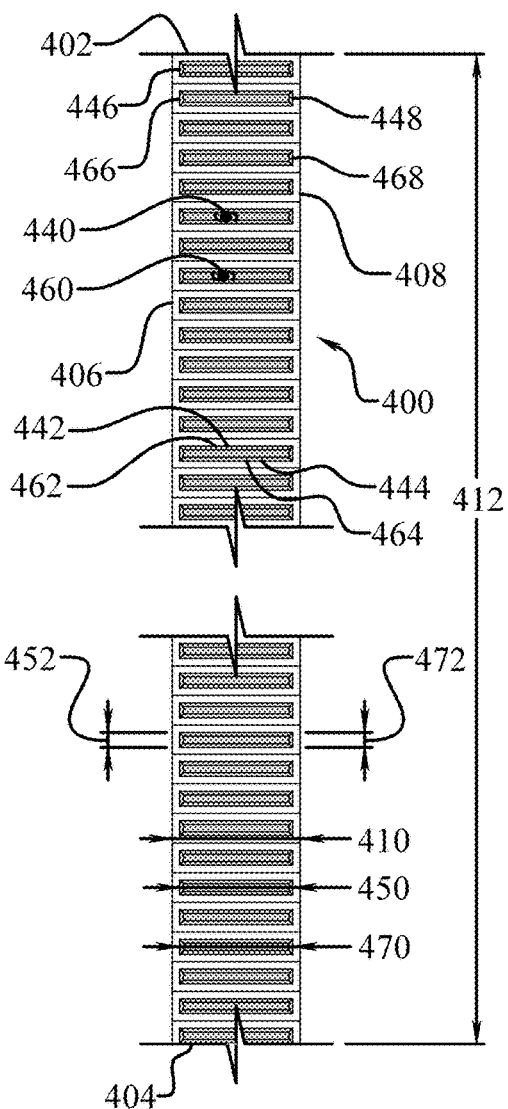
FIG. 53A is a partial elevation view of a collar embodiment showing the collar second side, not to scale.
Figure 53B:
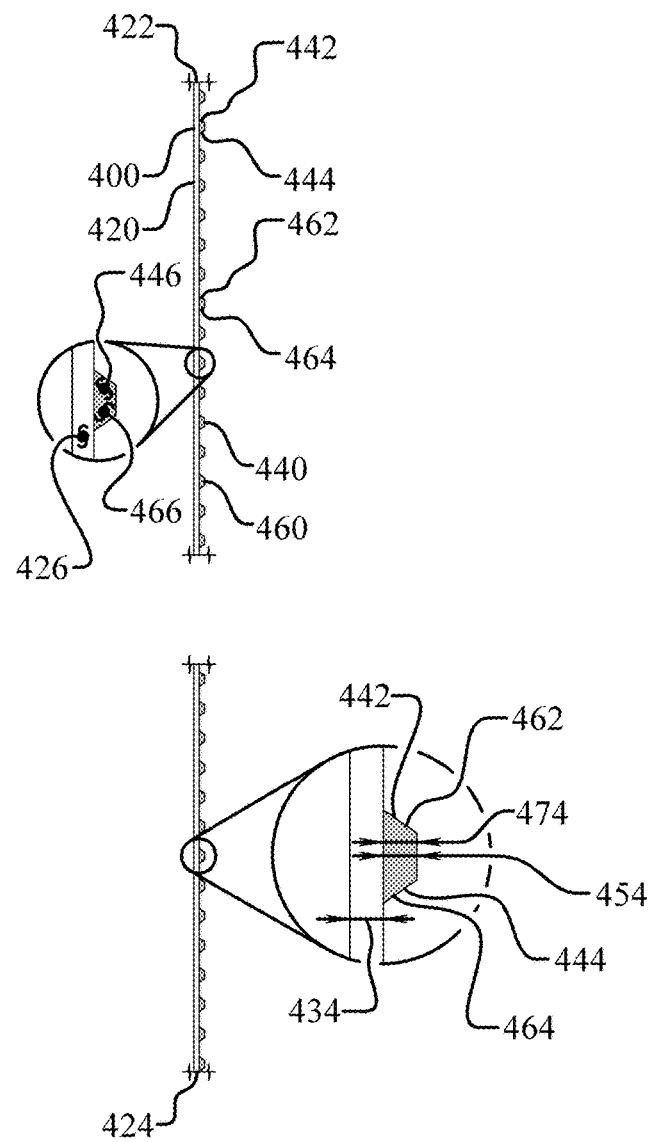
FIG. 53B is a partial dextral side elevation view of a collar embodiment having magnified views, not to scale.
Figure 55:
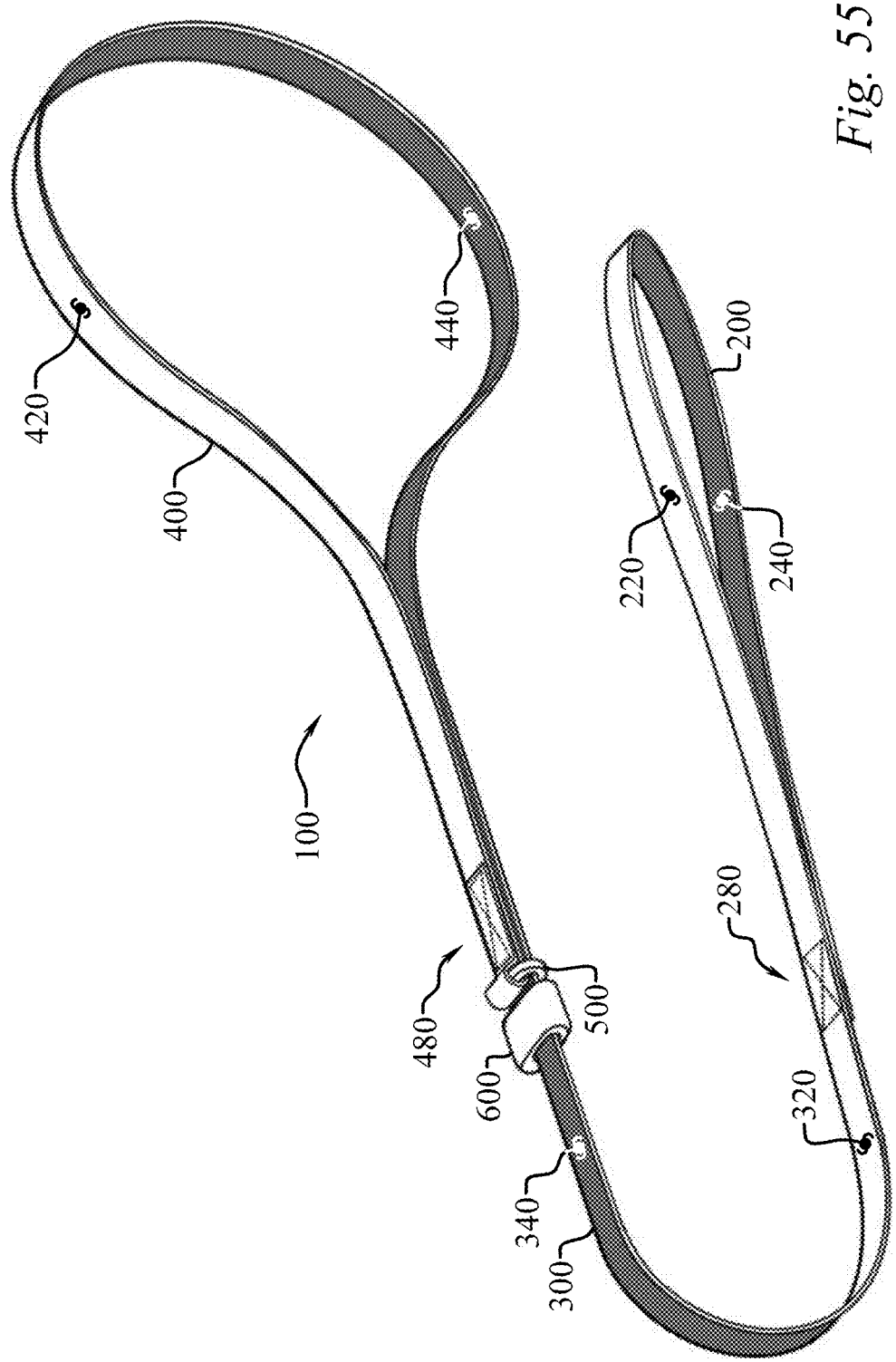
FIG. 55 is an isometric view of a grip slip lead dog leash embodiment, not to scale.
Figure 56:
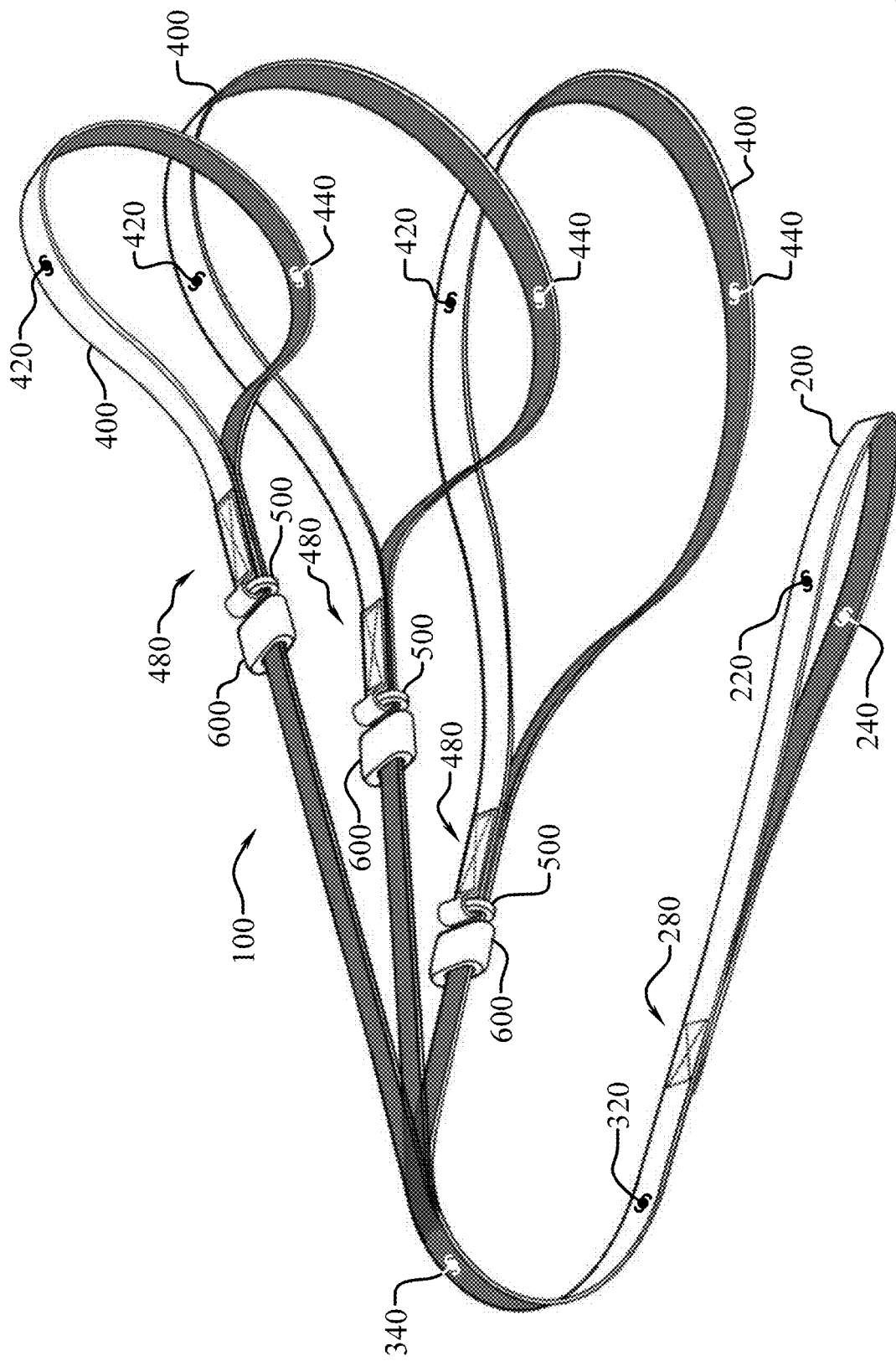
FIG. 56 is an isometric view of a leash embodiment showing the collar section in three separate states, not to scale.
Figures 60A, 60B:
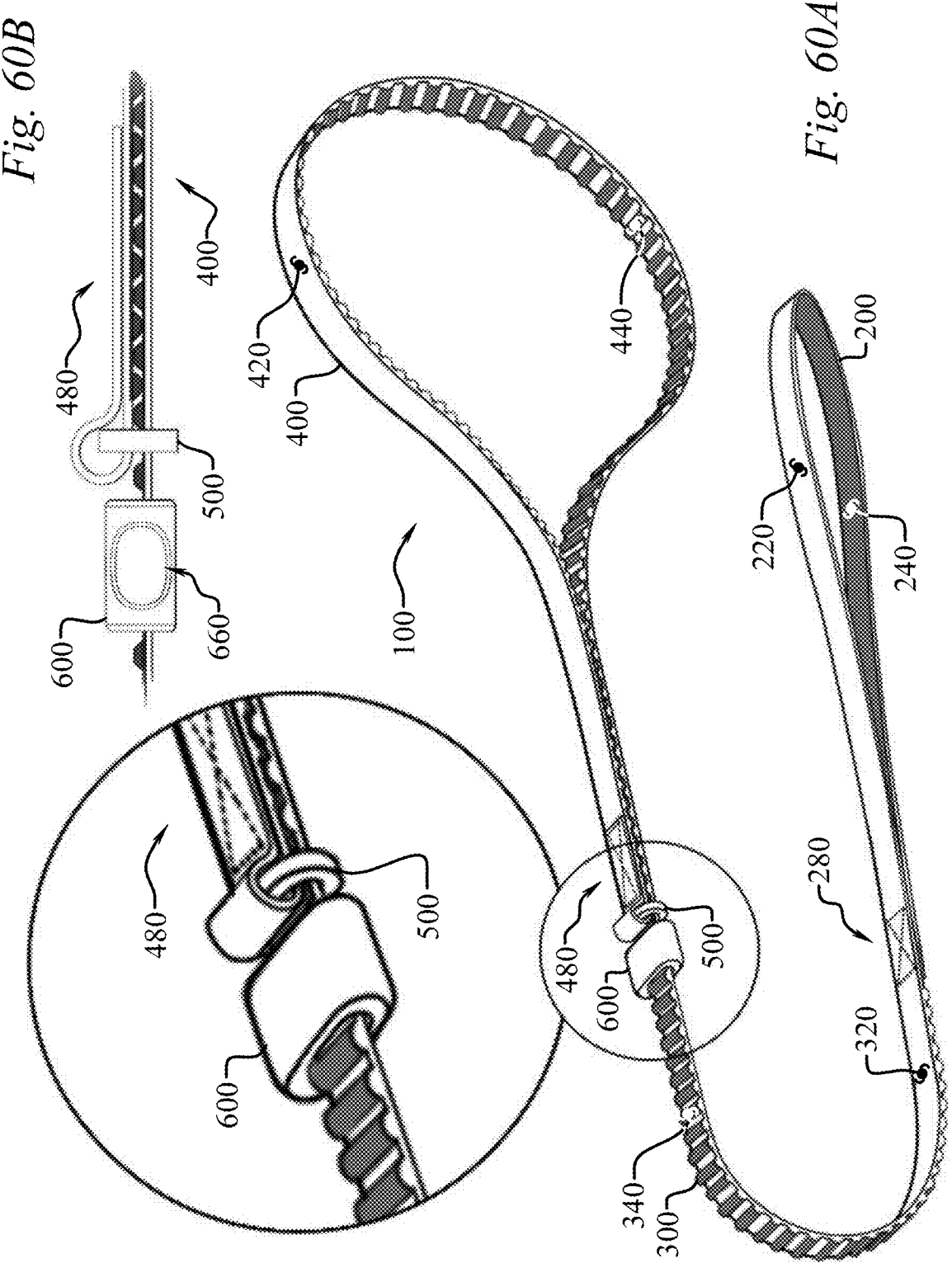
FIG. 60A is an isometric view of a grip slip lead dog leash embodiment having a magnified view, not to scale.
FIG. 60B is partial side elevation view of an leash embodiment, not to scale.
Figure 61:
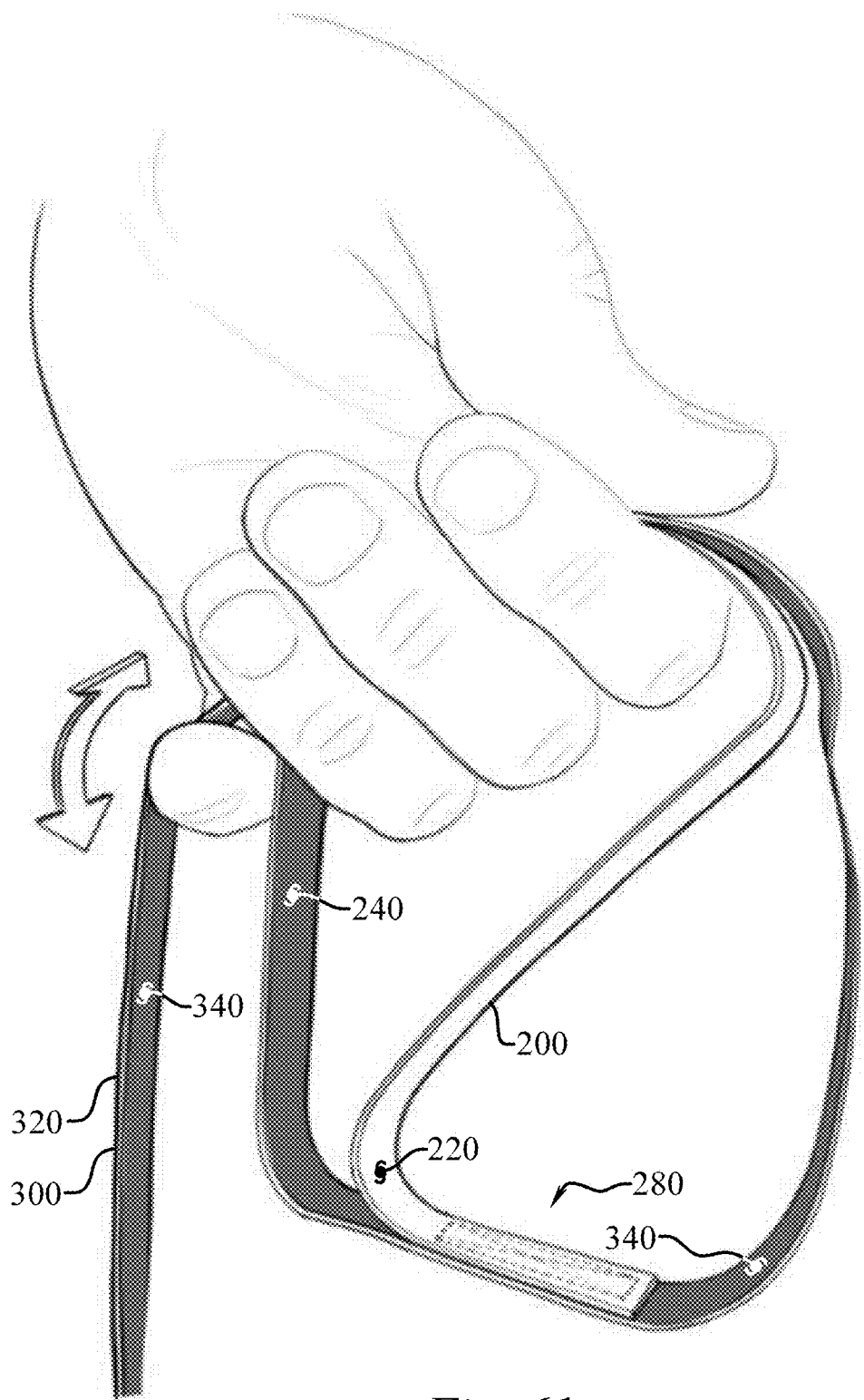
FIG. 61 is an isometric view of a leash embodiment being held in the proper manner by a human hand, not to scale.

Now referring to FIGS. 53A and 53B, is another embodiment of collar (400) having a multitude of collar second portions (440), and/or collar second portion tactile surfaces (460). Additionally, each of the multitude of collar second portion tactile surfaces (460) has a collar second portion tactile surface proximal side (462), a collar second portion tactile surface distal side (464), a collar second portion tactile surface dextral side (466), a collar second portion tactile surface sinistral side (468), a collar second portion tactile surface width (470), defined as the distance between the collar second portion tactile surface dextral side (466) and the collar second portion tactile surface sinistral side (468), a collar second portion tactile surface length (472), defined as the distance between the collar second portion tactile surface proximal side (462) and the collar second portion tactile surface distal side (464), and a collar second portion tactile surface thickness (474). In one embodiment, the collar second portion tactile surface width (470) is 10 to 100 percent of the collar width (410), and is at least 20%, 30%, and 40% in further embodiments.

Now referring to FIGS. 54A and 54B, is another embodiment of collar (400) having a multitude of collar second portions (440), and/or collar second portion friction surfaces (460), extend longitudinally along a portion of the collar (400). In one embodiment, the collar second portion tactile surface width (470) is 10 to 90 percent of the collar width (410), and is at least 20%, 30%, and 40% in further embodiments.

Some embodiments include a collar ring securement area (480) having a collar ring securement area proximal side (482), a collar ring securement area distal side (484), a collar ring securement area dextral side (486), a collar ring securement area sinistral side (488), a collar ring securement area width (490), defined as the distance between the collar ring securement area dextral side (486) and the collar ring securement area sinistral side (488), a collar ring securement area length (492), defined as the distance between the collar ring securement area proximal side (482) and the collar ring securement area distal side (484), and a collar ring securement area thickness (494), as illustrated in FIGS. 8-11, 15 and 16. In one embodiment of collar ring securement area (480), the collar ring securement area width (490) is 25 to 125 percent of the collar ring securement area length (492). In another embodiment, the collar ring securement area width (490) is 50 to 100 percent of the collar ring securement area length (492). In yet another embodiment, the collar ring securement area width (490) is 70 to 90 percent of the collar ring securement area length (492). In still yet another embodiment, the collar ring securement area width (490) is greater than 30 percent of the collar ring securement area length (492). The collar (400) may further have the ring (500) attached to the collar distal side (404) by a collar ring securement area (480), as seen in FIGS. 15 and 16. The ring (500) may be connected to the collar (400) by passing a portion of the collar (400) through the ring (500) and folding a portion of the collar (400) back upon itself and securing it into position by the collar ring securement area (480). The securement of the ring (500) at the collar ring securement area (480) may be accomplished by, but not limited to the following methods: snaps, rivets, braiding, stitching, fusing, gluing, staples, or a combination thereof. The grip (200) end of the leash (100) may be fed through the ring (500) that has been previously secured by the collar ring securement area (480), thereby forming the collar (400) loop.

Now addressing the ring (500) as seen in FIGS. 12-16, the ring (500) may include a ring proximal side (502). a ring distal side (504). a ring dextral side (506). a ring sinistral side (508). a ring width (510), defined as the distance between the ring dextral side (506) and the ring sinistral side (508). a ring length (512), defined as the distance between the ring proximal side (502) and the ring distal side (504). and a ring thickness (514). In one embodiment of ring (500), the ring thickness (514) is 5 to 40 percent of the ring width (510). In another embodiment of ring (500), the ring thickness (514) is 10 to 20 percent of the ring width (510). In still yet another embodiment of ring (500), the ring thickness (514) is less than 15 percent of the ring width (510). Furthermore, the ring (500) may further include a ring aperture (520) having a ring aperture proximal side (522), a ring aperture distal side (524), a ring aperture dextral side (526), a ring aperture sinistral side (528), a ring aperture width (530), defined as the distance between the ring aperture dextral side (526) and the ring aperture sinistral side (528), a ring aperture length (532), defined as the distance between the ring aperture ring aperture proximal side (522) and the ring aperture distal side (524), and a ring aperture height (534), as illustrated in FIG. 12. One embodiment of ring (500) has a ring aperture width (530) that is 1 to 30 percent larger than the lead width (310). In another embodiment of ring (500), the ring aperture width (530) is 5 to 20 percent larger than the lead width (310). In yet another embodiment of ring (500), the ring aperture width (530) is less than 15 percent larger than the lead width (310). The lead (300) passes through the ring aperture (520) and thereby forms the collar (400). Furthermore, the ring (500) allows the collar (400) size to vary. For instance, when the leash (100) is pulled by the dog handler, the collar (400) constricts in size, and vice versa. Furthermore, in an embodiment of leash (100), the ring aperture height (534) is 100 to 400 percent of the lead thickness (314). While in another embodiment, the ring aperture height (534) is 200 to 300 percent of the lead thickness (314). The ring (500) and/or the ring aperture (520) may be any of the shapes shown, including round, as well as a traditional D-ring shape. The ring (500) may be composed of metal alloys and/or non-metallic materials, and may be entirely encircle the flexible body (1000), enclose a portion of it, pass through an opening in the flexible body (1000), or simply engage, or attach to, the flexible body (1000) to achieve the goals described throughout.

The sizing stop (600), as seen in FIGS. 8-11 and 17-30, may include a sizing stop proximal side (602), a sizing stop distal side (604), a sizing stop dextral side (606), a sizing stop sinistral side (608), a sizing stop width (610), defined as the distance between the sizing stop dextral side (606) and the sizing stop sinistral side (608), a sizing stop length (612), defined as the distance between the sizing stop proximal side (602) and the sizing stop distal side (604), and a sizing stop thickness (614). As one can see from the illustration in FIG. 2, the placement of the sizing stop (600) limits the movement of the ring (500), and, as a result, the opening of the collar (400). If the sizing stop (600) is moved towards the grip (200) on the lead (300), the collar (400) opening increases; if the sizing stop (600) is moved towards the collar (400) on the lead (300), the collar (400) opening decreases. With reference again to FIGS. 17-30, in embodiment of sizing stop (600), the sizing stop length (612) is 10 to 200 percent of the sizing stop width (610). In another embodiment of sizing stop (600), the sizing stop length (612) is 15 to 100 percent of the sizing stop width (610). In still yet another embodiment of sizing stop (600), the sizing stop length (612) is less than 90 percent of the sizing stop width (610).

The sizing stop (600) may further include a sizing stop aperture (620) having a sizing stop aperture proximal side (622), a sizing stop aperture distal side (624), a sizing stop aperture dextral side (626), a sizing stop aperture sinistral side (628), a sizing stop aperture width (630), defined as the distance between the sizing stop aperture dextral side (626) and the sizing stop aperture sinistral side (628), a sizing stop aperture length (632), defined as the distance between the sizing stop aperture proximal side (622) and the sizing stop aperture distal side (624), and a sizing stop aperture height (634), as seen in FIGS. 17-20. In one embodiment of sizing stop (600), the sizing stop aperture length (632) may be 75 to 400 percent of the sizing stop thickness (614). While in another embodiment, the sizing stop aperture length (632) may be 100 to 200 percent of the sizing stop thickness (614). In still yet another embodiment, the sizing stop aperture length (632) is at least 125 percent of the sizing stop thickness (614).

The lead (300) passes through the sizing stop aperture (620) and stays frictionally static on the leash (100) after the dog handler slides it into position. On embodiment of sizing stop (600), the sizing stop aperture width (630) is 10 to 90 percent of the sizing stop width (610). In another embodiment of sizing stop (600), the sizing stop aperture width (630) is 20 to 80 percent of the sizing stop width (610). In yet another embodiment of sizing stop (600), the sizing stop aperture width (630) is 30 to 60 percent of the sizing stop width (610). In yet another embodiment of sizing stop (600), the sizing stop aperture width (630) is less than 90 percent of the sizing stop width (610). Furthermore, in one embodiment of sizing stop (600), the sizing stop aperture height (634) is 10 to 40 percent of the sizing stop thickness (614). In another embodiment of sizing stop (600), the sizing stop aperture height (634) is 20 to 30 percent of the sizing stop thickness (614). In still yet another embodiment of sizing stop (600), the sizing stop aperture height (634) is less than 35 percent of the sizing stop thickness (614).

The sizing stop (600) may further include a sizing stop internal ridge (640) that increases frictional engagement with the leash (100) to inhibit movement of the sizing stop (600) with respect to the leash (100), as seen in FIGS. 20-30. The sizing stop internal ridge (640) may have a sizing stop internal ridge proximal side (642), a sizing stop internal ridge distal side (644), a sizing stop internal ridge dextral side (646), a sizing stop internal ridge sinistral side (648), a sizing stop internal ridge width (650), defined as the distance between the sizing stop internal ridge dextral side (646) and the sizing stop internal ridge sinistral side (648), a sizing stop internal ridge length (652), defined as the distance between the sizing stop internal ridge proximal side (642) and the sizing stop internal ridge distal side (644), and a sizing stop internal ridge height (654). One embodiment of sizing stop (600) has a sizing stop internal ridge length (652) that is 5 to 100 percent of the sizing stop internal ridge width (650). In another embodiment, the stop internal ridge length (652) that is 20 to 70 percent of the sizing stop internal ridge width (650). In still another embodiment, the stop internal ridge length (652) that is less than 60 percent of the sizing stop internal ridge width (650). In still yet another embodiment of sizing stop (600), the sizing stop internal ridge height (654) is 5 to 50 percent of the lead thickness (314). While in another embodiment of sizing stop (600), the sizing stop internal ridge height (654) is 10 to 25 percent of the lead thickness (314). In yet another embodiment of sizing stop (600), the sizing stop internal ridge height (654) is less than 30 percent of the lead thickness (314). Furthermore, in one embodiment of sizing stop (600), the sizing stop internal ridge height (654) is 10 to 60 percent of the sizing stop aperture height (634). In another embodiment of sizing stop (600), the sizing stop internal ridge height (654) is 25 to 50 percent of the sizing stop aperture height (634). In yet another embodiment of sizing stop (600), the sizing stop internal ridge height (654) is less than 55 percent of the sizing stop aperture height (634).

Figure 19:
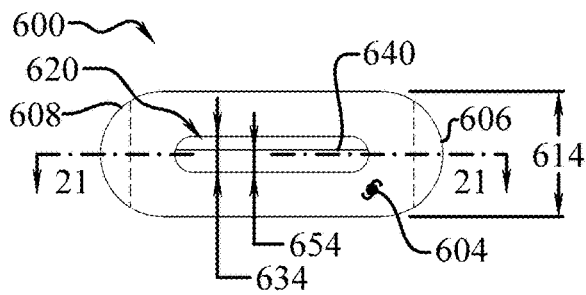
FIG. 19 is a distal side elevation view of a sizing stop embodiment, not to scale.
Figure 20:
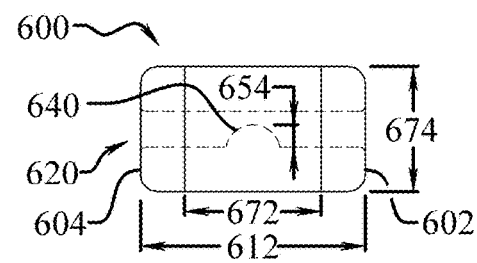
FIG. 20 is a side elevation view of a sizing stop embodiment, not to scale.

The sizing stop (600) may even further include a sizing stop grip recess (660) having a sizing stop grip recess proximal side (662), a sizing stop grip recess distal side (664), a sizing stop grip recess dextral side (666), a sizing stop grip recess sinistral side (668), a sizing stop grip recess width (670), defined as the distance between the sizing stop grip recess dextral side (666) and the sizing stop grip recess sinistral side (668), a sizing stop grip recess length (672), defined as the distance between the sizing stop grip recess proximal side (662) and the sizing stop grip recess distal side (664), and a sizing stop grip recess height (674). In one embodiment of sizing stop (600), the sizing stop grip recess width (670) is 5 to 30 percent smaller than the sizing stop width (610). In another embodiment the sizing stop grip recess width (670) is 10 to 20 percent smaller than the sizing stop width (610). In yet another embodiment, the sizing stop grip recess width (670) is greater than 95 percent of the sizing stop width (610). Furthermore, in another embodiment the sizing stop grip recess length (672) is 20 to 90 percent of the sizing stop length (612). While in another embodiment, the sizing stop grip recess length (672) is 40 to 75 percent of the sizing stop length (612). In yet another embodiment, the sizing stop grip recess length (672) is less than 95 percent of the sizing stop length (612). Additionally, the sizing stop grip recess height (674) may be equivalent to the sizing stop thickness (614), as seen in FIGS. 19 and 20. Whereas in another embodiment, the sizing stop grip recess height (674) may be less than 90 percent of the sizing stop thickness (614), as seen in FIGS. 25, 26, 29, and 30. The sizing stop grip recess (660) allows better gripping by the dog handler when setting the collar opening length (418).

Figure 17:
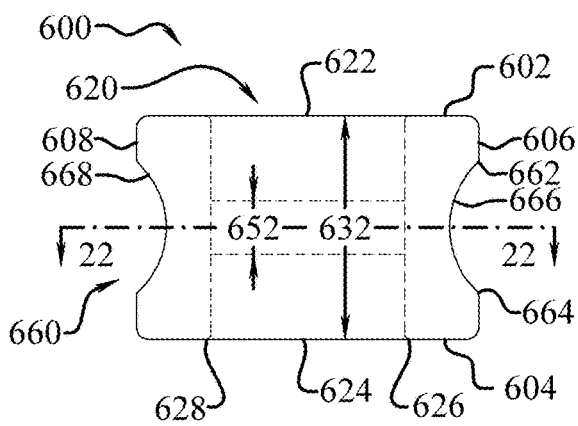
FIG. 17 is a front elevation view of a sizing stop embodiment, not to scale.
Figure 18:
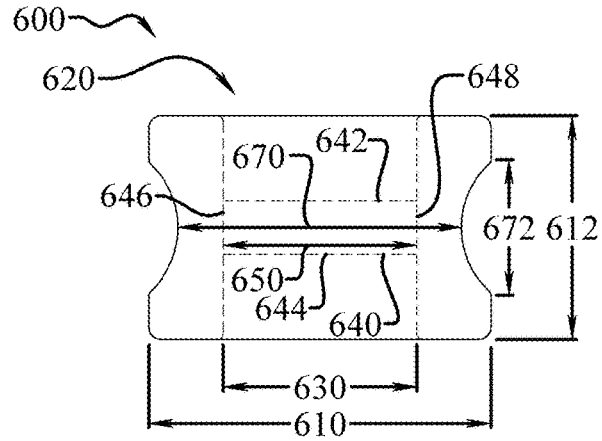
FIG. 18 is a rear elevation view of a sizing stop embodiment, not to scale.
Figure 21:
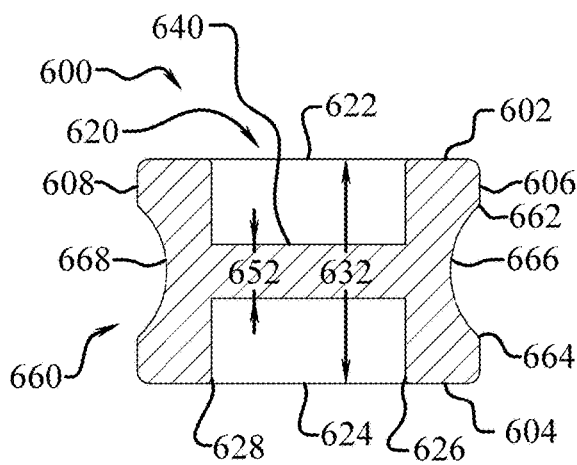
FIG. 21 is a cross-sectional view of a sizing stop embodiment referenced in FIG. 17, not to scale.
Figure 22:
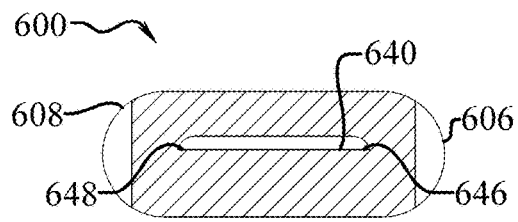
FIG. 22 is a cross-sectional view of a sizing stop embodiment referenced in FIG. 19, not to scale.
Figure 23:
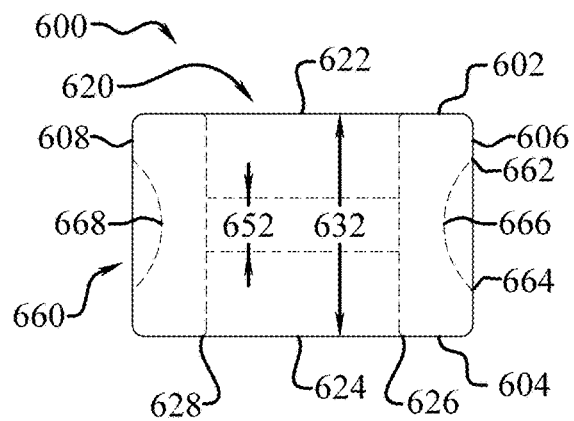
FIG. 23 is a front elevation view of a sizing stop embodiment, not to scale.
Figure 24:
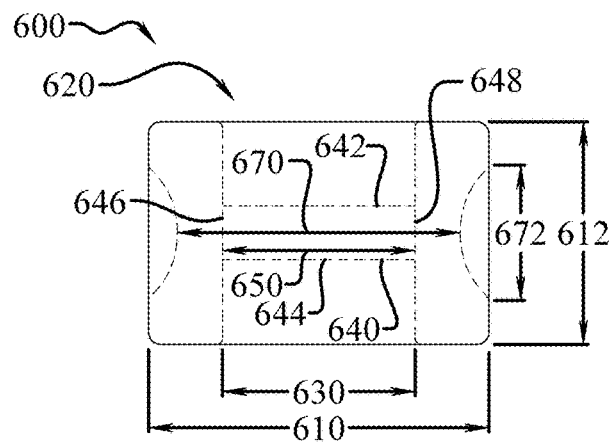
FIG. 24 is a rear elevation view of a sizing stop embodiment, not to scale.
Figure 25:
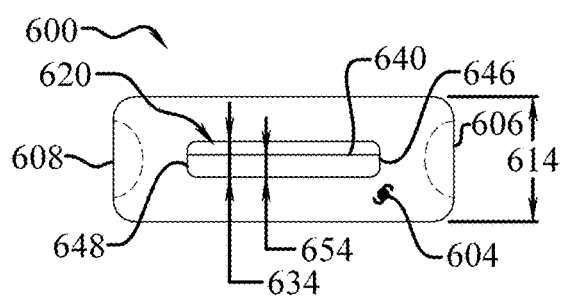
FIG. 25 is a distal side elevation view of a sizing stop embodiment, not to scale.
Figure 26:
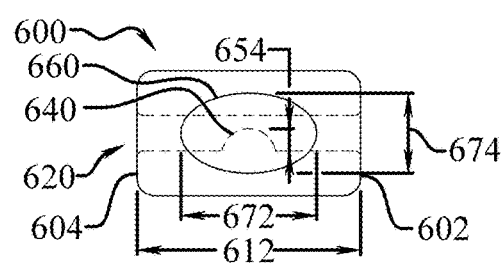
FIG. 26 is a side elevation view of a sizing stop embodiment, not to scale.
Figure 27:
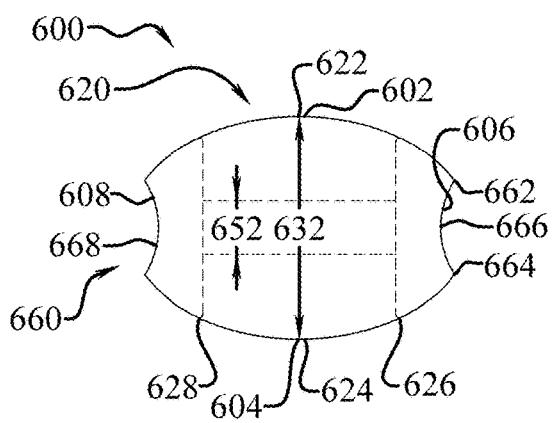
FIG. 27 is a front elevation view of a sizing stop embodiment, not to scale.
Figure 28:
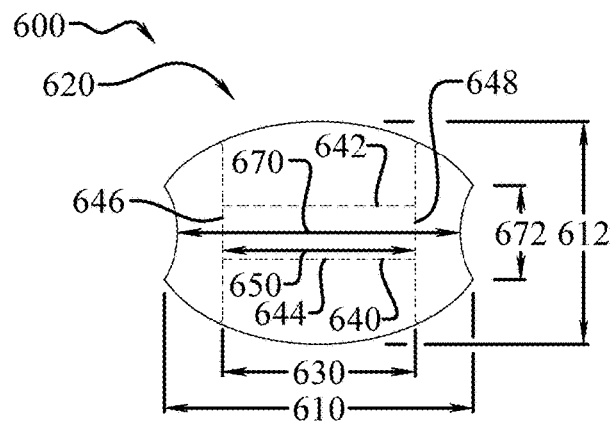
FIG. 28 is a rear elevation view of a sizing stop embodiment, not to scale.
Figure 29:
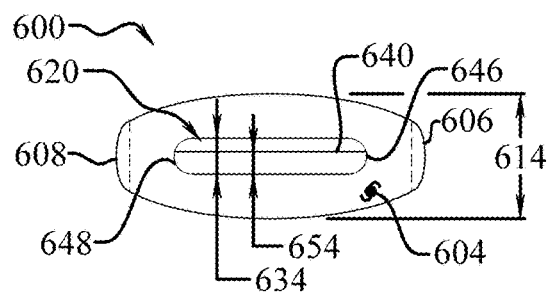
FIG. 29 is a distal side elevation view of a sizing stop embodiment, not to scale.
Figure 30:
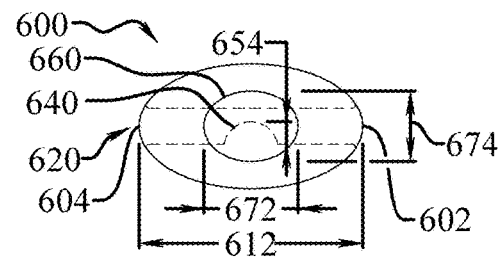
FIG. 30 is a side elevation view of a sizing stop embodiment, not to scale.

The sizing stop (600) may have many different shape embodiments. For instance, FIGS. 17-19 show a sizing stop (600) having a rectangular shape and a sizing stop grip recesses (660) that extend from the top to the bottom of the sizing stop (600). Additionally, this embodiment has a rounded sizing stop dextral side (606) and a rounded sizing stop sinistral side (608), as seen in FIGS. 19 and 21. In another embodiment of sizing stop (600) seen in FIGS. 23-26, show a sizing stop (600) having a rectangular shape and an oval bowled sizing stop grip recesses (660). Additionally, this embodiment has a square sizing stop dextral side (606) and a square sizing stop sinistral side (608), as seen in FIG. 25. In yet another embodiment of sizing stop (600) seen in FIGS. 23-26, shows a sizing stop (600) having an oval shape having an arched shaped top and bottom and a sizing stop grip recesses (660) that extend from the top to the bottom of the sizing stop (600). Additionally, this embodiment has a round sizing stop dextral side (606) and a rounded sizing stop sinistral side (608), as seen in FIG. 29. The sizing stop (600) may be composed of metal alloys and/or non-metallic materials.

In another series of embodiments the leash (100) is constructed such that a portion of the leash first portion is pleated horizontally, or left-to-right in FIG. 10, and attached to itself to create regions having a corrugated, or wave-like, structure. Further, the ridges, or protrusions illustrated may be formed of the same material as the leash first portion, but may be strips attached to the leash first portion, having any of the disclosed width, length, and thickness relationships disclosed herein.

In one embodiment the references to having a second portion, or second material, having at least one material property different than the same material property of the associated first portion, or first material, refers to material hardness, and in a further embodiment the difference in material hardness is at least 20 points on a Shore A hardness scale, and in an even further embodiment is at least 40 points on a Shore A hardness scale, and at least 60 points on a Shore A hardness scale in still another embodiment.

In another embodiment the references to having a second portion, or second material, having at least one material property different than the same material property of the associated first portion, or first material, refers to percentage elongation at break, and in a further embodiment the percentage elongation at break of one of the materials is less than 30% and the percentage elongation at break of the other material is at least 5 percentage points different than that of the prior material, and at least 10 percentage points in a further embodiment, and at least 15 percentage points in yet another embodiment. In still further embodiments the material having a percentage elongation at break of less than 30% is less than 25%, and in another embodiment is no more than 20%. In another embodiment the references to having a second portion, or second material, having at least one material property different than the same material property of the associated first portion, or first material, refers to density, and in a further embodiment the density of the less dense material is at least 0.5 g/cc less dense than the more dense material, while in still another embodiment the differential is at least 0.75 g/cc, and at least 1 g/cc in yet another embodiment.

In another embodiment the references to having a second portion, or second material, having at least one material property different than the same material property of the associated first portion, or first material, refers to static coefficient of friction, and in a further embodiment the difference in static coefficient of friction is at least 0.1, and at least 0.2 in another embodiment; while in still a further embodiment refers to the tackiness of the materials being different. In another embodiment the references to having a second portion, or second material, having at least one material property different than the same material property of the associated first portion, or first material, refers to tackiness, which may be measured using any of the methods disclosed in: Roberts R. A., Review of Methods for the Measurement of Tack, PAJ1 Report No. 5, September 1997.

In one embodiment the stop (600) prevents movement of the flexible body (1000) in a loosening direction against an axial load of at least 20 lbf, while in further embodiments it is at least 40 lbf, 60 lbf, 80 lbf, and 100 lbf. A further series of embodiments introduces a cap on this relationship so that an animal that has broken free of the handler can overcome the resistance of the stop (600) if is becomes entangled and the dog is in a life-threatening situation. Therefore, in one such embodiment the stop (600) permits movement of the flexible body (1000) in a loosening direction when subjected to an axial load of 200 lbf, and in further embodiments permits movement at axial load of 180 lbf, 160 lbf, 140 lbf, 120 lbf, 100 lbf, 80 lbf, 60 lbf, and 40 lbf.

Figure 71:
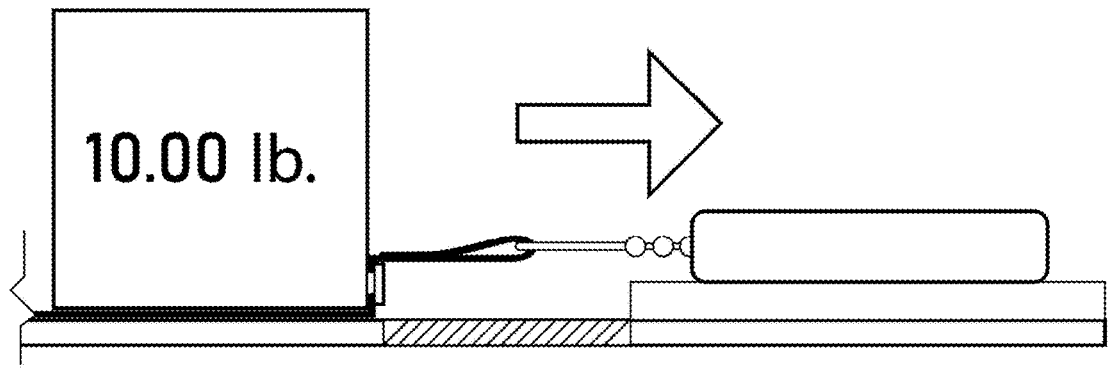
FIG. 71 is a side elevation view of a test set-up, not to scale.
Figure 72:
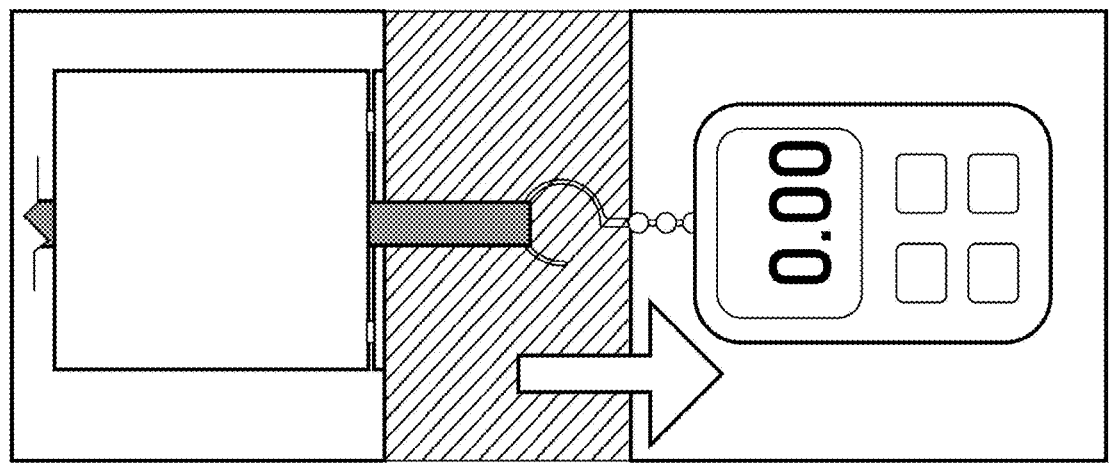
FIG. 72 is a top plan view of a test set-up, not to scale.

FIGS. 71-76 illustrate test set-ups constructed to illustrate changes in break-away forces associated with embodiments of the present invention. For example FIGS. 71-72 illustrate a break away test set-up whereby a ¼" wide and ¹⁄₆₄" thick piece of the leash is placed on a piece of polished aluminum with a ten pound weight, 5" in length, placed on the leash. A digital scale was attached and pulled until the system began to move and the force required to initiate movement was recorded in the column labeled "FIG. 71" within the table of FIG. 77. The first row of this column is labeled "plain," meaning that it was just the first leash portion, which is the equivalent of just the first grip portion (220), the first lead portion (320), and/or the first collar portion (420), only required a break-away force of 2 lb 3 oz. The next row labeled "Con #10 Silicon Dots" included 4 silicon dots per inch of length creating the second leash portion, which is the equivalent of the grip second portion tactile surface (260), the lead second portion tactile surface (360), and/or the collar second portion tactile surface (460), with each dot having a ⅛" diameter and a ¹⁄₁₆" thickness, and resulting in a break-away force of 2 lb 10 oz. The next row labeled "Con #17 Silicon Mini Ribs" included 6 transverse silicon ribs per inch of length creating the second leash portion, which is the equivalent of the grip second portion tactile surface (260), the lead second portion tactile surface (360), and/or the collar second portion tactile surface (460), with each rib having a ¹⁄₃₂" width and a ¹⁄₃₂" thickness, and resulting in a break-away force of 3 lb 6 oz. The next row labeled "Con #18 Silicon Large Ribs" included 6 transverse silicon ribs per inch of length creating the second leash portion, which is the equivalent of the grip second portion tactile surface (260), the lead second portion tactile surface (360), and/or the collar second portion tactile surface (460), with each rib having a 1/32" width and a 1/16" thickness, and resulting in a break-away force of 8 lb 13 oz; unexpectedly more than double the prior break-away force by merely increasing the thickness by 1/32". The next row labeled "Con #20 Fabric Paint Ribs" included 5 transverse acrylic fabric paint ribs per inch of length creating the second leash portion, which is the equivalent of the grip second portion tactile surface (260), the lead second portion tactile surface (360), and/or the collar second portion tactile surface (460), with each rib having a 1/16" width and a 1/32" thickness, and resulting in a break-away force of 6 lb 14 oz; unexpectedly more than doubling the break-away force of the "Con #17 Mini Ribs" despite being the same width and height, and having one fewer rib per inch. The final row labeled "Con #21 Friction Tape" included a full layer of friction tape creating a continuous second leash portion, which is the equivalent of the grip second portion tactile surface (260), the lead second portion tactile surface (360), and/or the collar second portion tactile surface (460), with Gardner Bender brand 0.45 mm thick friction tape resulting in a break-away force of 5 lb. 1 oz; unexpectedly less than the prior two rows despite covering the entire contact side of the leash.

Figure 73:
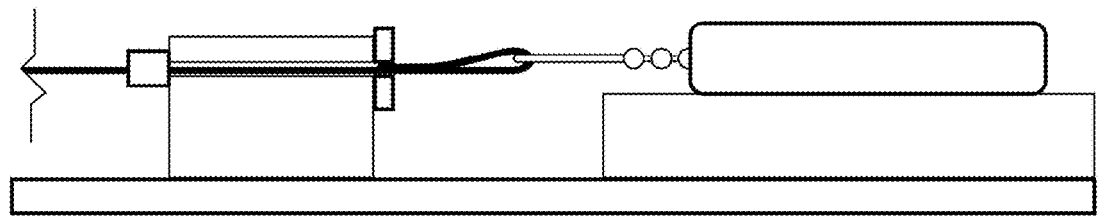
FIG. 73 is a side elevation view of a test set-up, not to scale.
Figure 74:
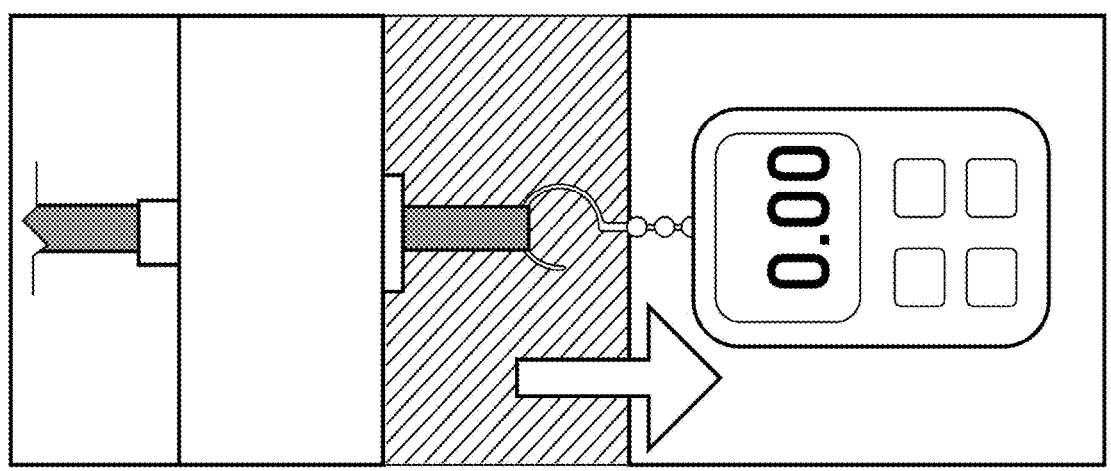
FIG. 74 is a top plan view of a test set-up, not to scale.
Figure 75:
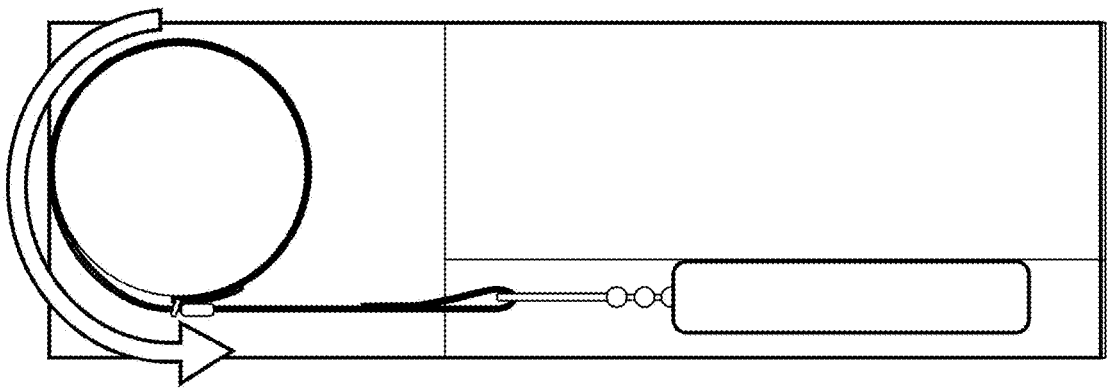
FIG. 75 is a top plan view of a test set-up, not to scale.
Figure 76:
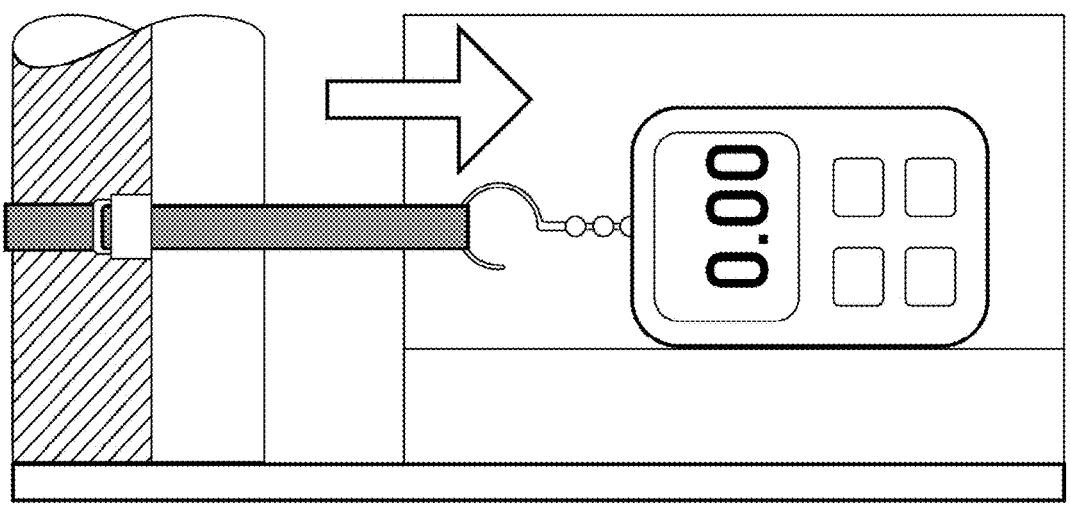
FIG. 76 is a side elevation view of a test set-up, not to scale.

The next column of FIG. 77 is labeled "Linear Break Test (FIG. 73)" is data collected using the test set-up illustrated in FIG. 73. Specifically, it is a test designed to measure a break-away force required to get the previously disclosed variations of the leash (100) to slide through the stop (600). Unexpectedly, these stop break-away forces were not in alignment with the break-away forces in the first column, illustrating that the present system is a balance of many factors and variables, not merely maximizing or minimizing any one individual variable. This is further supported by the data in the third column labeled "Rotational Break Test (FIG. 75)," which is break-away forces collected using the test set-up illustrated in FIG. 75 consisting of 8" diameter piece of polished aluminum fixed to a base with the leash (100) encircling the round polished aluminum, as shown in FIG. 75. Force was applied until the leash (100) slipped and rotated about the aluminum piece with the break-away force recorded in the last column of FIG. 77. Once again, these stop break-away forces were not in alignment with the break-away forces in the first column, illustrating that the present system is a balance of many factors and variables, not merely maximizing or minimizing any one individual variable.

It is important to note that the present leash (100) construction offers improved performance even when used with a traditional round metallic ring (500) and ½" long, 1/8" thick, leather wrap-around stop (600), as illustrated in FIGS. 78-79.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A leash, comprising:
   a ring formed with a ring aperture;
   a flexible body having a first end attached to the ring and a second end, wherein the second end passes through the ring aperture;
   a collar formed by the portion of the flexible body between the first end and a pass-though point where the flexible body first enters the ring aperture thereby defining a collar opening;
   a lead, having a lead length, and formed by the portion of the flexible body between the ring and the second end;
   a grip, having a grip length, and formed by the portion of the flexible body between the lead and the second end;
   a stop repositionably engaged with the flexible body between the ring and the second end, whereby the stop cannot pass through the ring aperture and the stop has an internal ridge;
   wherein the flexible body includes a leash material property differential region having a differential region exposed surface area and a leash material property differential region length;
   wherein the leash material property differential region includes a first exposed material portion, having a first material exposed surface area and being formed of a first material of a plurality of first material properties, and a second exposed material portion, having a second material exposed surface area and formed of a second material having a plurality of second material properties;
   wherein the first material exposed surface area is at least 60% of the differential region exposed surface area, and the second material exposed surface area is no more than 40% of the differential region exposed surface area;
   wherein the first material is different than the second material;
   wherein the flexible body is formed of the first material and the second material is applied to the flexible body in the leash material property differential region, and the second material forms a plurality of projections extending from the first material, toward the first end of the flexible body and the attachment to the ring, and configured such that plurality of projections do not contact the ring aperture as the flexible body passes through the ring aperture;
   wherein the projections extend a projection thickness of no more than 5 mm from the first material, and include 2-10 projections per inch of the leash material property differential region length;
   wherein the internal ridge is configured to engage the leash material property differential region between at least two projections;
   wherein the leash has a leash length, the lead length is at least 20% of the leash length, and the grip length is no more than 40% of the leash length; and
   wherein the leash material property differential region is located within 10" of ring, and the leash material property differential region length is at least 12", such that a portion of the leash material property differential region is located in the collar and a portion of the leash material property differential region is located in the lead, and when the leash is applied to a dog the leash material property differential region passes through the ring aperture permitting the leash material property differential region to pass through the ring aperture in a tightening direction thereby reducing the collar opening and an opening distance along the flexible body between the first end and the pass-through point, with the projections extending toward and contacting the dog, while the stop engages the leash material property differential region and prevents the leash material property differential region from passing through the ring aperture in a loosening direction.

2. The leash of claim 1, wherein the first material exposed surface area is at least 75% of the differential region exposed surface area, and the second material exposed surface area is no more than 25% of the differential region exposed surface area.

3. The leash of claim 2, wherein the first material exposed surface area is at least 90% of the differential region exposed surface area, and the second material exposed surface area is no more than 10% of the differential region exposed surface area.

4. The leash of claim 1, wherein:
the plurality of first material properties includes a first material density, a first material static coefficient of friction, and a first material hardness;
the plurality of second material properties includes a second material density, a second material static coefficient of friction, and a second material hardness; and
the first material static coefficient of friction is different than the second material static coefficient of friction.

5. The leash of claim 4, wherein the first material density is different than the second material density.

6. The leash of claim 5, wherein the first material hardness is different than the second material hardness.

7. The leash of claim 6, wherein the first material density is less than the second material density.

8. The leash of claim 7, wherein the first material static coefficient of friction is less than the second material static coefficient of friction.

9. The leash of claim 1, wherein the plurality of projections include ribs.

10. The leash of claim 1, wherein the flexible body has a round cross-sectional shape with a body diameter of 0.125-0.500", the ring is round and having a ring diameter that is 2-5 times the body diameter, the stop has a stop aperture through which the flexible body passes, the stop aperture having a stop aperture length that is 2-5 times the body diameter, and the projection thickness is 0.5-3.0 mm.

11. The leash of claim 1, wherein the internal ridge has an internal ridge height that is greater than the projection thickness.

12. A leash, comprising:
a ring formed with a ring aperture;
a flexible body having a first end attached to the ring and a second end, wherein the second end passes through the ring aperture;
a collar formed by the portion of the flexible body between the first end and a pass-though point where the flexible body first enters the ring aperture thereby defining a collar opening;
a lead, having a lead length, and formed by the portion of the flexible body between the ring and the second end;
a grip, having a grip length, and formed by the portion of the flexible body between the lead and the second end;
a stop repositionably engaged with the flexible body between the ring and the second end, whereby the stop cannot pass through the ring aperture;
wherein the flexible body includes a leash material property differential region having a differential region exposed surface area and a leash material property differential region length;
wherein the leash material property differential region includes a first exposed material portion, having a first material exposed surface area and being formed of a first material of a plurality of first material properties, and a second exposed material portion, having a second material exposed surface area and formed of a second material having a plurality of second material properties;
wherein the first material exposed surface area is at least 75% of the differential region exposed surface area, and the second material exposed surface area is no more than 25% of the differential region exposed surface area;
wherein the first material is different than the second material;
wherein the plurality of first material properties includes a first material density, a first material static coefficient of friction, and a first material hardness;
wherein the plurality of second material properties includes a second material density different greater than the first material density, a second material static coefficient of friction greater than the first material static coefficient of friction, and a second material hardness different than the first material hardness;
wherein the first material static coefficient of friction is different than the second material static coefficient of friction;
wherein the leash has a leash length, the lead length is at least 20% of the leash length, and the grip length is no more than 40% of the leash length; and
wherein the leash material property differential region is located within 10" of ring, and the leash material property differential region length is at least 12", such that a portion of the leash material property differential region is located in the collar and a portion of the leash material property differential region is located in the lead, and when the leash is applied to a dog the leash material property differential region passes through the ring aperture permitting the leash material property differential region to pass through the ring aperture in a tightening direction thereby reducing the collar opening and an opening distance along the flexible body between the first end and the pass-through point, while the stop engages the leash material property differential region and prevents the leash material property differential region from passing through the ring aperture in a loosening direction.

13. The leash of claim 12, wherein the flexible body is formed of the first material and the second material is applied to the flexible body in the leash material property differential region and forms a plurality of projections extending a projection thickness from the first material and configured such they extend toward the first end of the flexible body and the attachment to the ring, such that plurality of projections contact the dog and do not contact the ring aperture as the flexible body passes through the ring aperture.

14. The leash of claim 13, wherein the plurality of projections includes 2-10 projections per inch of the leash material property differential region length.

15. The leash of claim 14, wherein the plurality of projections include ribs, the first material exposed surface area is at least 90% of the differential region exposed surface area, the second material exposed surface area is no more than 10% of the differential region exposed surface area, and the projection thickness is no more than 5 mm.

16. The leash of claim 14, wherein the stop is formed with an internal ridge having an internal ridge height that is greater than the projection thickness, and the internal ridge is configured to engage the leash material property differential region between at least two projections.

17. The leash of claim 14, wherein the projection thickness is 0.5-3.0 mm.

18. The leash of claim 14, wherein the ring aperture has a ring aperture length and a ring aperture width that is not equal to the ring aperture length.

19. A leash, comprising:
a ring formed with a ring aperture;
a flexible body having a first end attached to the ring and a second end, wherein the second end passes through the ring aperture;
a collar formed by the portion of the flexible body between the first end and a pass-though point where the flexible body first enters the ring aperture thereby defining a collar opening;
a lead, having a lead length, and formed by the portion of the flexible body between the ring and the second end;
a grip, having a grip length, and formed by the portion of the flexible body between the lead and the second end;
a stop repositionably engaged with the flexible body between the ring and the second end, whereby the stop cannot pass through the ring aperture and the stop has an internal ridge;
wherein the flexible body includes a leash material property differential region having a differential region exposed surface area and a leash material property differential region length;
wherein the leash material property differential region includes a first exposed material portion, having a first material exposed surface area and being formed of a first material of a plurality of first material properties, and a second exposed material portion, having a second material exposed surface area and formed of a second material having a plurality of second material properties;
wherein the first material exposed surface area is at least 60% of the differential region exposed surface area, and the second material exposed surface area is no more than 40% of the differential region exposed surface area;
wherein the first material is different than the second material;
wherein the flexible body is formed of the first material and the second material is applied to the flexible body in the leash material property differential region, and the second material forms a plurality of projections extending from the first material, toward the first end of the flexible body and the attachment to the ring, and configured such that plurality of projections do not contact the ring aperture as the flexible body passes through the ring aperture;
wherein the projections extend a projection thickness of 1-3 mm from the first material, and include 2-10 projections per inch of the leash material property differential region length, and having a longitudinal separation distance of at least 350% of the projection thickness and no more than 17 times the projection thickness;
wherein the internal ridge is configured to engage the leash material property differential region between at least two projections;
wherein the leash has a leash length, the lead length is at least 20% of the leash length, and the grip length is no more than 40% of the leash length;
wherein the leash material property differential region is located within 10" of ring, and the leash material property differential region length is at least 12", such that a portion of the leash material property differential region is located in the collar and a portion of the leash material property differential region is located in the lead, and when the leash is applied to a dog the leash material property differential region passes through the ring aperture permitting the leash material property differential region to pass through the ring aperture in a tightening direction thereby reducing the collar opening and an opening distance along the flexible body between the first end and the pass-through point, with the projections extending toward and contacting the dog, while the stop engages the leash material property differential region and prevents the leash material property differential region from passing through the ring aperture in a loosening direction;
wherein the plurality of first material properties includes a first material density, a first material static coefficient of friction, a first material hardness, and a first material percentage elongation at break;
wherein the plurality of second material properties includes a second material density, a second material static coefficient of friction that is different than the first material static coefficient of friction, a second material hardness, and a second material percentage elongation at break that is different than the first material percentage elongation at break;
wherein at least one of the first material density and the second material density is no greater than 2.0 g/cc;
wherein a density differential is an absolute value of a difference between the second material density and the first material density, and the density differential is at least 0.5 g/cc; and
wherein a hardness differential is an absolute value of a difference between the second material hardness and the first material hardness, and the hardness differential is at least 20 points on a Shore A hardness scale.

\* \* \* \* \*